US007231657B2

(12) United States Patent
Honarvar et al.

(10) Patent No.: US 7,231,657 B2
(45) Date of Patent: Jun. 12, 2007

(54) USER AUTHENTICATION SYSTEM AND METHODS THEREOF

(75) Inventors: Laurence Toraj Honarvar, Arnold, MD (US); Brandon Raymond Witte, Arnold, MD (US); Steve Chance Fatigante, Arlington, VA (US); Gary Lynn Harless, Richmond, VA (US)

(73) Assignee: American Management Systems, Inc., Fairfax, VA (US)

( * ) Notice: Subject to any disclaimer, the term of this patent is extended or adjusted under 35 U.S.C. 154(b) by 829 days.

(21) Appl. No.: 10/224,564

(22) Filed: Aug. 21, 2002

(65) Prior Publication Data

US 2003/0154406 A1 Aug. 14, 2003

Related U.S. Application Data

(60) Provisional application No. 60/356,149, filed on Feb. 14, 2002.

(51) Int. Cl.
*H04L 9/32* (2006.01)
*H04L 9/00* (2006.01)
*H04K 1/00* (2006.01)
*G06F 7/04* (2006.01)
*G06F 7/58* (2006.01)
*G06F 15/173* (2006.01)
*G09C 5/00* (2006.01)

(52) U.S. Cl. .................. 726/2; 726/5; 726/10; 726/20; 726/27; 726/17; 713/176; 713/186; 709/225

(58) Field of Classification Search .............. 726/2, 726/5, 10, 20, 27, 4, 17; 713/176, 186; 709/225
See application file for complete search history.

(56) References Cited

U.S. PATENT DOCUMENTS 4,661,658 A   4/1987   Matyas 5,214,702 A   5/1993   Fischer
5,235,165 A   8/1993   Sukegawa
5,311,594 A   5/1994   Penzias (Continued)

FOREIGN PATENT DOCUMENTS

EP   0 456 553 B1   3/1994

(Continued)

OTHER PUBLICATIONS

PCT International Search Report for the counterpart PCT application No. PCT/US03/01654 of the above-identified US patent application, May 7, 2003, 6 pages.

(Continued)

*Primary Examiner*—Emmanuel L. Moise
*Assistant Examiner*—Courtney D. Fields
(74) *Attorney, Agent, or Firm*—Staas & Halsey LLP

(57) ABSTRACT

A computer system to authenticate users of vendors supplying services and/or products to the users, the system having programmed processors providing authentication rules, authenticating users according to the authentication rules responsive to user authentication requests, configuring the authentication rules in real-time, thereby allowing real-time customization of the system, providing multi-factor user authentication processes, using any data sources providing information about and/or known to the users to authenticate the users, thereby providing a data agnostic system, and authentication strategies correspond to the authentication rules, thereby allowing the system to support authentication strategy experimentation.

83 Claims, 41 Drawing Sheets

U.S. PATENT DOCUMENTS

| | | |
|---|---|---|
| 5,327,497 A | 7/1994 | Mooney et al. |
| 5,420,926 A | 5/1995 | Low et al. |
| 5,436,972 A | 7/1995 | Fischer |
| 5,442,342 A | 8/1995 | Kung |
| 5,533,123 A | 7/1996 | Force et al. |
| 5,577,120 A | 11/1996 | Penzias |
| 5,634,951 A | 6/1997 | Colucci et al. |
| 5,638,446 A | 6/1997 | Rubin |
| 5,655,020 A | 8/1997 | Powers |
| 5,655,077 A | 8/1997 | Jones et al. |
| 5,659,616 A | 8/1997 | Sudia |
| 5,668,876 A | 9/1997 | Falk et al. |
| 5,677,955 A | 10/1997 | Doggett et al. |
| 5,684,950 A | 11/1997 | Dare et al. |
| 5,684,951 A | 11/1997 | Goldman et al. |
| 5,689,638 A | 11/1997 | Sadovsky |
| 5,706,427 A | 1/1998 | Tabuki |
| 5,712,914 A | 1/1998 | Aucsmith et al. |
| 5,740,361 A | 4/1998 | Brown |
| 5,748,738 A | 5/1998 | Bisbee et al. |
| 5,771,291 A | 6/1998 | Newton et al. |
| 5,774,525 A * | 6/1998 | Kanevsky et al. ....... 379/88.02 |
| 6,496,936 B1 | 12/2002 | French et al. |
| 6,845,453 B2 * | 1/2005 | Scheidt et al. ................. 726/5 |
| 2002/0162026 A1* | 10/2002 | Neuman et al. ............ 713/201 |

FOREIGN PATENT DOCUMENTS

| | | |
|---|---|---|
| EP | 0 986 209 A2 | 3/2000 |
| EP | 1 050 993 A2 | 11/2000 |
| WO | WO 98/39876 | 9/1998 |
| WO | WO 01/15381 | 3/2001 |

OTHER PUBLICATIONS

Seisint Overview; http://www.seisint.com/aboutus/index.html, 1 page, Jul. 29, 2002.

Seisint Product Overview; http://www.seisint.com/products.html, 1 page, Jul. 29, 2002.

Seisint eAUTHENTICATION™, Know who you're dealing with; http://www.seisint.com/products_oa.html, 2 pages, Jul. 29, 2002.

AT&T ACES PKI Center, PKI ACES, Securing the Business of Government, http://www.aces.att.com/, 1 page, Jul. 29, 2002.

AT&T, Certification Practice Statement (CPS) for Access Certificates for Electronic Services (ACES), PKI ACES, Version 2.24, 69 pages, Jul. 29, 2002.

PCT Written Opinion by the USPTO in the counterpart PCT international application No. PCT/US03/01654 of the above-identified US patent application, Sep. 2, 2003, 5 pages.

Written Reply to Written Opinion filed with the USPTO in response to the PCT Written Opinion received in the counterpart PCT international application No. PCT/US03/01654 of the above-identified US patent application, Oct. 31, 2003, 30 pages.

PCT Notification of Transmittal of International Preliminary Examination Report in the counterpart PCT international application No. PCT/US03/01654 of the above-identified US patent application, Jan. 12, 2004, 5 pages.

* cited by examiner identicate

| PROCESS | (Select Another) |
|---|---|
| BB - Loan Closing | |
| QUESTION GROUPS | (Create) |
| Bureau Data | |
| Demographic | |
| Geographic | |
| SIMULATION | |
| Test the rules | |
| PUBLISHER | |
| Print the rules | |
| PROMOTION | |
| Promotion Request | |
| REPORTER | |
| View quiz results | |
| LOGOUT | |
| Logout | |

Process: BB - Loan Closing (#48376) -- Version 3

[Options] [Validation] [Question Priority] [Questions]

The Process will execute the following　⎫
○ Validation Only　　　　　　　　　　　　　⎬ 1710
○ Questions Only　　　　　　　　　　　　　　⎪
⦿ Both Validation and Questions　　　　 ⎭

Total number of Questions to ask the consumer [4] — 1720

Question presentation to the consumer [Fixed ▼] — 1730
(Random or fixed presentation of resulting questions by question group)

Allow [2] attempts within any [24] [Hour ▼] time period. — 1740
(Please set the number of attempts = -1 if you want retries to be unlimited)

Ask the same Questions for each retry attempt? [no ▼] — 1750

Engine data elements to verify on subsequent requests/attempts: — 1760
☑ Social Security Number　☐ Home Phone Number
☐ Last Name　　　　　　　　☐ Date of Birth
☐ First Name　　　　　　　　☐ External ID
☐ Address — 1770

(Save)　(Copy) — 1780

| DATA SOURCE | PURPOSE | TYPE | QUESTION TEXT |
|---|---|---|---|
| ZIPLIST5 PLUS | ADDRESS | MULTIPLE CHOICE | FROM THE FOLLOWING LIST, SELECT THE COUNTY IN WHICH YOU LIVE. |
| CREDIT SUMMARY | ADDRESS | MULTIPLE CHOICE | FROM THE FOLLOWING LIST, SELECT ONE OF YOUR PREVIOUS ADDRESSES. |
| DEMOGRAPHIC | ASSET | MULTIPLE CHOICE | FROM THE FOLLOWING LIST, SELECT THE YEAR, MAKE, AND MODEL OF YOUR CAR. |
| DEMOGRAPHIC | DEMOGRAPHIC | MULTIPLE CHOICE | FROM THE FOLLOWING LIST, SELECT ANOTHER MEMBER OF YOUR HOUSEHOLD. |
| DEMOGRAPHIC | DEMOGRAPHIC | RANGE CHOICE | HOW OLD ARE YOU? |
| DEMOGRAPHIC | DEMOGRAPHIC | MULTIPLE CHOICE | FROM THE FOLLOWING LIST, SELECT YOUR DRIVER'S LICENSE NUMBER. |
| CREDIT SUMMARY | EMPLOYMENT | MULTIPLE CHOICE | FROM THE FOLLOWING LIST, SELECT ONE OF YOUR PREVIOUS EMPLOYERS. |
| GEOGRAPHIC | GEOGRAPHIC | MULTIPLE CHOICE | FROM THE FOLLOWING LIST, SELECT THE NEAREST CROSS STREET TO YOUR HOME ADDRESS. |
| CREDIT SUMMARY | LIABILITY | DATE RANGE CHOICE | FROM THE FOLLOWING LIST, SELECT THE YEAR IN WHICH YOU ESTABLISHED YOUR MOST RECENT AUTO LOAN. |
| CREDIT SUMMARY | LIABILITY | MULTIPLE CHOICE | FROM THE FOLLOWING LIST, SELECT THE LENDER WHO HOLDS YOUR MOST RECENT AUTO LOAN. |
| CREDIT SUMMARY | LIABILITY | MULTIPLE CHOICE | FROM THE FOLLOWING LIST, SELECT THE LENDER WHO HOLDS YOUR MOST RECENT MORTGAGE. |
| CREDIT SUMMARY | LIABILITY | RANGE CHOICE | THE APPROXIMATE BALANCE OF YOUR MORTGAGE FALLS IN WHICH OF THE FOLLOWING RANGES. |
| CREDIT SUMMARY | LIABILITY | MULTIPLE CHOICE | YOU HAVE A RETAIL CREDIT CARD WITH WHICH OF THE FOLLOWING MERCHANTS? |
| CREDIT SUMMARY | LIABILITY | MULTIPLE CHOICE | YOU HAVE A LOAN WITH WHICH OF THE FOLLOWING INSTITUTIONS( EXCLUDING MORTGAGE AND AUTO LOANS)? |
| CREDIT SUMMARY | LIABILITY | RANGE CHOICE | YOUR INSTALLMENT LOAN PAYMENT FALLS IN WHICH OF THE FOLLOWING RANGES. |
| CREDIT SUMMARY | LIABILITY | RANGE CHOICE | THE CREDIT LIMIT ON YOUR NEW RETAIL CREDIT CARD (OPENED IN THE LAST 60 DAYS) FALLS IN WHICH OF THE FOLLOWING RANGES. |
| CREDIT SUMMARY | LIABILITY | RANGE CHOICE | THE ORIGINAL AMOUNT FOR YOUR MOST RECENT MORTGAGE FALLS IN WHICH OF THE FOLLOWING RANGES. |
| CREDIT SUMMARY | LIABILITY | RANGE CHOICE | THE MONTHLY PAYMENT FOR YOUR MOST RECENT MORTGAGE FALLS IN WHICH OF THE FOLLOWING RANGES. |
| CREDIT SUMMARY | LIABILITY | DATE RANGE CHOICE | FROM THE FOLLOWING LIST, SELECT THE YEAR IN WHICH YOU ESTABLISHED YOUR MOST RECENT MORTGAGE. |
| CREDIT SUMMARY | LIABILITY | RANGE CHOICE | THE MONTHLY PAYMENT FOR YOUR MOST RECENT AUTO LOAN FALLS IN WHICH OF THE FOLLOWING RANGES? |
| CREDIT SUMMARY | LIABILITY | MULTIPLE CHOICE | FROM THE FOLLOWING LIST, SELECT THE TERM (IN MONTHS) OF YOUR MOST RECENT AUTO LOAN. |
| CREDIT SUMMARY | LIABILITY | MULTIPLE CHOICE | YOU HAVE A CREDIT CARD WITH WHICH OF THE FOLLOWING INSTITUTIONS? |

FIG. 24

A. MULTIPLE CHOICE

FROM THE FOLLOWING LIST, SELECT THE NEAREST CROSS STREET TO YOUR CURRENT ADDRESS.
1. WEST
2. MAPLE
3. EVERGREEN
4. WASHINGTON
5. MAIN

B. FILL IN THE BLANK

WHAT IS THE MONTHLY PAYMENT FOR YOUR MOST RECENT AUTO LOAN? _____

C. BOOLEAN (YES/NO, TRUE/FALSE)

HAVE YOU LIVED IN AN APARTMENT OR CONDOMINIUM BUILDING IN THE LAST 5 YEARS?
1. YES
2. NO

D. MULTI-SELECT

YOU HAVE A CREDIT CARD WITH WHICH OF THE FOLLOWING INSTITUTIONS? SELECT ALL THAT APPLY
1. MBNA
2. BANK OF AMERICA
3. MICHIGAN NATIONAL BANK
4. FIRST USA
5. DISCOVER FINANCIAL SERVICES
6. CITIBANK

E. RANGE CHOICE

THE CREDIT LIMIT ON YOUR NEW RETAIL CREDIT CARD (OPENED IN THE LAST 60 DAYS) FALLS IN WHICH OF THE FOLLOWING RANGES.
1. $1000-$2000
2. $2000-$4000
3. $4000-$6000
4. $6000-$8000
5. $8000-$10,000

F. NONE OF THE ABOVE CHOICE

THE CREDIT LIMIT ON YOUR NEW RETAIL CREDIT CARD (OPENED IN THE LAST 60 DAYS) FALLS IN WHICH OF THE FOLLOWING RANGES.
1. $1000-$2000
2. $2000-$4000
3. $4000-$6000
4. $6000-$8000
5. NONE OF THE ABOVE

❂identicate

Identicate Transaction Locator
Query

Search Criteria

| | | | |
|---|---|---|---|
| External ID: | Process:<br>BB - Loan Closing ▼ | Status:<br>All Decisions ▼ | |
| Start Date:<br>('MM/DD/YYYY') | Start Time:<br>('HH:MM AM|PM') | End Date:<br>('MM/DD/YYYY') | Last Name:<br>End Time:<br>('HH:MM AM|PM') |
| | | | SSN:<br>('XXX-XX-XXXX')<br>Max Results:<br>5 ▼ |

(Search) (Reset)

Search returned 5 transactions....

| EXTERNALID | SUBMITDATE | FIRSTNAME | LASTNAME | SSN | STATUS |
|---|---|---|---|---|---|
| 979 | 07/10/2001 08:58:55 PM | Darin | Jenkins | 527-99-2712 | Complete |
| 980 | 07/10/2001 10:23:28 PM | Darin | Jenkins | 527-99-2713 | Complete |
| 981 | 07/10/2001 11:13:11 PM | Darin | Jenkins | 527-99-2714 | Complete |
| 1005 | 07/11/2001 09:11:11 AM | Darin | Jenkins | 527-99-2719 | Complete |
| 1006 | 07/11/2001 09:21:25 AM | Darin | Jenkins | 527-99-2720 | Complete |

©2001 InsideOut Technologies, Inc All Rights Reserved.

USER AUTHENTICATION SYSTEM AND METHODS THEREOF

CROSS REFERENCE TO RELATED APPLICATIONS

This application claims priority under 35 USC 119 from U.S. Provisional Application Ser. No. 60/356,149 entitled "A user authorization system and methods thereof," filed on Feb. 14, 2002, the contents of which is hereby fully incorporated by reference.

The related commonly-assigned patent applications, the entire disclosures of which are incorporated herein by reference, are as follows:

U.S. Pat. No. 6,321,206, Nov. 20, 2001.
U.S. Pat. No. 6,430,545, Aug. 6, 2002.

BACKGROUND OF THE INVENTION

1. Field of the Invention

The present invention relates to authenticating users to access and/or receive information, goods, services, and/or credit from a vendor. More particularly, the present invention relates to a fraud detection and identity verification system dynamically customizable by the vendor and/or a system/solution provider to support the vendor in providing products and/or services to users.

2. Description of the Related Art

Typically a vendor uses various methods and systems within a business process/transaction to authorize users when the users desire to access/receive services from the vendor. In particular, a typical business process incorporates fraud detection and identity verification processes (collectively implemented in a user authentication system) to authenticate users prior to authorizing users to access a service or a business transaction provided by the vendor. For example, a retail vendor selling products via the Internet can use a user authentication system to support the vendor's business process to authorize users purchasing the products. The retail vendor can use a user authentication system to interactively query from the user predetermined information as required by the vendor and to receive information input in response to the queries. Using the input information, the user authentication system authenticates the user and returns a response to the vendor. Based on the authentication system response, the vendor can decide whether to authorize or disallow the user according to the vendor's authorization process to proceed with purchasing the product. When the user is authorized according to the vendor's authorization process, which includes the user authentication system, the vendor may proceed to conclude and confirm the product purchase with the user.

However, the typical user authentication systems have fixed configurations based upon the vendor's authorization and/or business process requirements. The fixed configurations are authentication rules hard coded in software by system/solution providers that implement user authentication systems. The fixed authentication configuration model can disadvantageously limit the vendor, for example, reducing user authentication strength by frustrating the vendor's ability to maintain pace with fraud trends quickly and efficiently. In the typical user authentication system, the vendor would be required to engage a system/solution provider to modify the user authentication system software and/or develop new software to accommodate real-time changing fraud trends as well as vendor authorization and/or business process requirements. Further, typical authentication systems are tied to predetermined or a fixed type/number of data sources, again reducing user authentication strength. Further, typical authentication systems do not support dynamic multi-factor authentication. Further, typical authentication systems do not support advanced decision management and strategy evolution.

SUMMARY OF THE INVENTION

The present invention allows a vendor that provides products and/or services to outpace fraud trends by improving/modifying in real-time the vendor's user authentication requirements. In particular, the present invention provides automated dynamic alteration and promotion of rules/policies that govern the vendor's user authentication process.

Further, the present invention allows assignment of vendor user accounts and access privileges for each user authentication process to control/manage which user authentication processes an individual and/or organization can access.

Further, the present invention allows simulation of a vendor's user authentication process based upon the rules/policies associated with the user authentication process.

Further, the present invention provides automatic versioning of user authentication processes, for example, as new user authentication processes are established.

Further, the present invention provides a user authentication processor that is data agnostic, such that a vendor's user authentication process can be set up to access data from any data source for fraud detection and/or identity verification. For example, the user authentication process can use consumer credit history data as well as user profile, fraud, geographic, demographic, government supplied, political, biometric, and/or digital certificate data, other newly generated/available data, and/or internal data, which can be data proprietary to the vendor for repeat authentication of existing vendor's users.

Further, the present invention provides a user authentication process based upon user questions categorized and/or configured by a vendor into, for example, priority groups for selection and ordering. For example, a configurable question categorization allows asking stronger user authentication questions first. A question can also be configurable by the vendor to support multiple answer types, such as multiple choice, multi-select, true/false, and/or fill in the blank.

Further, the present invention provides an authentication audit tool (authentication transaction locator) to archive and monitor (e.g., view, prepare reports) in progress and/or completed user authentication processes. For example, if a user fails authentication, the transaction locator can be used by a call center to view the details of the failed authentication.

Further, the present invention allows the vendor to create and/or configure parameters for each user authentication question. For example, configurable question parameters can be number of points for a correct answer, number of displayed answers (for multiple choice questions), allowable time to answer a question, range size for multiple-choice questions with numeric ranges as answers, and whether to use 'none of the above' as a possible answer choice. Criteria to determine using 'none of the above' as the possible answer choice would be whether data is required to ask a question and if the data is not required, 'none of the above' can be the correct answer 100% of time. Another criteria would be to use 'none of the above' as a default answer choice if no data exists. If no data exists, a default answer can also be generated by using ranges for multiple-choice questions with numeric ranges as answers. If the actual time for a user to answer a user authentication process question exceeds the set/configured allowable time, the question can be deemed as answered wrong for purposes of the user authentication process.

Further, the present invention allows a vendor to create/configure a user authentication process that supports multiple languages.

Further, the present invention allows a vendor to create and/or configure retry parameters for a user authentication process. For example, the vendor can select number of times within a certain time period to allow retries. The vendor can also select user authentication process fields used to determine a retry (e.g., which user authentication questions to use in enforcing the configured retry parameters). The vendor can also specify a variable retry element to preclude a user from identifying the vendor's pattern during the user's attempts to "crack" or break into the system.

Further, the present invention provides user authentication questions with context sensitive "wrong" multiple-choice answers. In particular, the "wrong" multiple choice answers are context sensitive by being within the context of the data source accessed to determine the "right" answer, advantageously providing consistent multiple-choice answers, which improves true user authentication results (i.e., reducing false positive user authentication results).

Further, the present invention allows the vendor to assign points to groups of user authentication questions. The user authentication questions can be grouped, for example, according to data sources containing information about the user, such as credit history, demographic and geographic categories, or according to predictive power of questions in the question group, such that more predictive question are asked first. Such grouping and point assignment can improve the overall assessment of a user authentication process.

Further, the present invention allows a vendor to establish different levels within a user authentication process, such as pre-processing, fraud detection and/or identity verification. In particular, the vendor can configure criteria that determine performance of such levels. For example, the vendor can configure as to whether the user authentication questions should be pursued if the preprocessing level fails, passes, or independent of outcome of the preprocessing level. Further, the vendor can configure levels within each level.

Further, the present invention provides an application programming interface (API) and/or series of packaged screens for integration of user authentication processes with a vendor's systems.

Further, the present invention provides the ability to use geographic data to verify identity of an individual (user authentication based upon geographic data). Therefore, the present invention can authenticate a user based upon questions that use geographic data typically or likely known only by an individual inhabiting, working, and/or familiar with a specific geographic area. For example, such geographic data type questions can query from a user the name of the closest bank to the user's house or place of work, the name of the closest street intersection to the user's house, and streets/landmarks/other identifying information, such as county name, which are based upon the user's knowledge of a geographic area.

Further, the present invention provides the ability to use personal history/profile information to verify identity of an individual (i.e., user authentication based upon profile information). Therefore, the present invention can authenticate a user based upon questions that use profile data typically or likely known only by an individual and/or specific to an individual. For example, such profile type questions can query from a user vehicle information (e.g., type of car driven by the user, vehicle equipment options, such as make, model, color, type of audio system) number of persons in the user's household, time the user has been/was employed by an employer, time the user has been residing/resided in a residence, previous residence information, property tax information, etc. Such profile data can be private or public information records.

Further, the present invention provides the ability to use political information to verify identity of an individual (i.e., user authentication based upon political information). Therefore, the present invention can authenticate a user based upon question relating to politics typically or likely known only by an individual living in a certain geographic location. For example, such political related questions can query from a user names of local mayor, senators, other politicians, prevalent political party, etc.

Further, the present invention provides the ability to use demographic information to verify identity of an individual (i.e., user authentication based upon demographic information). Therefore, the present invention can authenticate a user based upon questions that use demographic data typically or likely known only by an individual living in a certain geographic location. For example, such demographic related questions can query from a user best known foods, average price of gasoline, average temperature, climate information, largest employer in an area, average size of homes, etc.

Further, the present invention provides a multi-factor user authentication process such that in addition to directly verifying what a user knows, the present invention integrates with and/or accommodates sources to verify what a user has, and/or to verify what a user is. For example, to identify a known fraud the present invention can verify a digital certificate (as what a user has) previously issued to an individual against a certificate authority, in conjunction with and/or independent of asking questions as to what the user knows. Similarly, the present invention can integrate real-time and/or pre-stored biometric verification, such as fingerprint scan, retinal scan, keystroke patterns, face recognition, DNA analysis/matching (as what a user is), into a user authentication process that also verifies a digital certificate and/or asks questions of the user and/or does fraud detection. Therefore, by combining such user authentication factors, the present invention provides a system that advantageously supports a stronger/more confident user authentication process than a user authentication process that covers any one factor alone.

Further, the present invention allows a vendor to dynamically control what data sources a user authentication system uses in a user authentication process to authenticate the user.

Further, the present invention allows automatically generating questions by associating one or more fields from a data source.

Further, the present invention provides using facial patterns and mannerism to predict deceit. Facial expressions and mannerisms, with or without recognition of a user, can be used to leverage biometric functionality during a user authentication process. For example, if the user is looking away from the camera and/or is hesitating when typing, it can be indicative of possible fraud.

Further, the present invention provides application of strategy evolution or decision management techniques to a user authentication process. In particular, the present invention allows a vendor to archive user authentication processes data (results) relating to authentications of users and archive, monitor and evaluate performance data of the user authentication processes (i.e., incorporate a feedback mechanism to measure/determine most effective user authentication processes), so that the vendor can appropriately and dynamically modify the vendor's organizational strategies in accordance with the performance data. For example, the present invention provides defining multiple user authentication processes for each type of business transaction/event (e.g., credit approval transaction) that requires a user authentication process and randomly assigning the user authentication processes to a business transaction, possibly using predefined percentages. Further, a vendor can optionally have dynamic control over the allocation of the user authentication processes to the business transaction. Further, as part of strategy experimentation the user authentication processes can be varied, variations including (without limitation) different settings for a question, variations in the questions being asked from a data source, different question group priority, different data sources, and/or different variations in number of authentication levels and/or components used for authentication. Further, report groups can be assigned to each variable element and/or level as a decision management strategy, such that the feedback process can track the predictive nature of each level/component of a user authentication process and determine whether the process should be more broadly leveraged or modified.

Further, the present invention provides a vendor dual connectivity options to interface with the vendor's users. In particular, the present invention provides an interface allowing the vendor to host user interfaces supporting user authentication processes or provides an interface allowing a third party, such as American Management Systems, Inc. (AMS), Fairfax, Va. (assignee of the present application) to host the user interfaces for the user authentication processes.

The present invention can be attained by a computer system implementing in software a process to authenticate users of a vendor as follows: defining for each vendor in real-time rules to configure/customize a user authentication examination, accessing data sources according to the defined rules, generating a user authentication examination according to the defined rules and the accessed data sources, and authenticating the user based upon the results provided by the user in completing the generated user authentication examination.

Further, the present invention can be attained by a system to authenticate a user, the system having a processor programmed to generate authentication questions based upon information about the user from one or more of credit history, user profile, fraud, geographic, demographic, government supplied, political, biometric, and/or digital certificate information. Further, the authentication questions can be generated based upon as least one of credit history, user profile, fraud, geographic, demographic, government supplied, political, biometric, and/or digital certificate information.

Further, the present invention can be attained by a computer-readable storage device controlling a computer and storing a user authentication process of authenticating users of vendors providing services and/or products to the users, generating vendor-defined rules that configure a user authentication process, and automatically generating in real-time a vendor-configured user authentication process based upon the vendor-defined rules.

Further, the present invention can be attained by a computer-readable storage controlling a computer and storing user authentication information used to authenticate users of vendors providing services and/or products to the users, the information being a data structure identifying vendor information having vendor identification information, organizational information of the vendor, and personnel information of the vendor, and a data structure associating the vendor information with a user authentication process information that identifies a user authentication process, with a user authentication process access privilege information based upon the vendor information, with a user authentication process status information, and with a user authentication version information.

Further, the present invention can be attained by a computer system to authenticate users of vendors providing services and/or products to the users, the system having a display screen configured to provide a graphical user interface comprising a navigation area containing selection locations to select vendor-defined user authentication processes and to select configuration information of the vendor-defined user authentication processes and at least one or more selection locations to select simulation of the vendor-defined user authentication processes, to select printing of the vendor-defined user authentication process information, to select auditing features in connection with the vendor-defined user authentication processes, and/or to select status information of the vendor-defined user authentication processes. Further, the configuration information is user authentication question configuration information.

Further, the present invention can be attained by a method of online definition of customizations of an online-user-authentication service provided on behalf of a vendor to authenticate users, associating the online user authentication service with the vendor that provides online transactions requiring authentication of the users, generating an online customized user authorization service according to the customizations, selecting/reviewing system development and implementation requirements to interface the vendor's online transactions with the generated customized online user authentication service, interfacing the vendor's online transactions with the generated customized online user authentication service, authenticating the users with the generated customized online user authentication service, evaluating performance data based upon authentications of the users, and online in real-time modifying the customizations to generate a modified customized-online-user-authentication service depending on the performance data.

Further, the present invention can be attained by a system to configure user authentication parameters, the system having a processor programmed to define as parameters of a user authentication process, authentication sub-processes, data sources, authentication question parameters and/or retry criteria. Further, the authentication sub-process parameter specifies criteria to determine information validation, fraud detection and identity verification levels. Further, the authentication question parameters specify types of authentication questions, query order, question priority, answer options, point assignments, authentication question grouping, group priority, time to answer, and language.

Further, the present invention can be attained by a method to authenticate a user, the method involving generating a user authentication request, determining a source of the authentication request, retrieving parameters associated with the source, retrieving data about the user from data sources according to the parameters and authenticating the user according to the user data and the parameters. Further, authenticating the user involves detecting fraud based upon the user data and authenticating the user based upon the user data. Further, authenticating the user involves generating automatically authentication questions based upon the parameters and the user data, querying the user with the generated authentication questions, and determining an authentication result based upon the parameters and data input by the user in response to the queries. Further, the generated authentication questions are questions having multiple choice answers, true-false, multi-select, and/or fill in the blank, as specified by the parameters. Further, the authentication result is determined by calculating a confidence score based upon the parameters assigning points to each generated authentication question. Further, the data of the user is retrieved from credit history, user profile, fraud, geographic, demographic, government supplied, political, biometric, and/or digital certificate data sources. Further, the parameters specify authentication question parameters, which specify types of authentication questions, query order, question priority, answer options, point assignments, authentication question grouping, group priority, time to answer, and language. Further, the authentication question parameters specify grouping of generated authentication questions according to a common association of the authentication questions and specify assigning points to each authentication question and/or each group of authentication questions. Further, equal points are assigned to each authentication question and/or each group of authentication questions. Further, variable points are assigned to each authentication question and/or each group of authentication questions. Further, the detection of fraud is based upon the user's facial patterns and mannerism during the authentication.

Further, the present invention can be attained by a method to authenticate a user, the method involving defining user authentication parameters online, associating the parameters with a source, generating a user authentication request, determining the source of the authentication request, retrieving the parameters associated with the source, retrieving data about the user from data sources according to the parameters and authenticating the user according to the data from the data sources and the parameters.

Advantages of the invention will be set forth in part in the description which follows and, in part, will be obvious from the description, or may be learned by practice of the invention.

BRIEF DESCRIPTION OF THE DRAWINGS

The advantages of the invention will become apparent and more readily appreciated from the following description of example embodiments, taken in conjunction with the accompanying drawings of which:

FIG. 17 is a display screen of the rules designer to set user authentication process options according to the present invention.

FIG. 18 is another display screen of the rules designer to set user authentication process options according to the present invention.

FIG. 24 is an example list of user authentication questions.

FIG. 25 is example question types according to the present invention

FIG. 28 is a display screen of the rules designer's testing and simulation manager according to the present invention.

FIG. 34 is another display screen of the rules designer's auditing tool according to the present invention.

FIG. 35 is another display screen of the rules designer's auditing tool according to the present invention.

DETAILED DESCRIPTION OF THE PREFERRED EMBODIMENTS

Figure 1:
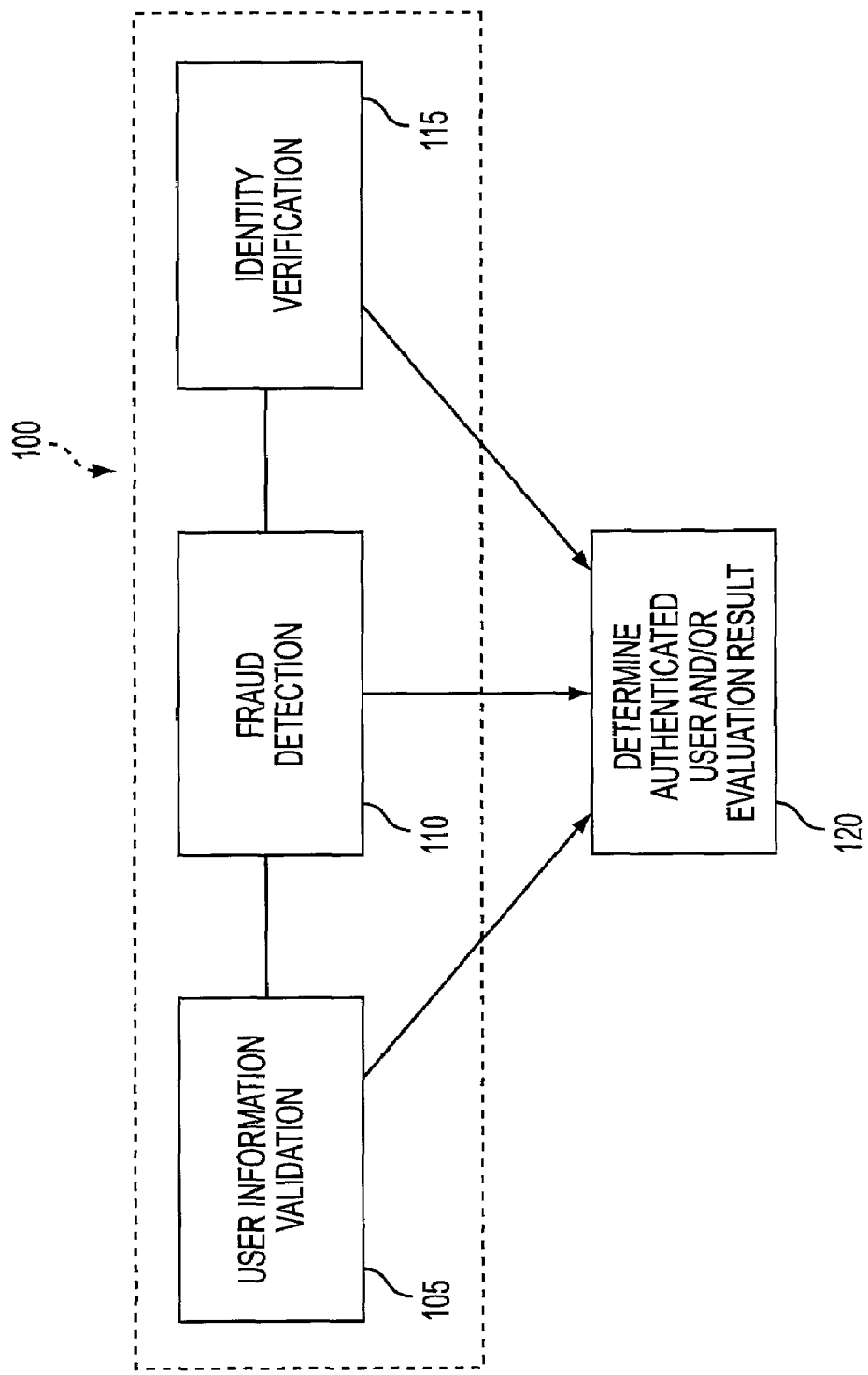
FIG. 1 is a flow chart of processes to authenticate a user in the invention.

Reference will now be made in detail to example embodiments of the present invention, which are illustrated in the accompanying drawings, wherein like reference numerals refer to the like elements throughout. The example embodiments are described below to explain the present invention by referring to the figures.

The present invention relates to user authentication. The following definitions in alphabetical order aid in understanding the description that follows, although the claims are not necessarily limited by these definitions.

The term "authenticated user" refers to a user for whom a user authentication process has been completed and for whom user authentication data (results) exist.

The term "authentication examination" refers to use of an "authentication process" to perform information validation, fraud detection and/or identity verification based upon data provided by a user and external data about and/or known to the user, to authenticate users for a business transaction and/or as part of strategy experimentation for a business transaction.

The term "authentication process" refers to a set of rules or parameters (methods/processes) to authenticate users for a business transaction, such as a purchase/sell transaction or an access transaction, and/or defining/embodying a strategy experiment for a business transaction.

The term "authorization process" refers to application of rules/policies established by a vendor to determine whether to provide access to an authenticated user, for example, access to a products service, and/or a facility.

The term "data agnostic" refers to being indifferent of data sources. In particular, the present invention provides a user authentication engine that is indifferent regarding use of data sources in authenticating the user.

The term "fraud detection" refers to a process of determining whether user information and/or a user can be associated with fraudulent activities.

The term "identity verification" refers to a process of comparing input user information with information about the user from data sources.

The term "information validation (preprocessing)" refers to a process of validating input user information for correctness, compatibility and/or formatting.

The term "products and/or services" refers to goods, information, services, and transactions, such as renewals, licenses, permits, etc., provided by a vendor.

The term "system/solution provider" refers to a provider of user-authentication products and/or services, such as computer systems, including software, and services in connection therewith, such as consulting, development, and implementation services. In particular, a "vendor" can be a customer of a system/solution provider such that the system provider's user-authentication products and/or services support the vendor's authorization process.

The term "user/consumer" refers to individuals and/or entities being authenticated by or on behalf of a "vendor."

The term "vendor" refers to any individual or entity desiring to authenticate users, such as (without limitation) suppliers of products and/or services, retailers, brokers, agents, governmental bodies, etc.

FIG. 1 is a flow chart of processes to authenticate a user in the invention. In particular, a user authentication process 100 authenticates a user in connection with a service or a business transaction provided (directly or indirectly) by a vendor. The user authentication process 100 can involve at least one or more (or any combination) of authentication sub-processes of (1) validating user information process 105, (2) detecting fraud regarding the user information 110, and (3) verifying identity of the user based upon the user information 115. At 120 an authenticated user is determined based upon the authentication sub-processes 105, 110 and/or 115.

In FIG. 1, more particularly, a user can be authenticated at 120 based upon user information validation 105, fraud detection 110 and/or identity verification 115 depending on authentication rules configured/defined by the vendor. Further, the authentication rules can be dynamically (real time) customized, thereby dynamically customizing authentication sub-processes 105, 110 and/or 115, including in-progress sub-processes. Therefore, an authentication system according to the present invention provides real-time editing, allowing one to modify authentication rules and/or place the authentication rules in production without having to take the system off-line.

Each authentication sub-process 105, 110, and 115 can be further defined as follows: validating user information 105 ensures correct/compatible data formatting. For example, if a telephone number area code is required, validation processing ensures that the area code data/field is completed/provided.

In FIG. 1, fraud detection 110 involves determining whether the user information can be associated with fraudulent activities. The invention can use third party fraud detection services, such as Trans Union's FRAUD DETECT, HAWK, HAWKEYE, TRANS ALERT and FACS+. These commercially available tools use input user information to provide a result, for example, a flag or score, indicating a possible fraudulent transaction/information. For example, FRAUD DETECT uses a variety of algorithms (over 600) to determine validity of user information, such as social security number (SSN), name, address, phone number, data of birth, drivers license number, credit card number and expiration date, and/or employer information. HAWK can identify input addresses, SSNs and telephone number that are fictitious or reported in previously suspected fraud activities. Further, in contrast to identity verification 115, which supports confirming identity of a user, fraud detection 110 typically does not involve checking/determining if the user inputting the information, such as SSN, corresponds to the SSN, but rather would confirm that known fraud has/has not previously been associated with the user-provided SSN.

In FIG. 1, identity verification 115 involves confirming identity of the user based upon what a user knows, what a user has and/or what a user is. For example, identity of a user can be verified based upon what a user knows by querying a user for information, receiving user information and/or input user information in response to the queries and comparing the input user information to information about the user from various data resources, such as, but not limited to, credit history, user profile, fraud, geographic, demographic, government supplied, and/or political, information and/or analyzing as the received user information, real-time user behavior and/or feeling information. In particular, the invention can automatically generate one or more authentication questions for the user and process input user information in response to the questions to authenticate the user. Further, the invention can use conventional technology to capture and analyze real-time user behavior and/or feeling data during input of the user information by/for the user. The real-time user behavior and/or feeling data can be, for example, according to facial pattern, mannerism, body movement, perspiration, anxiety, emotional, mental distress, and/or lie-detection techniques.

In FIG. 1, further at 115, identity of a user can be verified based upon what a user has by receiving input and/or provided user information and comparing the input and/or provided user information to various data resources storing information of the user. Input and/or provided user information can be personal identification documents presented in-person and/or input/electronically provided by a user, such as digital certificates, passport, birth-certificate, driver's license, etc. Further at 115, identity of a user can be verified according to what a user is by receiving a user's real-time and/or pre-stored biometric data, such as, but not limited to, fingerprint scan, retinal scan, keystroke patterns, face recognition, DNA analysis/matching, and comparing the input biometric data to various data sources storing biometric data of the user. Any conventional biometric technology can be used to capture and provide real-time user biometric information. In particular, identity verification 115 determines that a user being represented is actually the true individual, independent of past data/behavior associated with the individual, by actively interacting with the user regarding what a user knows by matching user-provided information against one or more questions where the correct answer is known, receiving information that a user has by matching the received information against one or more data sources storing the information of the user, and/or receiving information regarding what a user is by matching a user's real-time and/or pre-stored biometric data with data sources storing biometric data of the user. Advantageously, a multi-factor user authentication can be provided when a user authentication examination is based upon two or more of what a user knows, what a user has and/or what a user is, types of information.

In FIG. 1, an identity verification process 115 can support a multi-factor authentication process by examining a user based upon a single set of information relating to two or more of what a user knows, what a user has and/or what a user is. Although, the example description describes multi-factor authentication to support identity verification 115, the present invention is not limited to such configuration and such factors of what a user knows, has and/or is can be implemented as part of information validation 105 and/or fraud detection 110.

In FIG. 1, at 120, the invention can use results of authentication process 100 to either render an authorization decision (i.e., whether the user is authorized based upon authentication data from the authentication process 100) according to an authorization process, according to other predetermined or dynamically created authorization and/or business process criteria, or provide results of the authentication process 100 to the vendor for the vendor to authorize the user. Further, at 120 the invention can use results of authentication sub-processes 105, 110 and/or 115 to provide evaluation results, such as a confidence score, which can be used by the vendor to render an authorization decision.

Figure 2:
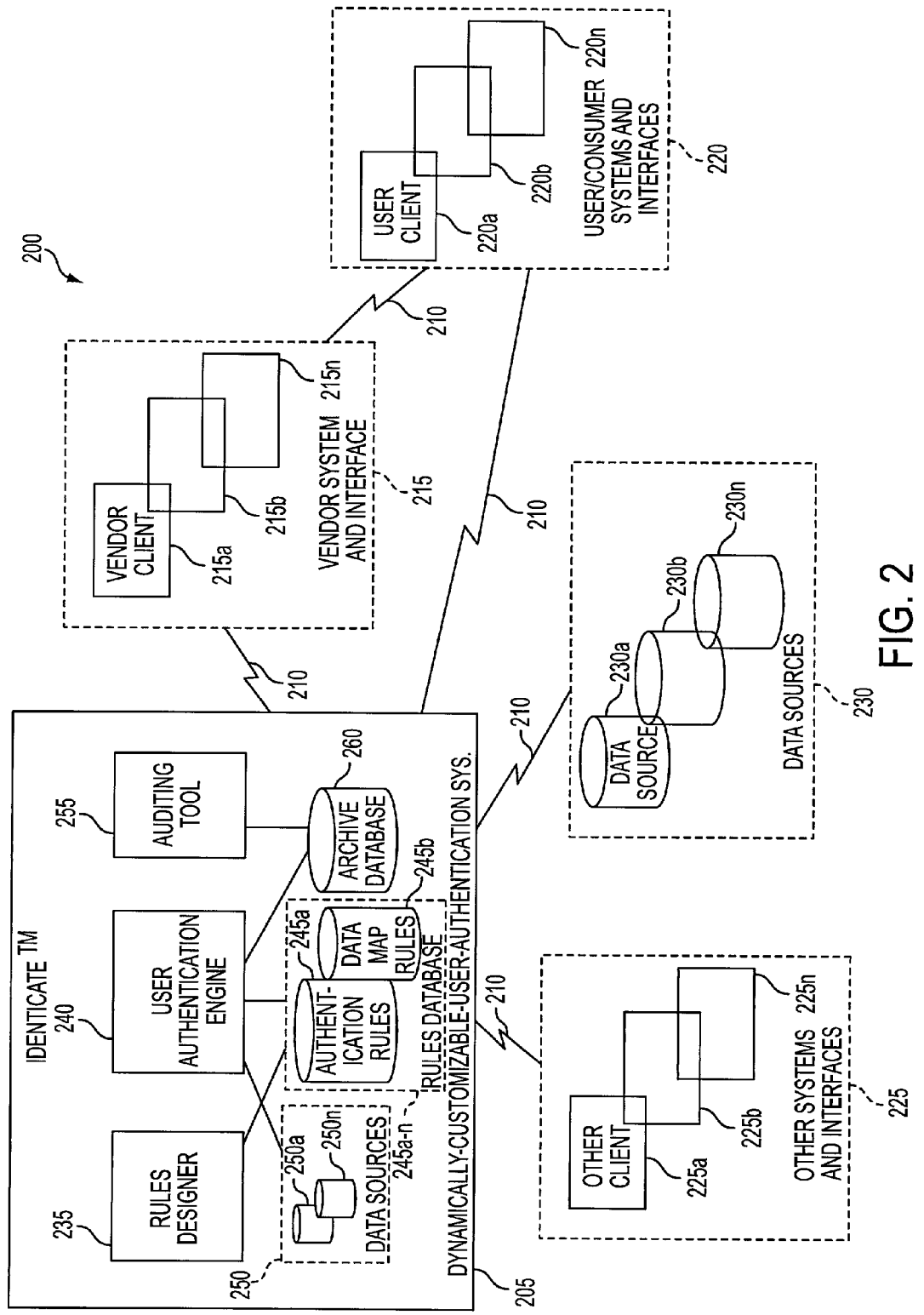
FIG. 2 is a block diagram of an example user authentication system according to the present invention.

FIG. 2 is a block diagram of an example user authentication system 200 according to the invention. The user authentication system 200 comprises a dynamically-customizable-user-authentication system 205 known as Identicate™, which is owned by American Management Systems, Inc., Fairfax, Va. (assignee of the present application) as a system/solution provider. The dynamically-customizable-user-authentication system (Identicate™) 205 can interface via network(s) 210 with various systems and data sources to perform user authentication processes 100. The dynamically-customizable-user-authentication system 205 can interface via network 210 with a vendor system/interface 215, a user interface 220, other systems/interfaces 225 and data sources 230.

In FIG. 2, the system 200 components can communicate via network(s) 210, which can be wire or wireless, having conventional (any suitable means well known in the art) topologies and conventional architectures. The architecture of networked system 200 can be, for example, client-server or a web-based, distributed architecture using conventional communication protocols. The network(s) 210 can be, for example, a local area network or a wide area network, such as the Internet, or a combination, using conventional communication protocols. Processes of the present invention are implemented in software, using, for example, Internet based technology, such as web browser technology, and the systems 205, 215, 220 and 225, and data sources 230 are computers that execute the processes of the invention. The computers 205, 215, 220, and 225 embodying the processes of the present invention can be conventional computers or computing devices capable of storing, displaying and processing information, and communicating with other computers and computing devices by receiving and transmitting information via the network(s) 210 using conventional techniques.

In FIG. 2, in an example embodiment of a networked client-server system 200, the vendor system/interface 215, the consumer/user interface 220, other systems/interfaces 225 and data sources 230 represent client computers 1–n that are in communication with the dynamically-customizable-user-authentication system 205 as a server computer via network(s) 210 using conventional Internet communication protocols and Internet document management techniques, such as Hyper Text Transfer Protocol Secure (HTTPS), Hyper Text Markup Language (HTML), and Extensible Markup Language (XML).

In FIG. 2, the dynamically-customizable-user-authentication system 205 comprises a rules designer 235, a user authentication engine 240, rules databases 245a–n, and internal, local, and/or vendor data sources 250. The rules designer 235 is a browser-based, administrative interface that supports real-time configuration/customization of user authentication processes 100. The rules designer 235 enables a vendor to create a user authentication process 100 configuration that is appropriate (customized) for the vendor's business needs (i.e., business transactions, such as selling furniture or issuing a driver's license). All vendor authorization/business requirements can be used as configuration information to configure/customize authentication processes 100. For example, the rules designer 235 creates user authentication rules database 245a. The authentication rules 245a specify configurations of the user authentication sub-processes 105, 110, and/or 115. Some example configurations (without limitation) include the types of questions asked a user, point value associated with a correct answer to the questions, total number of questions to be assessed, nature of presentation of questions (random, ordered, prerequisite behavior, etc.), specifying methods to calculate and interpret confidence scores, and specifying criteria to authorize the user, for example, based upon the confidence scores. If questions are multiple-choice type, the vendor can further configure parameters to specify desired number of items/choices in an answer list of the multiple-choice question. If a random behavior is selected, each separate invocation of Identicate may produce not only a different order of questions, but also a different order of choices within questions. Dynamically customizing components/levels of user authentication processes 100 provides means (step) for dynamically outpacing fraud trends of users.

In FIG. 2, the user-authentication engine (authentication engine) 240 is a software agent that uses the authentication rules 245a defined through the rules designer 235 to execute/perform the user authentication processes 100, including authentication sub-processes 105, 110 and 115, as follows. The authentication rules 245a can define/determine the procedures (processing flow) to authenticate a user. Based upon the authentication rules 245a, the authentication engine 240 can access and retrieve data from multiple internal (i.e., data sources maintained by a vendor) and external (i.e., third party) data sources 250 and/or 230, respectively. Such data sources can be, for example, third party credit history, user profile, fraud, geographic, demographic, government supplied, political, biometric, and/or digital certificate information. In particular, the authentication engine 240 can generate a user authentication examination based upon the authentication rules 245a by using user's information from data resources 230 and/or 250, such as a user's credit history, to determine questions, to determine answers to be provided by the user, to determine how the questions are asked, to evaluate the user's response to the questions and to inform the vendor of such evaluation. According to the vendor's user authorization process 100, another authentication examination or another level/component of the authentication examination can be generated depending on evaluation of a user's response to an authentication examination, providing a vendor-customized multi-step authentication. In particular, the vendor can specify criteria as authentication rules 245a to control such multi-step authentication.

In FIG. 2, the vendor system 215 interfaces with users in support of supplying products/services to users and/or in support of the vendor's authorization processes to authorize users to receive the products/services. The products/services can be any online business transaction, such as selling consumer goods like a couch, books, computer, or issuance of driver's licenses by a government agency, or allowing access to auction services. Online business transactions include transactions where a user appears in person and the vendor uses the vendor system 215 to provide the products/services to the user (e.g., a Motor Vehicle Administration renewing licenses). A vendor can use the rules designer 235 to dynamically generate the authentication rules 245a. More particularly, the authentication rules 245a contain the specified process flow dictated by the vendor's user authorization process. Therefore, the authentication engine 240, which authenticates according to the authentication rules 245a, can be fully customizable, including dynamically customizable, per vendor specifications via providing rules designer 235 at a higher level of abstraction in relation to the authentication engine 240 as follows. For example, a vendor that requires user authentication can independently, efficiently and cost effectively customize the authentication sub-processes 105, 110 and/or 115 of the vendor's user authentication processes 100, which support the vendor's authorization process. The vendor can dynamically customize authentication processes 100 depending on business needs/requirements without engaging resources, such as a system/solution provider to modify/customize the vendor's user authentication processes 100. Of course, the vendor can engage a system/solution provider to use the rules designer 235 to dynamically develop and/or manage on behalf of the vendor custom user authentication processes 100.

In FIG. 2, by providing the rules designer 235 at a higher level of abstraction in relation to the authentication engine 240, the rules designer 235 can manage user authentication processes 100 according to each vendor (i.e., on a vendor by vendor basis) by associating each defined user authentication process 100 to a vendor. In particular, Identicate allows assignment of vendor user accounts and access privileges (e.g., modification, view, etc.) for each user authentication process 100, which control/manage access to user authentication processes 100 by an individual (e.g., vendor's employee and/or agents) and/or organization (e.g., a vendor's department). For example, the rules designer 235 can provide security measures by restricting access to defined user authentication processes 100, which require a name and password to access the processes 100. The rules designer 235 can also efficiently and simply associate various levels/components of each user authentication process 100 with vendor access privileges. A vendor's organization information, such as (without limitation) organizations, departments and/or individuals, can have defined access or security privileges to access user authentication processes 100, including, for example, permission to define (or select from) only certain data sources 230 and/or 250 to be accessed when authenticating users based upon a user authentication process 100 of the vendor (i.e., maintain which data sources a vendor has access to within an authentication process 100 and across all of the vendor's authentication processes 100). Therefore, the system 200 securely accommodates two or more vendors' user authentication processes 100 according to the vendors' organizational information.

In FIG. 2, the dynamically-customizable-user-authentication system 205 further comprises an auditing tool (transaction locator/reporter) 255 and a master archive database 260. The master archive database 260 stores/archives authentication transaction history information. Authentication transaction history refers to data from a user authentication process 100 in connection with a business transaction (i.e., an authentication session). In particular, in an example implementation, the auditing tool 255 is a browser-based administrative tool that allows a vendor to review and monitor an authentication transaction, which is history data/results from a user authentication process 100 authenticating a user, by accessing the archive database 260. Further, the auditing tool 255 can report in real-time on an in-progress user authentication process 100 (i.e., an authentication session). For example, the auditing tool 255 can display statistics associated with a defined user authentication process 100 (i.e., a user authentication process 100 according to a defined authentication rule 245a). Such statistics can be, for example, number of people authorized per month, number of times a particular question was answered correctly or incorrectly, and evaluation of user-selected answers. The auditing tool 255 advantageously allows vendors to monitor (dynamically or based upon authentication transaction history) user authentication processes 100 for assessment and improvement to outpace fraud trends. A vendor can use the rules designer 235 to change associated authentication rules 245a of a user authentication process 100 to change the user authentication process 100 as needed/required.

In FIG. 2, the master archive database 260 can also be an archive of user-provided information when authenticating users based upon a user authentication process 100, such as personal/demographic data, question/answer list of the user authentication process 100, and user-selected/input answers. The type and/or quantity of archived user-provided information can be varied according to each vendor and according to each user authentication process 100 of each vendor and reported accordingly via the auditing tool 255, which accommodates situations such as, but not limited to, compliance with consumer privacy laws. For example, the archive 260 can be used as reconciliation data by comparing user authentication results with identified problem user cases from the vendor's other systems managing user information and/or business transactions. The reconciliation data can be used to assess a particular user authentication process 100 to improve/change the user authentication process 100 by changing the associated authentication rules 245a via the rules designer 235.

Figure 3:
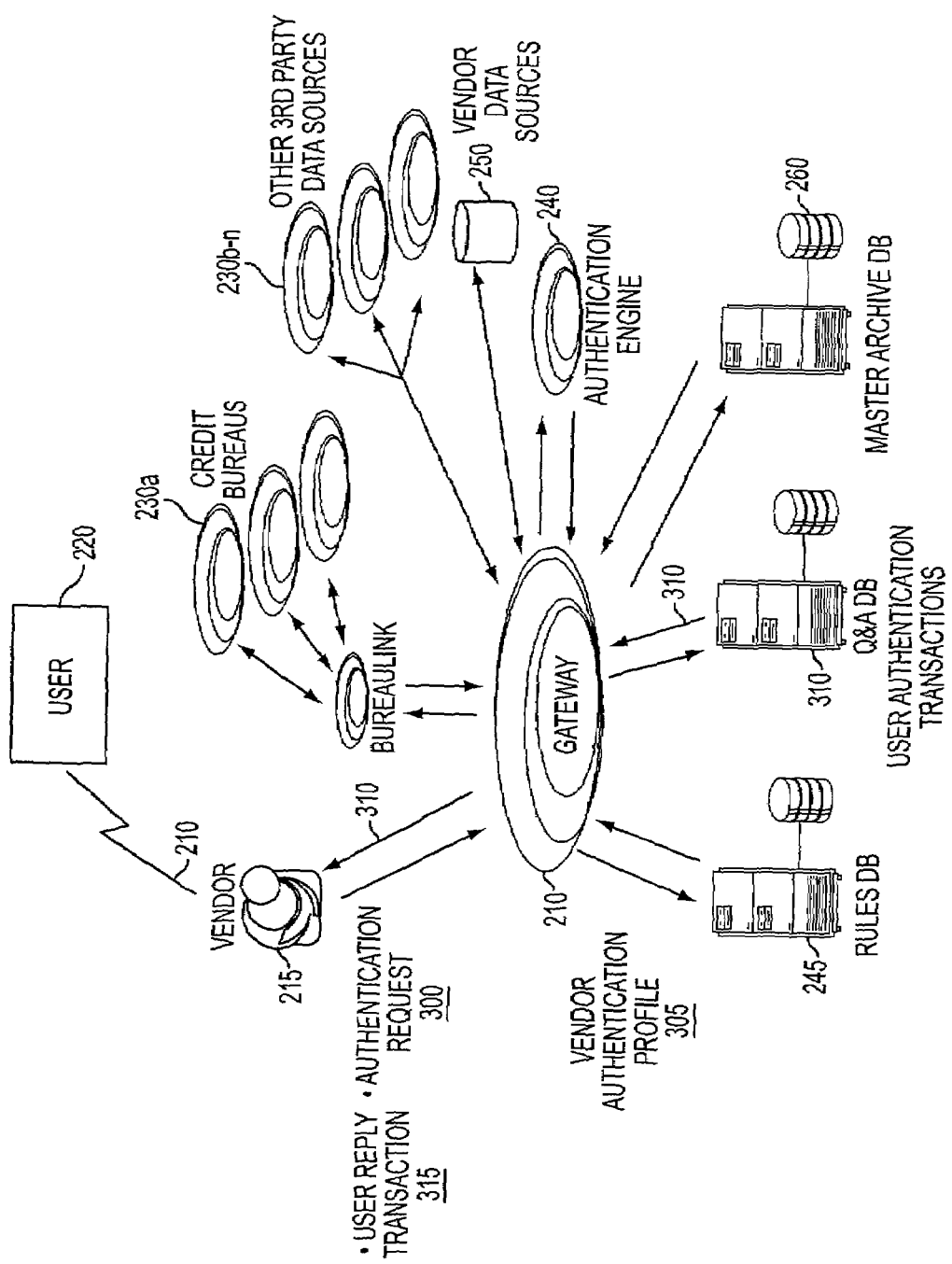
FIG. 3 is a diagram illustrating operation of the user authentication system according to the present invention.

FIG. 3 is a diagram illustrating operation of the user authentication system 200. A user at user-client terminal 220 requires authentication in connection with a service and/or business transaction provided by a vendor. The vendor system 215 can communicate via network(s) 210 with the user terminal 220 using Internet based technology, such as a website, to provide a user interface. The vendor system 215, such as call center (not shown) operated by the vendor and in communication with the user terminal 220, directly, or indirectly via the user terminal 220, initiates an authentication request 300 to Identicate via network(s) 210. The network(s) 210 can be, for example, a private Intranet or other private network operated by the vendor and/or a system/solution provider, such as the network commonly known as NetCredit Gateway™ managed by American Management Systems, Inc. (assignee of the present application). Although in the example online business transaction description a user is at a user-client terminal 220, the present invention is not limited to such configuration and for an online business transaction a user may be physically present at a vendor location, so that a vendor can authenticate the user using Identicate. In particular, in such alternative configuration, the user may not directly interact with a user authentication examination and the vendor would conduct the user authentication examination via the vendor system 215 by requesting and inputting user-provided information. A user authentication examination under any configuration of the user authentication system 200 can be based upon two or more types of user-provided information of what a user knows, what a user has and/or what a user is.

In FIG. 3, the authentication request 300 can include typical information initially collected by the vendor from the user to begin authentication, such as name, address, social security number, etc., according to the vendor's authorization process. The authentication engine 240 receives the request 300 via network(s) 210 and retrieves a vendor authentication profile 305 associated with the request 300 from the rules databases 245. Therefore, the vendor authentication profile 305 is source and authentication process 100 specific, the source being the vendor and an authentication process 100 associated with the vendor. More particularly, the vendor authentication profile 305 is based upon the rules databases 245, such as the authentication and mapping rules 245a, 245b, associated with the vendor's authentication processes 100. The vendor authentication profile defines/customizes the authentication sub-processes 105, 110 and 115 of authentication processes 100 according to vendor's authorization needs/requirements. For example, the vendor authentication profile 305 can specify the types of authentication questions, such as multiple choice and true/false, types of answers, point and answer time assignments for each question, and tracking of the user authentication session time.

In FIG. 3, after retrieving the vendor authentication profile 305, the authentication engine 240 retrieves user-specific data by accessing various internal data sources 250 and/or external data sources 230 according to the vendor authentication profile 305. In particular, Identicate is data agnostic as follows: Identicate uses the vendor authentication profile 305, which dynamically customizes the authentication sub-processes 105, 110 and 115 of user authentication processes 100 by being at a higher level of abstraction in relation to the authentication engine 240. Further, Identicate is data agnostic by dynamically retrieving, according to the vendor's requirements, data from both internal (vendor's) data sources 250 and external data sources 230, such as credit history, user profile, fraud, geographic, demographic, government supplied, political, biometric, and/or digital certificate information. The authentication engine 240 uses user-specific data retrieved from the data sources 230 and/or 250 and the vendor authentication profile 305, to generate and store in database 310 user authentication transactions (i.e., user authentication examinations generated based upon customized rules). For example, the user authentication database 310 can include generated questions and answers for the authentication sub-process 115 to positively verify identity of the user.

In FIG. 3, the authentication engine 240 via network(s) 210 transfers to the user terminal 220 the generated user authentication transaction (examination) 310. The user authentication transaction 310 can be, for example, implemented using Internet technology, such as a web page, to interface with the user. The authentication engine 240 receives and evaluates the user's information from the authentication sub-processes 105, 110 and/or 115 in a user reply transaction 315 and stores the reply transaction 315 information and any authentication results in the master archive database 260. The user's information from the user terminal 220 can be, for example, the user's answers to authentication questions, real-time and/or pre-stored user biometric data, real-time user behavior and/or feeling data, digital certificate, authentication session time information, etc. Authentication evaluation based upon the user reply transaction 315 information depends upon the customized vendor authentication profile 305 and can include, for example, calculation of a confidence score and informing the vendor and/or the user in a authentication reply transaction 320, or rendering an authorization decision according to an authorization process and informing the vendor and/or the user in the authentication transaction 320, or performing additional authentication processes 100 depending on the confidence score according to the authentication rules 245a as configured/customized by the vendor.

Figure 4:
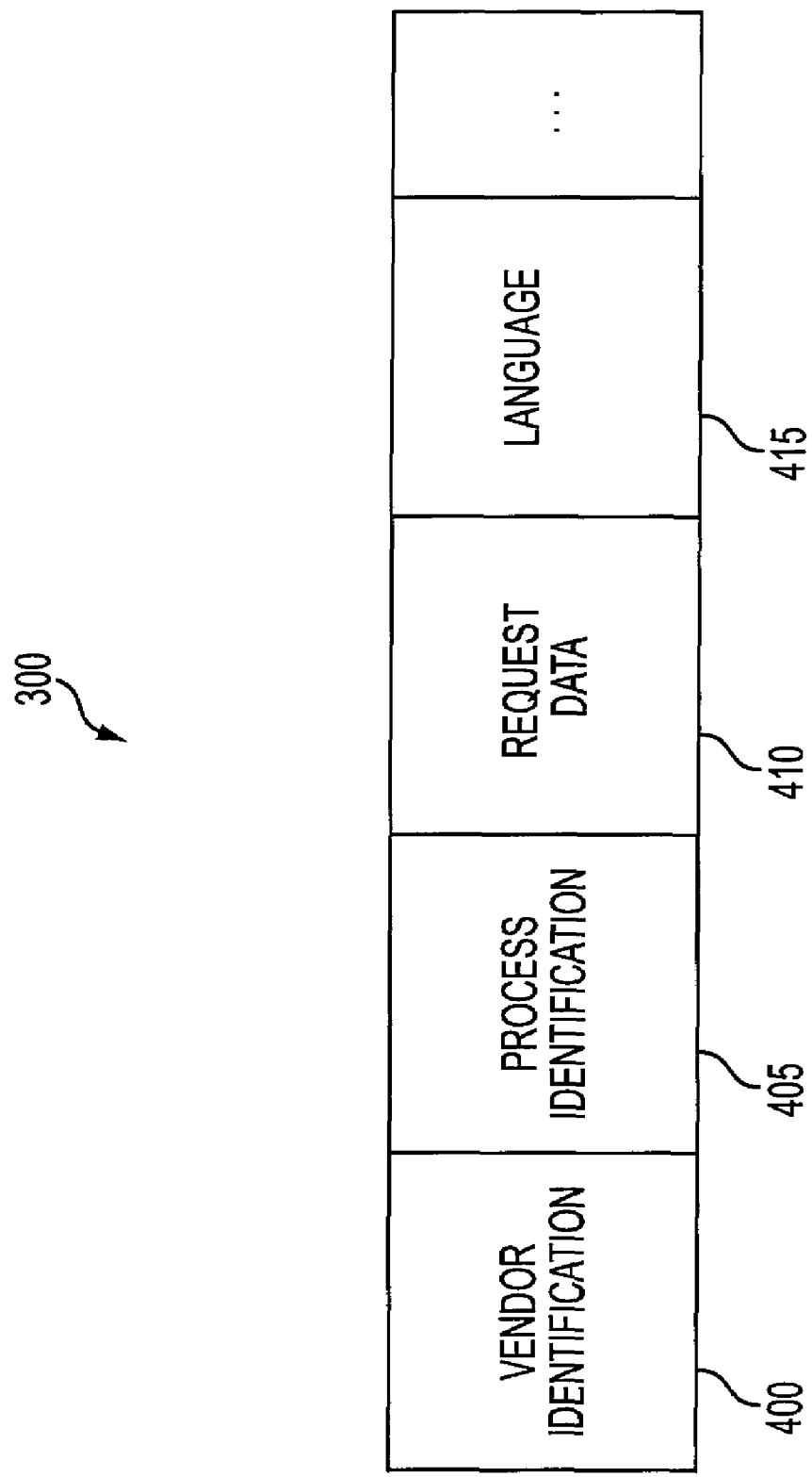
FIG. 4 is a data structure diagram of an authentication request according to the present invention.

FIG. 4 is a data structure diagram of the authentication request 300. The authentication request 300 comprises vendor identification 400 and process identification 405. The vendor identification 400 is used to retrieve vendor authentication profile 305 from rules databases 245. Advantageously, the vendor identification 400 allows real-time customization of vendor's user authentication processes 100 via real-time update of the rules databases 245 using the rules designer 235. The process identification 405 identifies a particular vendor's user authentication process 100 to be processed by Identicate. Therefore, with Identicate each vendor can have two or more different authentication processes 100 to authenticate users in support of one or more vendor's business transactions.

In FIG. 4, the authentication request 300 further comprises request data 410, which contains authentication request information, such as initial data collected about a user to be authenticated. The authentication request 300 can further comprise language information 415, which specifies language when processing a user authentication process 100. For example, if the language information 415 specifies "French," the user interface at user terminal 220 to authenticate a user would be in French, including any authentication questions and answers as part of identity verification 115. Other request information may be included in the authentication request 300.

Figure 5:
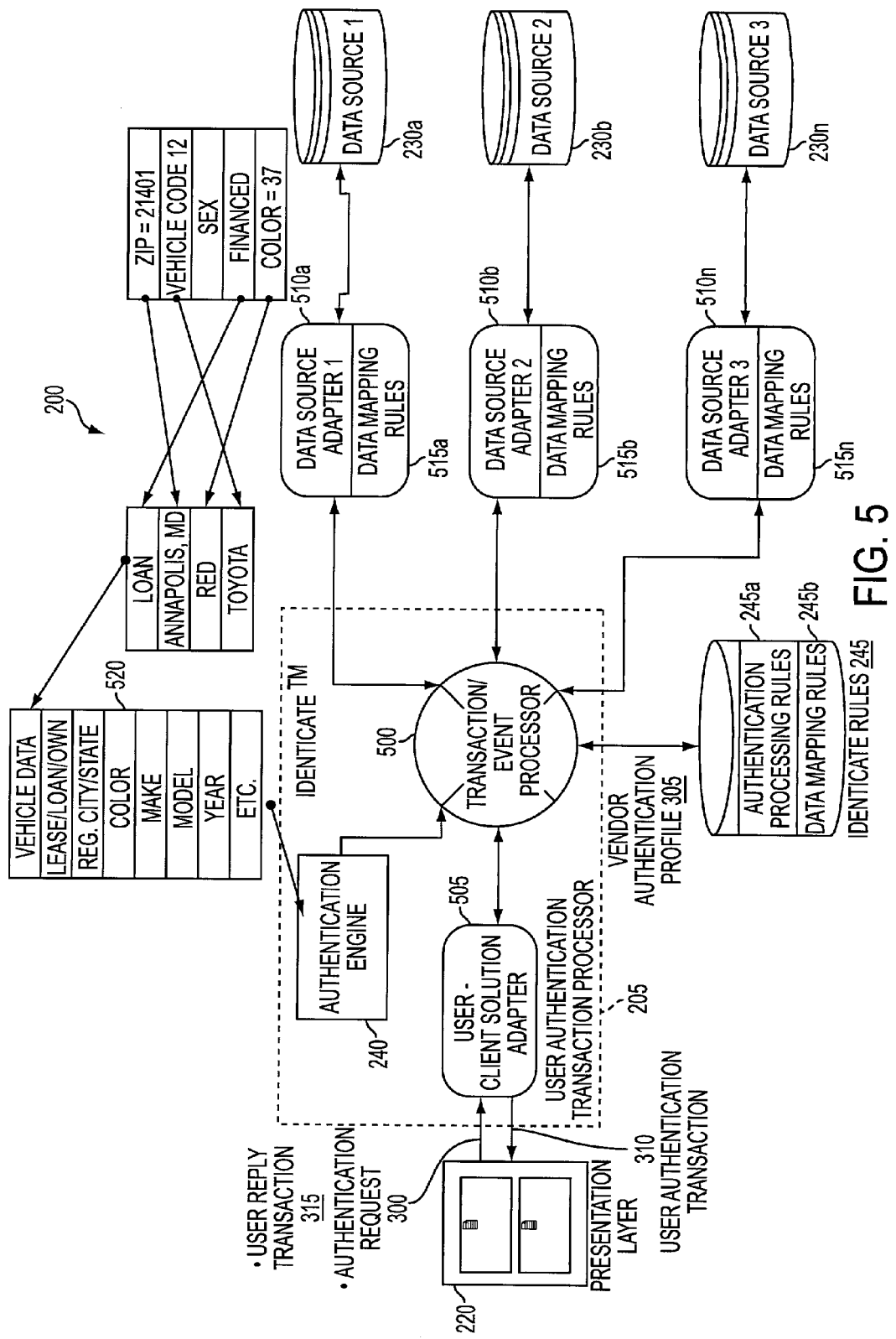
FIG. 5 is a more detailed block diagram of the user authentication system in FIG. 2 according to the present invention.

FIG. 5 is a more detailed block diagram of user authentication system 200 according to the present invention. The dynamically-customizable-user-authentication system 205 further comprises a central transaction/event processor 500, which handles communication between components of the Identicate architecture to support the data agnostic functionality and efficient processing. An authentication request 300 is initiated by presentation layer software of the user-client terminal 220 and sent to the authentication engine 240 via the user-client solution adapter 505. The user-client solution adapter 505 standardizes all authentication requests 300 for use by Identicate. The authentication engine 240 accesses the rules databases 245 to generate a vendor authentication profile 305, which determines data sources 230a–n (and/or 250a–n not shown) associated with the given authentication request 300.

In FIG. 5, using data sources 230 as example data sources, requests for data are sent to the respective data source adapters 510a–n, which translate generic requests into the format/construct required by the data sources 230a–n, respectively. The data source adapters 510a–n accommodates various differences in protocols, hardware platforms, security levels, etc. between Identicate and data sources. The data source adapters 510a–510n receive replies from data sources 230a–230n, respectively, where similar reverse translations again occur, particularly mapping some/all of the data into formats (standard reply transactions) consistent/compatible with known global data constructs of authentication engine 240. In particular, data source adapters 510 map data between data sources 230a–n and data constructs of authentication engine 240 according to respective data mapping rules 515a–n. Alternatively, the data mapping rules can be defined and stored in a centralized data mapping rules database 245b by the rules designer 235. Advantageously, Identicate is data agnostic by using data mapping rules 245b and/or 515a–n to retrieve data from both internal (vendor's) data sources 250 and/or external data sources 230. In particular, a vendor can use rules designer 235 to specify data sources 230 and/or 250 for each user authentication process 100 being defined/configured by/for the vendor.

FIG. 5 illustrates an example data mapping for vehicle information received from a data source 230, then translated into a format required by authentication engine's 240 data construct 520, then sent to the authentication engine 240, and loaded into data construct 520. In particular, in FIG. 5 the data construct 520 is an example vehicle data construct. The authentication engine 240 uses the vendor authentication profile 305 to associate the vendor's user authentication rules 245a and data mapping rules 245b with each data type (data construct) 520 known by the authentication engine 240, such as vehicle data. The authentication engine 240 also associates a standard reply transaction from data sources 230a–n with each data type 520 known by the authentication engine 240. Upon receiving a standard reply transaction for a given type of data, the authentication engine 240 loads the engine's respective data construct 520.

In FIG. 5, the authentication engine 240 uses the data constructs 520, which are loaded with the user's data from the data sources 230 and/or 250 and loaded with the vendor's authentication profile 305 from the vendor's user authentication rules database 245a, for evaluation and/or generation of a user authentication process 100. In particular, once the authentication engine 240 receives all data from data sources 230 and/or 250 and the appropriate authentication examination, such as fraud detections and questions have been determined, a user authentication transaction 310 is sent back, via the user-client solution adapter 505, to the user-client terminal 220 to present to/for the user an authentication process 100.

Figure 6:
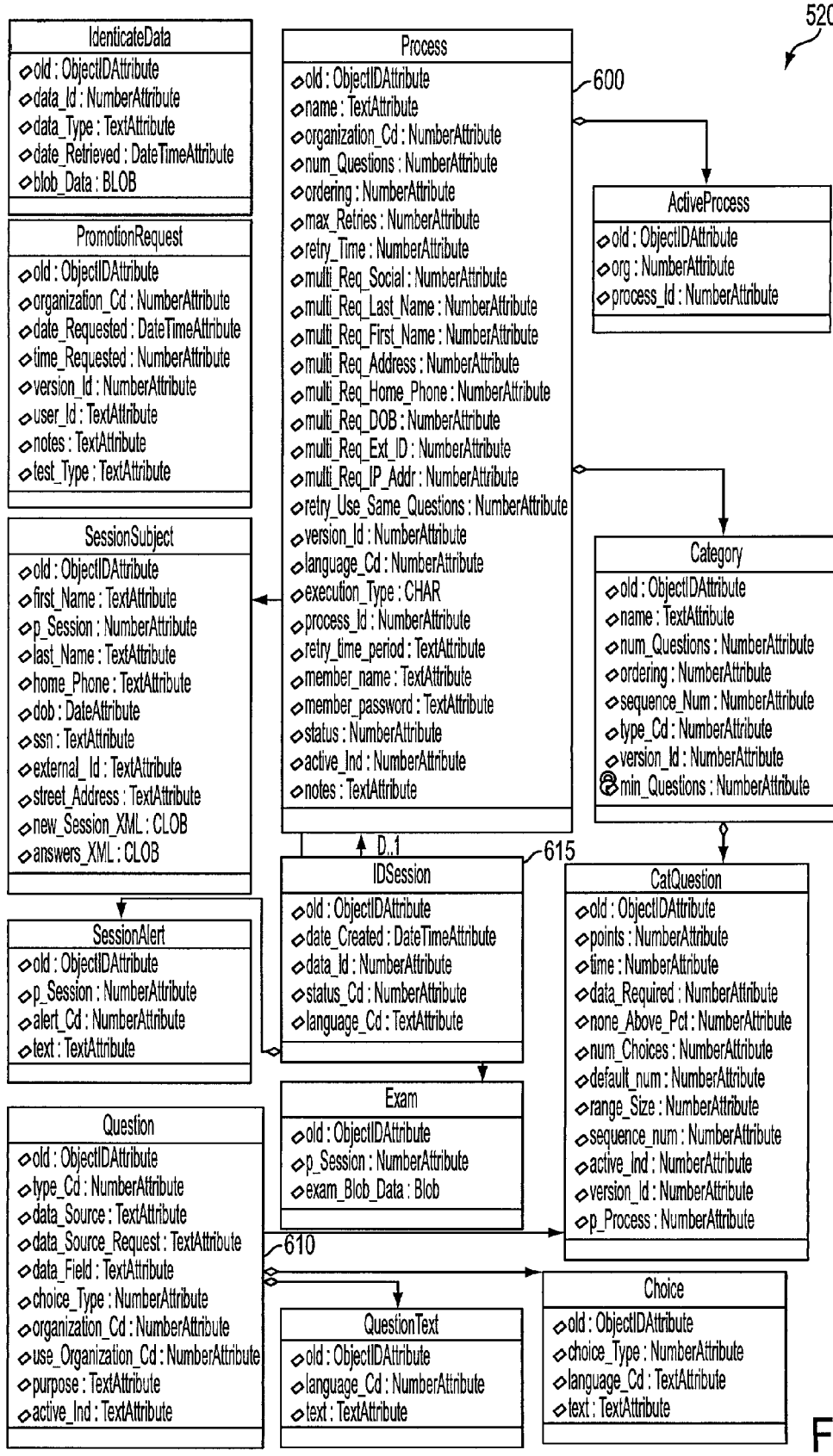
FIG. 6 is a data model of an authentication system according to the present invention.

FIG. 6 is an example data model (data constructs/mapping modules) 520 of the authentication system 205 and leveraged by the authentication engine 240. The data model 520 are mapping modules that map and store the rules databases 245 so that the data model 520 supports both the rules designer 235 and the authentication engine 240. In particular, the data model 520 is at a higher level of abstraction in relation to the authentication engine 240, thereby the authentication engine 240 being dynamically (real-time) customizable by isolating user authentication process 100 parameters in the data model 520 (i.e., isolating rules 245a–n). Such parameters can include (without limitation) security, compliance, management, and transaction parameters. For example, security parameters can relate to authentication process 100 access privileges. Further, compliance parameters can relate to controlling compliance with applicable laws/regulations. For example, compliance parameters can allow a vendor to control quantity and/or type of user information (e.g., reconciliation data) archived in the archive database 260 to comply with applicable consumer privacy laws and/or can allow a vendor to manage user authentication processes 100 (e.g., data sources and/or authentication questions to be excluded from a user authentication examination for a particular business transaction) to comply with applicable laws. Further, the management parameters can relate to authentication question parameters 610 to manage an authentication examination. Further, the transaction parameters can relate to session parameters 615 to manage authentication sessions of an authentication process 100.

With reference to FIG. 6, the data model 520 allows automated/real-time promotion of the rules 245a–n as follows: Data model 520 comprises process table 600 with process_id and status fields. The authentication engine 240 checks these two fields at a configurable interval (e.g., every x minutes and/or every x transactions). Every authentication request 300 (shown in FIG. 4) has the process identification 405, which identifies a set of authentication rules 245a and/or data mapping rules 245b to apply for the transaction. Based on the interval, the authentication engine 240 can periodically request the record in this table to check the process_id and status fields. If the status field indicates that the applicable rules 245a–n for the process_id have changed, the authentication engine 240 re-loads the rules from the rules databases 245 before processing the authentication request transaction 300, thereby dynamically customizing the authentication engine 240. Although, the present invention is not limited to this example embodiment of dynamic customization of the authentication engine 240 by a vendor between authentication request transactions 300, and the authentication engine 240 may be dynamically customized, for example, to modify in progress authentication sub-processes 110 and/or 115 (i.e., during interaction with the user).

Figure 7:
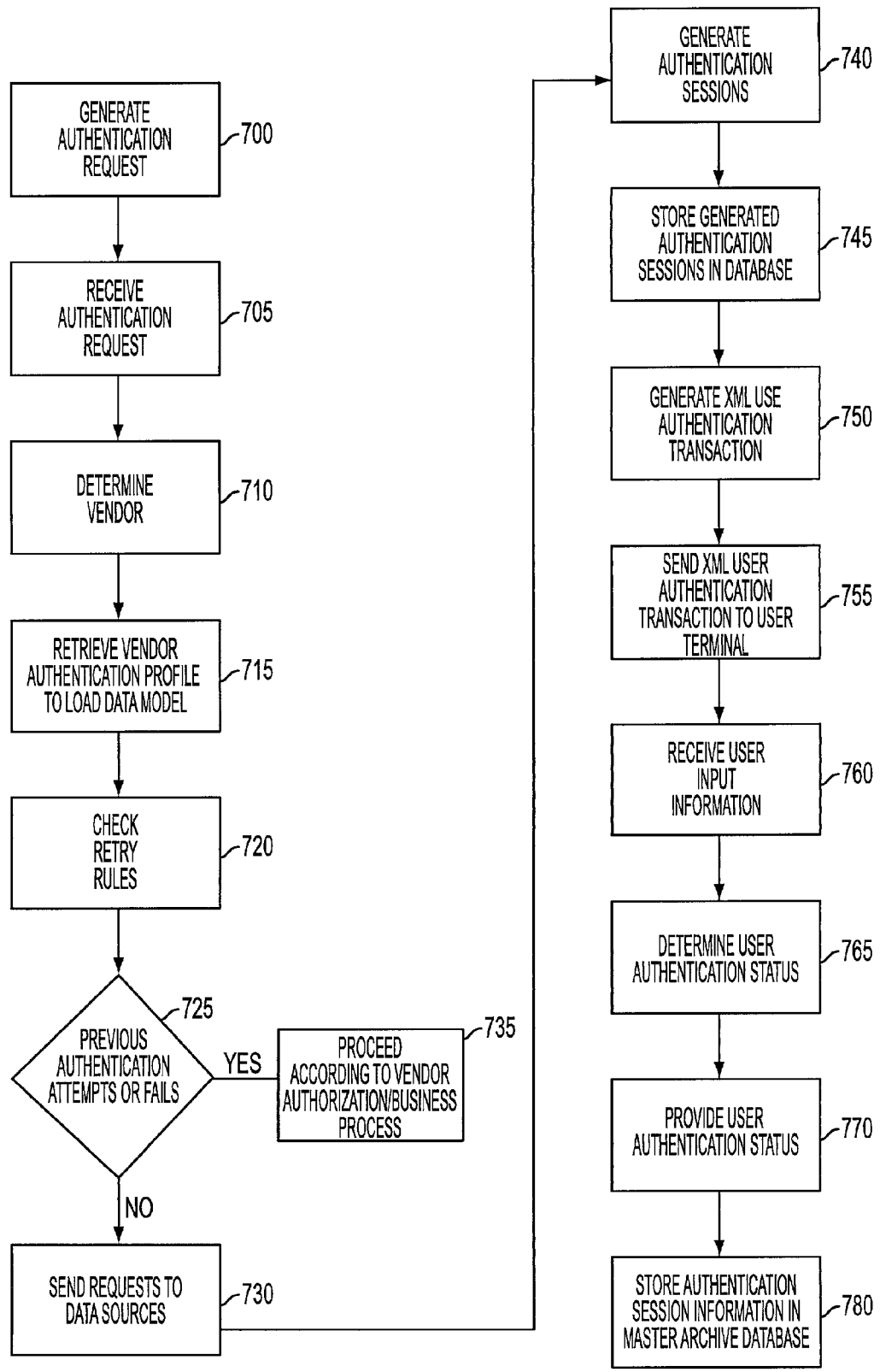
FIG. 7 is a more detailed flow chart of processes to authenticate a user in the invention.

FIG. 7 is a more detailed flow chart of processes to authenticate the user with system 200 of the present invention. At 700, an authentication request transaction 300 is generated. The authentication request 300 can originate from a website providing an interface with the user at the user-client terminal 220 either directly by the vendor system 215 or indirectly through a call center in communication with the vendor, or otherwise as initiated by a vendor to authenticate a user (e.g., by a Motor Vehicle Administration during license renewal). At 700, the website for initiating authentication requests 300 can be operated by the vendor and/or by a system/solution provider, such as American Management Systems, Inc., Fairfax, Va. (assignee of the present application). In particular, Identicate can interface directly with the vendor's existing applications via the user-client solution adapter 505 to perform user authentication processes 100.

In FIG. 7, at 705, the authentication engine 240 receives the authentication request 300 via network 210. At 710, the authentication engine 240 determines the vendor (source) of the authentication request 300 based on the vendor identification 400 (FIG. 4) of the authentication request 300. At 715, the authentication engine 240 accesses the rules databases 245 to retrieve vendor authentication profile 305 and to load the data model 520 with the vendor authentication profile 305. In particular, the data model 520 can now be used to determine the authentication rules 245a and/or mapping rules 245b set up corresponding to both the vendor identification 400 and the process identification 405. Therefore, Identicate accommodates customization of rules 245a–n corresponding to each vendor as well as accommodates custom rules 245a–n corresponding to various vendor authentication processes 100.

In FIG. 7, at 720, the authentication engine 240 checks the retry rules set up for the vendor. Alternatively, the vendor identification 400 and process identification 405 can be used to set retry parameters of frequency and time. At 725, the authentication engine 240 checks the master archive 260 to determine if the user has previously completed or attempted any authentication sessions. In particular, for example, the authentication request 300 is compared against the master archive database 260 using one or more of the following example input fields as parameters: Last/First Name, Street Address, Social Security Number (SSN), Vendor Identification and Date of Birth. For example, the authentication retry rules can limit a user's authentication based on the number of times that a user can retry an authentication process 100 within a certain period of time.

In FIG. 7, if at 725 the user has not previously exceeded an allowed number of attempts of an authentication session or failed the allowed number of previous authentication sessions, at 730 the authentication engine 240 sends data retrieval requests to the appropriate data sources 230 and/or 250 based on the rules 245a–n set up for the vendor. For example, the authentication engine 240 can use the question table 610 of the data model 520 to determine data sources 230 and/or 259 and data elements that correspond to each question that the vendor has specified via the rules designer 235. The authentication engine 240 sends separate requests to each data source 230 and/or 250. Identicate leverages various components to retrieve data from both internal 250 and/or external sources 230 (e.g., vendor information databases, credit history, user profile, fraud, geographic, demographic, government supplied, political, biometric, and/or digital certificate information data sources, etc.). The data sources 230 and/or 250 reply to the data retrieval requests by providing the requested data to the authentication engine 240. Because the vendor-customized authentication rules 245a can customize the authentication engine to access multiple data sources and/or to simultaneously access multiple data sources and/or to sequentially access multiple data sources, Identicate can provide multi-factor user authentication, multi-data source user authentication, and/or multi-step user authentication within a user authentication session. More particularly, sequential access to multiple data sources may reduce data source access fees/charges whereas simultaneous access to multiple data sources may increase speed and efficiency, which may be configured accordingly by a vendor depending on applicable authorization processes.

In FIG. 7, if at 725 the user has previous or failed authentication sessions of sub-processes 105, 110 and/or 115, the system 200 at 735 can proceed according to the vendor's authorization process requirements. For example, the user's business transaction may be terminated and/or the user may be forwarded for additional authentication processing, according to the authentication process 100 as configured by the vendor using the rules designer 235. For example, as part of additional authentication processing, the vendor can generate another authentication request 300 to invoke a different user authentication process 100.

In FIG. 7, at 740, the authentication engine 240 analyzes the retrieved data from 730 to determine/generate an appropriate authentication process 100 (i.e., authentication sub-processes 105, 110 and/or 115) based upon the authentication rules 245a for the vendor. For example, the authentication engine 240 can use the question table 610 of the data model 520 corresponding to the vendor and the vendor's process identification 405. The question table 610 reflects the authentication rules 245a for determining, based upon the retrieved data, which authentication questions and corresponding multiple choice answers can be generated.

In FIG. 7, at 745, the authentication engine 240 stores the generated authentication process 100 in the user authentication transaction database 310 as a user authentication transaction. For example, at 745, based on the generated authentication questions, the authentication engine 240 stores the generated authentication questions in the database 310.

In FIG. 7, at 750, the authentication engine 240 generates an Extensible Markup Language (XML) based user authentication transaction 310 to send to the user-client terminal 220. In particular, for example, the authentication engine 240 generates an XML authentication question and answer set for the user. While the example embodiment uses an XML Internet document format, the present invention is not limited to XML and other Internet document formats can be used, such as Standard Generalized Markup Language (SGML) and Hyper Text Markup Language (HTML).

In FIG. 7, at 755, the authentication engine 240 routes the XML based user authentication transaction 310 via network 210 to the requesting user-client terminal 220. For example, the authentication engine 240 sends the generated authentication question and answer to the user-client terminal 220 so that the user can answer the questions. After the user completes the questions, the answers are returned to the authentication engine 240.

In FIG. 7, at 760, the authentication engine 240 receives via network 210 the user's input information in response to the user authentication transaction 310. At 765, the authentication engine 240 analyzes the received information to determine a user authentication status, such as pass, fail, confidence score, etc. In particular, for example, the authentication engine 240 receives the user's answers to the questions and compares the user's answers against the answers provided by the data sources 230 and/or 250. At 765, the authentication engine 240 can generate/calculate a confidence score based on the number of correct answers.

In FIG. 7, at 770, the authentication engine 240 provides to a requesting system, such as the vendor system 215, a system/solution provider system 225 and/or Identicate, the authentication status of the user. For example, the authentication engine 240 can return a calculated confidence score to the vendor system 215, in which case the vendor system 215 (requesting system) will evaluate the confidence score and determine a final authentication status for the user according to the vendor's authorization process, such as whether the user passes or fails authentication and/or additional authentication process 100 is performed during the current authentication session. Such additional authentication processing 100 could include generating another authentication examination based upon data retrieved from data sources 230 and/or 250 that differ from the data sources 230 and/or 250 used to generate the previous examinations. In particular, advantageously any additional authentication process 100 is vendor configurable/customizable according to an authorization process using the rules designer 235 and reflected in the rules databases 245. At 780, the authentication session information is stored in the master archive database 260.

Figure 8:
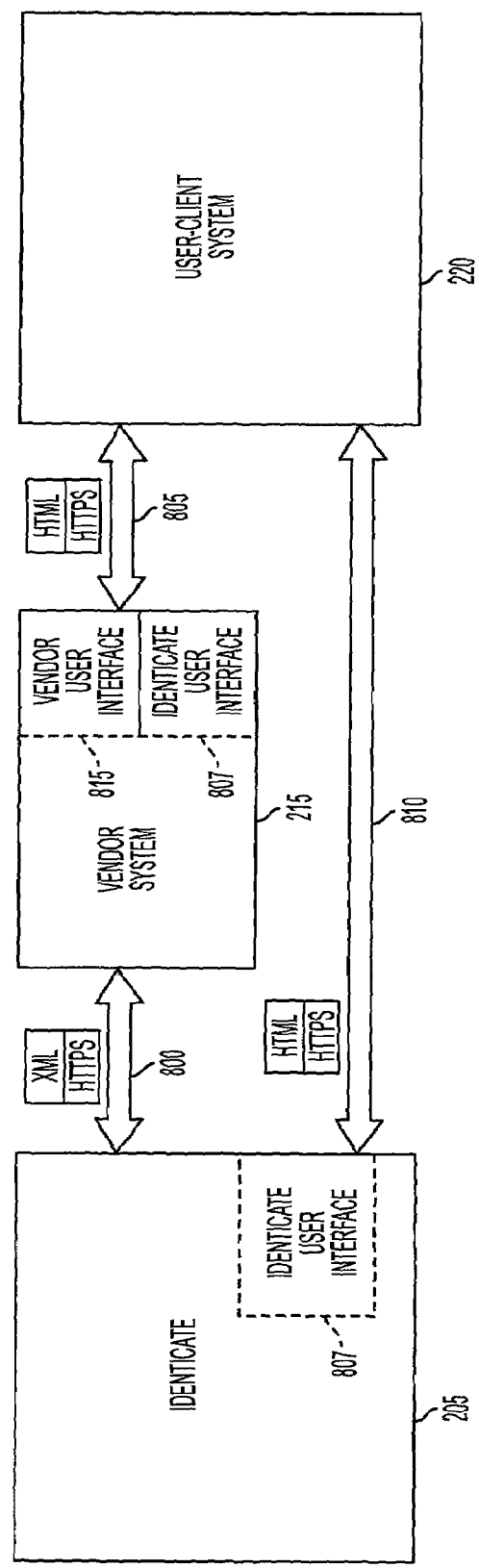
FIG. 8 is a diagram illustrating communications methods between a vendor system and a user authentication system according to the present invention.

FIG. 8 is a diagram illustrating communications methods between Identicate 205 and the vendor system 215. Identicate 205 supports a dual connectivity option between itself and the vendor system 215 as follows. The dynamically-customizable-user-authentication system 205 and the vendor system 215 can exchange data in a business-to-business transaction via the communication path 800 as well as via the user-clients system's 220 web server via communication paths 810. More particularly, communication path 800 provides a business-to-business transaction between Identicate 205 and the vendor system 215, by using, for example, XML. In contrast, communication path 810 provides a communication path between Identicate 205 and the user-client system 220 by using web page redirecting from the vendor system 215 or the user client web server 220. FIG. 8 illustrates that in case of the business-to-business communication model, the vendor system 215 is in communication with the user-client system 220 via communication path 805 and hosts a user interface 807 (i.e., host web site/pages presented to the user-client terminals 220). In particular, a user interacts with generated user authentication examinations via the user interface 807, which can be a browser-based graphical user interface. In case of the web page redirect communication model, Identicate 205 hosts a presentation layer module as the user interface 807. Although, FIG. 8 illustrates that the vendor system 215 hosts a vendor user interface 815, the present invention is not limited to such embodiment and Identicate can provide the dual connectivity option regardless of whether the vendor hosts the vendor user interface 815 (i.e., host web site/pages presented to the user-client terminals 220) or a third party, such as a system/solution provider, hosts the vendor user interface 815. In particular, the vendor user interface 815 is typically the vendor's presentation layer for the vendor's products/services. The interface 815 can be a browser-based graphical user interface.

In FIG. 8, communication in a business-to-business transaction, for example, by using XML between Identicate 205 and the vendor system 215 provides a high level of security and seamless user experience (i.e., the user only interfaces with the vendor's web site). The business-to-business transaction method may require more than a minimum level of vendor implementation effort depending on vendor system 215 and user-client systems 220.

In FIG. 8, communication between Identicate 205 and the user-client system 220 via the vendor system's 215 web browser application and communication path 810 involves web page redirecting. More particularly, if the vendor is hosting the system supporting the business transaction, the user can interface with the vendor's existing web page application 815 and the vendor adds functionality to the existing web site 815 to launch from within Identicate 205 Identicate's presentation layer 807 via a Hyper Text Transfer Protocol Secure (HTTPS) post to Identicate 205 with user information in a new browser. After the user has completed information input to Identicate's presentation layer module 807, the user is automatically redirected back to the original vendor browser session. In an example embodiment, Identicate 205 posts an authentication confidence score to the vendor's web server 215 and the vendor adds functionality to check the score and determine next steps. Such web page redirecting is provided using the HTTPS protocol, form post communication, and, thus, a third party system/solution provider can host Identicate's presentation layer module 807. Although such web page redirecting may provide a lower level of security than the business-to-business transaction method and possibly a less seamless user experience than the business-to-business transaction method, web page redirecting advantageously provides minimum vendor implementation effort.

Figure 9:
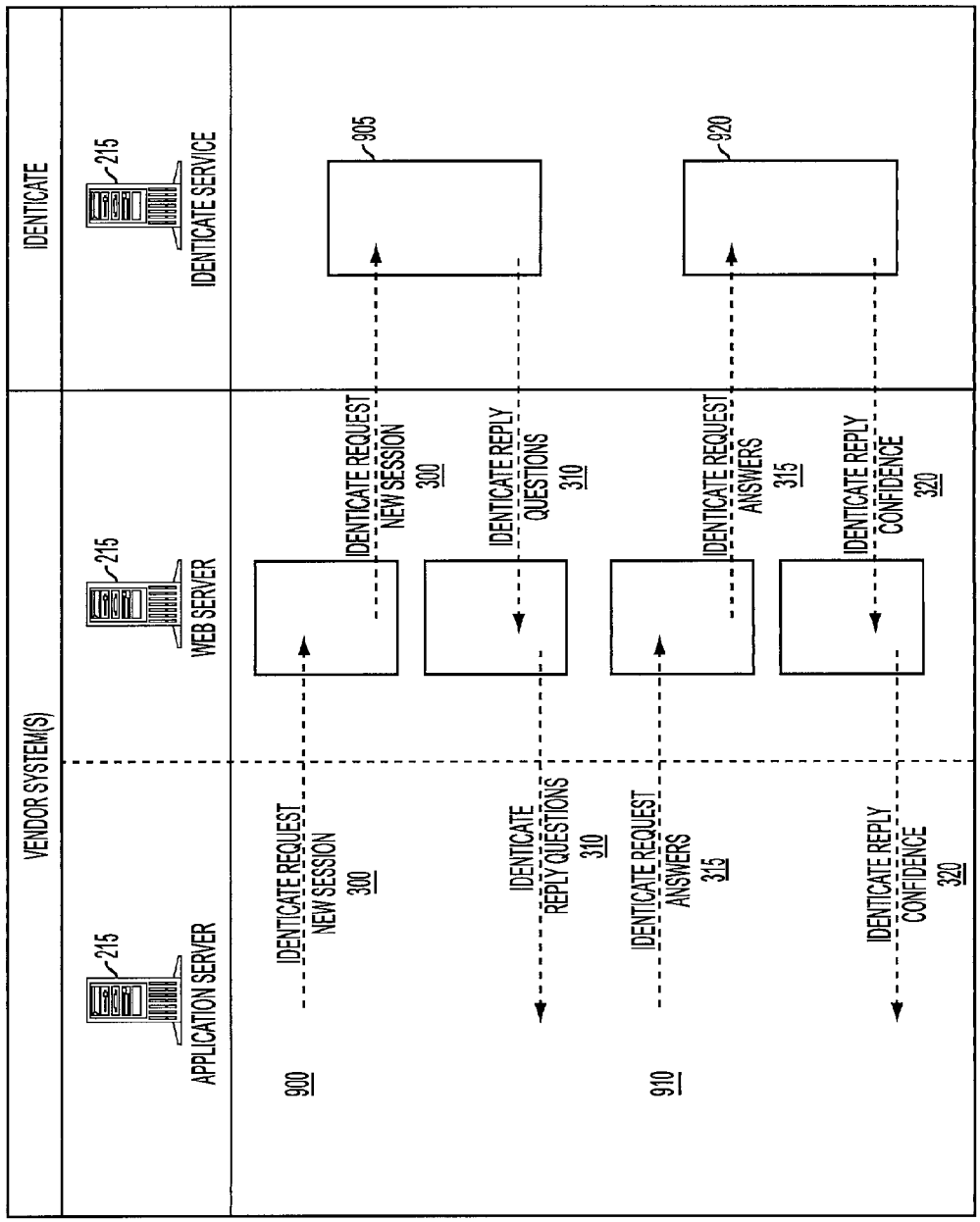
FIG. 9 is a more detailed flow chart of an example business-to-business transaction communication method according to the present invention.

FIG. 9 is a more detailed flow chart of an example business-to-business transaction communication method, using, for example, XML, according to the present invention. In particular, at 900 the vendor system 215 sends to Identicate 205 an XML based new user authentication process session request 300. At 905, Identicate 205 replies to the new session request 300 by sending an XML based user authentication transaction 310, such as authentication questions, to the system vendor 215. The user authentication transaction 310 is generated according to authentication rules 245a and associated with the session request 300. At 910, the vendor system 215 sends to Identicate 205 an XML based response transaction 315 containing user's input information in response to the user authentication transaction 310. The response transaction 315 contains, for example, user's answers to authentication questions, biometric data, digital certificate, etc. At 920, Identicate 205 analyzes the received user's input information (e.g., calculates a confidence score) according to the authentication rules 245a associated with the session request 300 and provides to the vendor system 215 an XML based authentication reply transaction 320 containing the confidence score and/or recommended action if the vendor's authorization process is implemented within Identicate.

Figure 10:
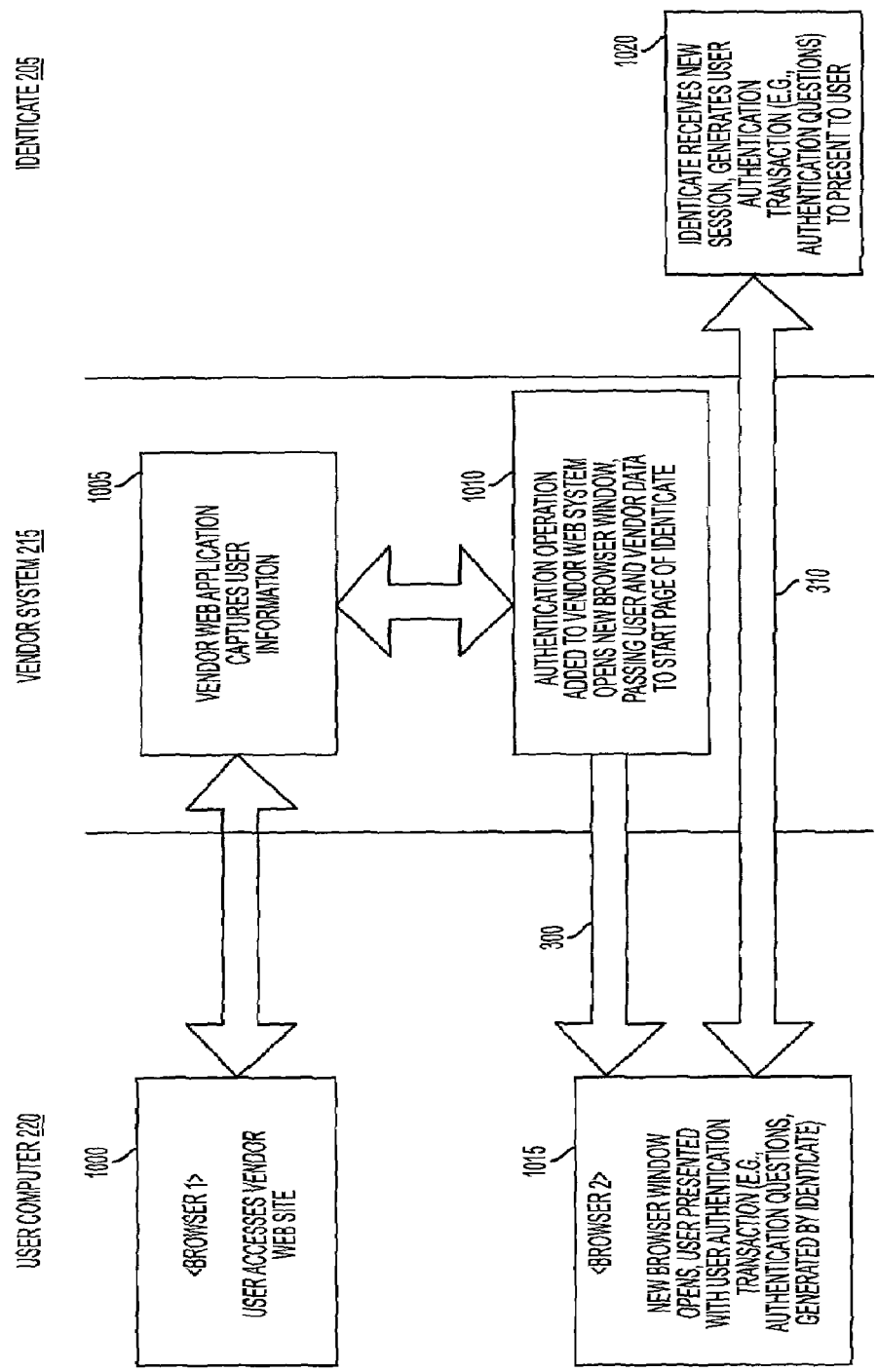
FIG. 10 is a more detailed flow chart of web page redirect communication in the user authentication system according to the present invention.
Figure 11:
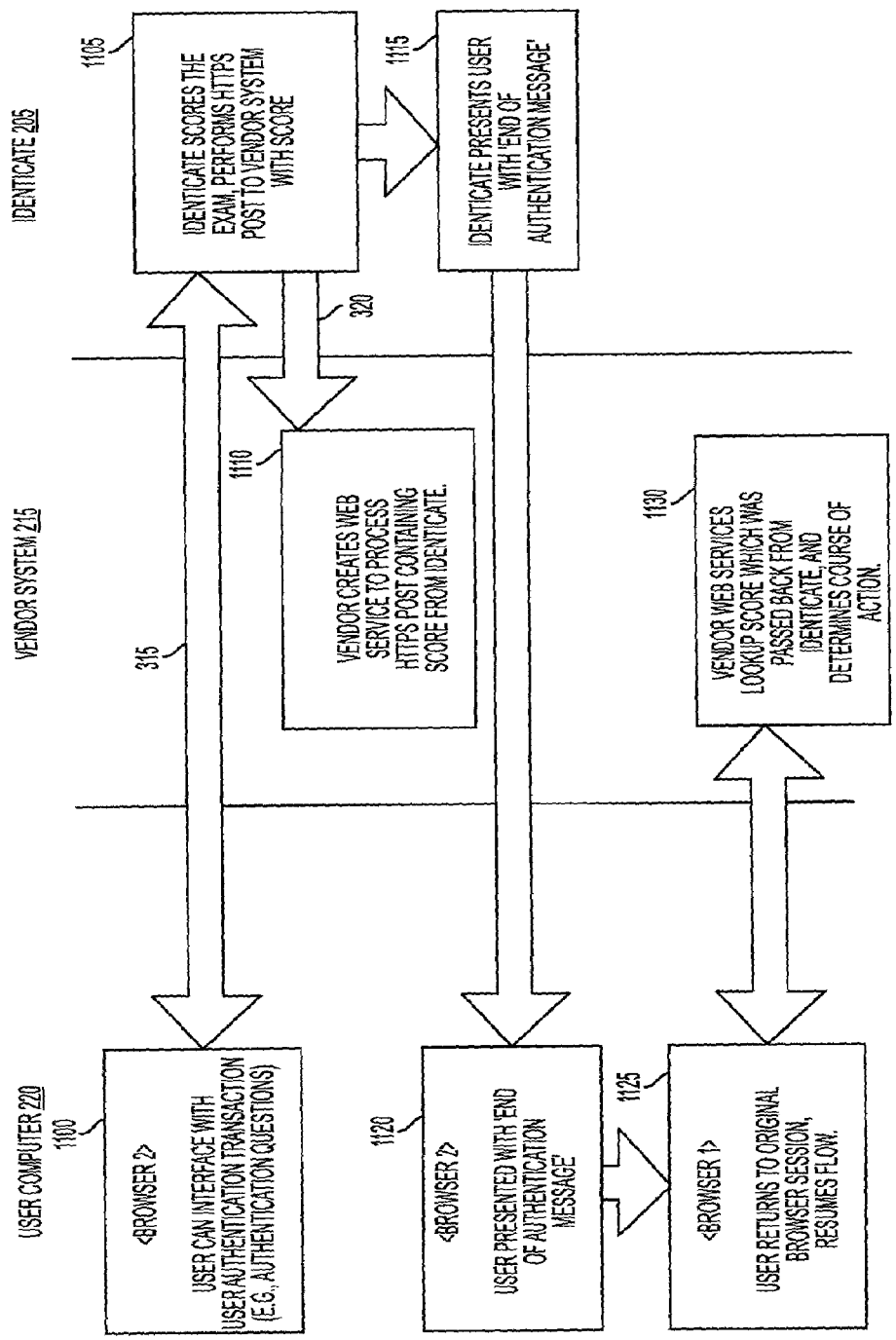
FIG. 11 is a continuation flow chart of FIG. 10.

FIGS. 10 and 11 are a more detailed flow chart of an example web page redirecting communication method according to the present invention. In FIG. 10, at 1000, the user from the user computer 220 accesses the vendor system 215 (web application). At 1005, the vendor's web application 215 captures user information. At 1010, a user authentication operation added to the vendor's web application 215 opens a new browser window at 1015 to pass the user information, including vendor information (i.e., authentication request 300), to start page of Identicate 205 at 1020. At 1020, Identicate 205 receives from the new browser opened at 1015 the user information, including the vendor information, to initiate a new user authentication session by generating a user authentication transaction 310 to present to the user. At 1015, the user is presented with the user authentication transaction 310 generated by Identicate at 1020.

In FIG. 11, at 1100 the user answers authentication questions if the user authentication transaction 310 generated at 1020 contains authentication questions. At 1105, Identicate 205 receives the authentication exam answers in a user reply transaction 315, scores the exam and performs an HTTPS post to the vendor system 215 in a authentication reply transaction 320 with the score. At 1110, a web service added to the vendor system 215 processes the HTTPS post from 1105 containing the exam score. At 1115, Identicate 205 presents the user with 'end of authentication' message, which is displayed at the user computer 220 at 1120. At 1125, the user automatically returns to original browser session at 1000 (FIG. 10) to resume interfacing with the vendor system 220. At 1130, the vendor system 215 analyzes the exam score received at 1110 and determines an appropriate course of action.

Figure 12:
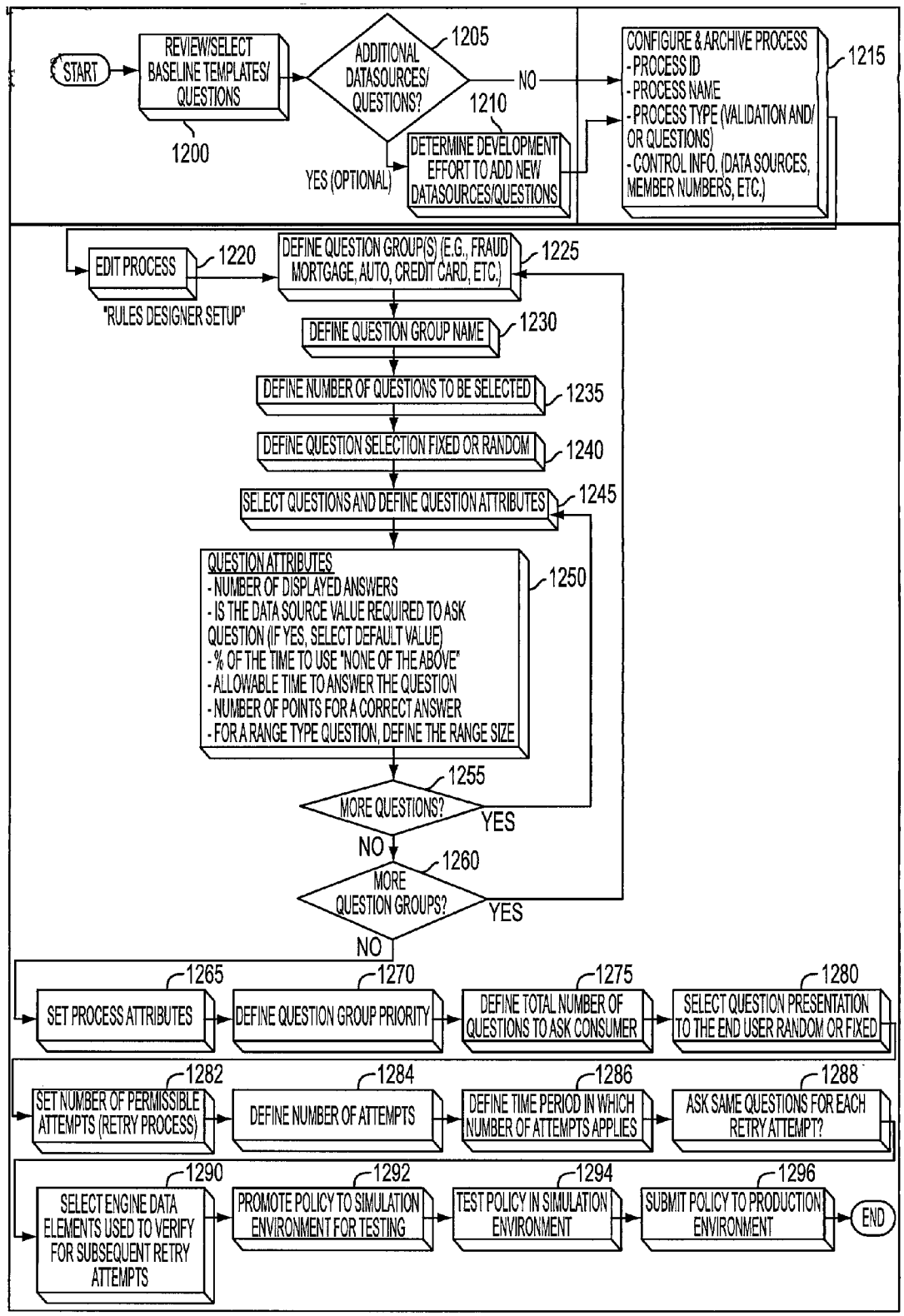
FIG. 12 is a flow chart for a rules designer according to the present invention.

FIG. 12 is an example flow chart for the initial definition of a user authentication process 100 in rules designer 235. In particular, the rules designer 235 provides a system and business method of allowing a vendor to select/define/review online user authentication processes 100, to select/review online data sources 230 and/or 250 for the selected user authentication processes 100, to select/review system development and implementation efforts to support the selected user authentication processes 100 and to dynamically configure/customize online the selected user authentication processes 100. Because the rules designer 235 provides automatic online user authentication process 100 configuration/customization at a higher level of abstraction in relation to a processing engine, a vendor can efficiently perform such user-authentication-process-configuration selection/review cycles alone or with help of system/solution providers.

In FIG. 12, the present invention's rules designer 235 exposes user authentication features/functions to a vendor, allowing a system/solution provider to supply services that span consulting, system integration and authentication product/service offerings, including, but not limited to, strategizing on a vendor's authorization process. Although, the example embodiments describe a vendor customizing user authentication processes 100, a system/solution provider can provide user authentication services on behalf of vendor or to a vendor in support of the vendor's business transactions, including dynamic customization of user authentication services (i.e., managing configuration of rules 245), and strategizing services regarding authorization processes. The example system 200 according to the present invention accommodates online definition of configurations (customizing) of an online user authentication service to authenticate users of a vendor, associating the online user authentication service with a vendor to support the vendor's user authorization process, generating the customized online user authentication service, selecting/reviewing system development and implementation requirements to interface vendor's system with the generated customized online user authentication service, interfacing the vendor's system with the generated customized online user authentication service, authenticating users online with the generated customized online user authentication service, and online (real-time) modifying the configurations (customizing) of the online user authentication service to generate in real-time modified online user authentication services depending on the vendor's authorization process.

In FIG. 12, at 1200 a vendor can select/define/review predefined, standard user authentication processes 100 to support the vendor's authorization process for authorizing users to receive the vendors' products/services (business transactions). An example transaction can be issuance of driver licenses by a government agency as a vendor. Therefore, at 1200, the vendor can review/select authentication processes 100 based upon, for example, baseline template authentication sub-processes 105, 110 and/or 115 (collectively a user authentication process 100). At 1205, the vendor can consider using data resources 230 and/or 250 in addition to the data sources used by the template authentication sub-processes 105, 110 and/or 115 selected at 1200. For example, to verify identity of users as part of authentication sub-process 115 being defined for a business transactions, such as issuance of driver licenses or online purchases, the vendor may desire customized authentication questions that require new user data resources.

In FIG. 12, if at 1205 additional data resources and/or authentication questions are needed, the vendor at 1210 can determine system development and/or implementation efforts needed to support the user authentication processes 100 selected at 1200 and 1205. At 1215, the vendor can use the rules designer 235 to configure/customize and activate the selected user authentication processes 100. At 1215, vendor identification 400 and process identification 405 are generated, which can be used to associate different customized authentication processes 100 with a vendor. More particularly, at 1215–1290, the initial entries into the rules designer 235 generates the rules databases 245 for the vendor, which is retrieved and loaded by the authentication engine 240 in the data model 520 to perform an authentication process 100 according to the rules 245a–n.

In FIG. 12, at 1205, a vendor can configure data sources accessible for each user authentication process 100. Although, the example embodiment describes a vendor configuring (e.g., restricting, specifying) data sources for a specific user authentication process 100, the present invention is not limited to such configuration and number of data sources may be restricted/managed based upon a vendor and applied to all user authentication processes 100 of the vendor. Data source management can be used, for example, to manage/conform to a budget according to the vendor's user authorization process and/or to comply with applicable laws.

In FIG. 12, operations 1220–1290 describe in more detail the 1215 operations. At 1220, a selected user authentication process 100 can be edited as follows. For example, if the selected user authentication process 100 requires user queries, at 1225, various authentication question groups can be defined. The questions can be grouped by defined/customized categories, which can depend, for example, on association of questions in the group, such as fraud, mortgage, auto, credit, etc., depend on a data source from which the questions are generated, or depend on authentication predictability of the questions in the group. For example, mortgage related questions could be grouped as a mortgage question group. At 1230, a question group name can be defined. At 1235, the number of authentication questions in a question group can be selected. At 1240, a parameter can be set to define selection of authentication questions from a question group as fixed or random.

In FIG. 12, at 1245, parameters can be set to define attributes for each authentication question. More particularly, at 1250, authentication question attributes can be set as follows. Number of displayed answers; whether a data source value is required to ask a question and if required, a default value is selected; percentage of time to use "none of the above" as an answer choice; allowable time to answer the question; number of points for a correct answer; and defining range sizes to produce the answers for a range type question. The present invention is not limited to the described example question attributes and other questions attributes can be provided and/or configured/customized by a vendor.

In FIG. 12, if at 1255, there are no more authentication questions, at 1260 it is determined if there are any more authentication question groups to be defined/edited. If there are no more questions and no more question groups, at 1265 the selected user authentication process 100 attributes can be set.

In FIG. 12, at 1265, user authentication process 100 attributes can be set, as follows. At 1270, authentication question group priorities for the selected user authentication process 100 are defined so that certain question groups are accessed earlier in attempting to satisfy a total number of authentication questions configured for a user authentication process 100. At 1275, the total number of authentication questions to ask the user is defined. At 1280, a parameter can be set to select question presentation to the user as fixed or random at the user authentication process 100 level across all question groups.

In FIG. 12, at 1282, retry parameters can be set as follows. At 1284, a parameter can set number of permissible authentication attempts by each user. At 1286, a parameter can define time period to apply to the number of authentication attempts set at 1286. At 1288, a parameter can set whether same questions are asked for each retry authentication attempt. At 1290, the authentication engine's 240 data model 520 data elements can be selected, which are used to verify/determine subsequent authentication retry attempts by a user.

In FIG. 12, at 1292, a parameter can set whether the selected user authentication process 100 is simulated for testing and at 1294 (if selected at 1292) the selected user authentication process can be tested in a simulation environment. At 1296, the selected user authentication process 100 is submitted to production environment. In particular, at 1296, the rules databases 245, which are generated by the rules designer 24 at 1215 to 1290 and correspond to the selected user authentication process 100, are elevated to production status and the rules databases 245 can be dynamically loaded by the authentication engine 240 as new/updated rules.

Although, FIG. 12 provides an exemplary flow chart of the rules designer 235 to configure/customize parameters of user authentication processes 100, the present invention is not limited to the illustrated parameters of FIG. 12 and other parameters can be defined. FIGS. 13–33 are more detailed display screens of the rules designer 235 and illustrate configurable/customizable user authentication process 100 parameters.

Figure 13:
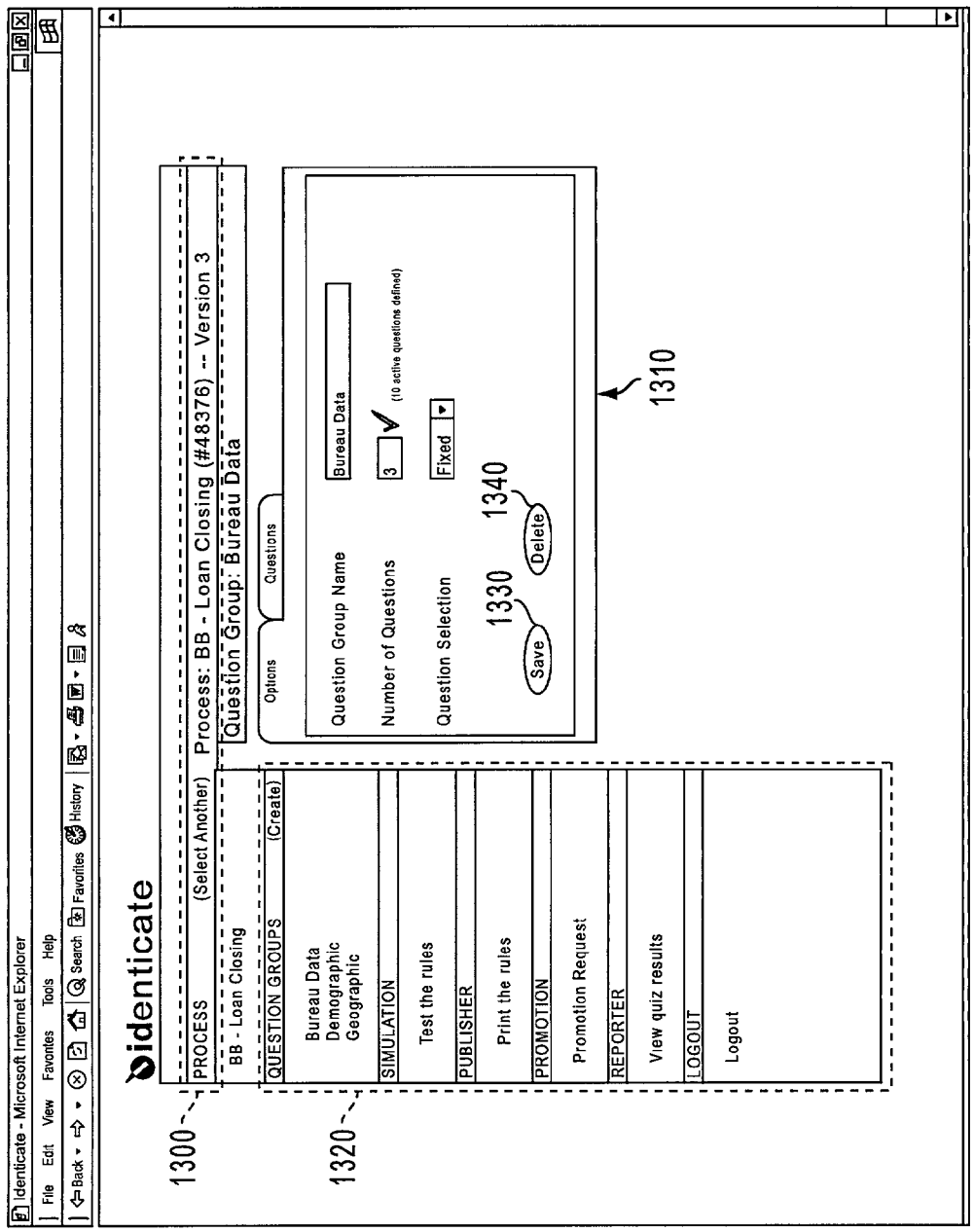
FIG. 13 is a display screen of the rules designer illustrating screen navigation aids according to the present invention.

FIG. 13 is a display screen of the rules designer 235 illustrating screen navigation aids according to the present invention. The display screen can be a browser-based user interface to manage user authentication processes 100, although the present invention is not limited to such a user interface and other user interfaces may be provided. The title bar 1300 is a horizontal box located at the top of the screen. The active window 1310 displays selected information. The title bar 1300 displays the names of the specific user authentication process 100. The title bar 1300 may also indicate the selected user action underway in the active window 1310 and version number of the user authentication process 100.

In FIG. 13, a navigation area 1320 is a screen area containing links to existing user authentication processes 100 and corresponding attributes, such as (without limitation) question groups, testing & simulation, publisher, reporter, and production request. Therefore the rules designer 235 provides a user interface at a higher level of abstraction in relation to the authentication engine 240 to accommodate efficient real-time creation, configuration/customization and modification of user authentication processes 100. The active window 1310 accommodates creation, viewing, and modification of user authentication processes 100. Further, dynamically launched browser windows are used to dynamically customize user authentication processes 100. In particular, a display screen is provided with a navigation area to select vendor-customized user authentication process 100 and customization information thereof. Further, in the FIG. 13 example embodiment, the display screen conforms to a paradigm of a left-hand navigation bar relating to user authentication process 100 actions and customization tabs/folders corresponding to the actions. For example, the active window 1310 is tab/folder display that displays authentication questions of a question group and corresponding configurable/customizable parameters of the questions for a user authentication question 100 selected in the left-hand navigation bar. The user authentication process 100 action can be, for example, selection, printing, auditing and status query/setting.

The save option 1330 is a save link to save/update information of a selected user authentication process 100 in the rules databases 245 (e.g., to save/update rules, such as associated question groups). The delete button 1340 deletes information relating to the selected user authentication process 100, such as a question group or question.

Figure 14:
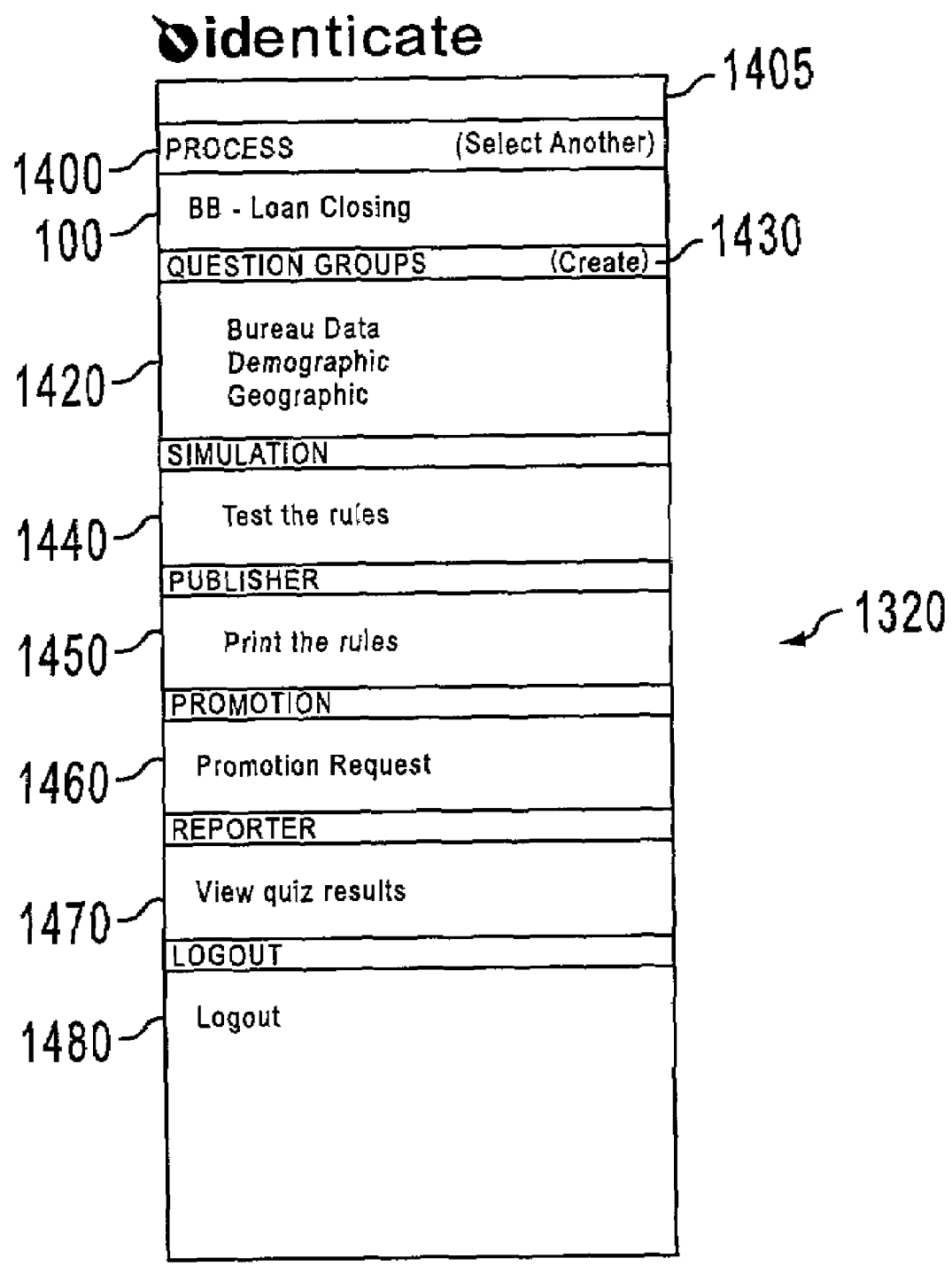
FIG. 14 is a more detailed display screen of the rules designer's navigation area according to the present invention.

FIG. 14 is a more detailed screen display of the navigation area 1320. The process link 1400 hyperlinks to a 'Process Options' screen (discussed in more detail with FIG. 17 below) to set options of a user authentication process 100. Advantageously, the select another link 1405 hyperlinks to the 'Process Selection' screens (discussed in more detail with FIG. 16 below).

In FIG. 14, the question group link 1420 allows selection of a question group name to hyperlink to the 'Question Group Options' screen (discussed in more detail with FIGS. 21 and 22 below). The create link 1430 hyperlinks to the 'create new question group' screens (discussed in more detail with FIG. 26 below).

In FIG. 14, the simulation link 1440 opens a new browser window displaying the 'Session/Subject Setup' screen for a test case (discussed in more detail with FIGS. 28–32 below).

In FIG. 14, the publisher link 1450 opens a new browser window (discussed in more detail with FIG. 33 below) displaying a complete listing of information regarding the selected user authentication process 100, such as parameters, questions, question parameters, and validation information. The listed information is formatted for printing using web browser print functions.

In FIG. 14, the promotion link 1460 initiates a promotion request to transition a user authentication process into either the simulation environment or the production environment (as discussed in more detail with FIG. 27 below). The production environment is where live user authentication processes 100 are run for current user authentication.

In FIG. 14, the reporter link 1470 opens a new browser window displaying the 'Transaction Locator Setup' screen for viewing authentication transactions, such as transactions of an authentication session test case (discussed in more detail with FIGS. 33–35 below). The logout link 1480 terminates the current rules designer 235 session.

Figure 15:
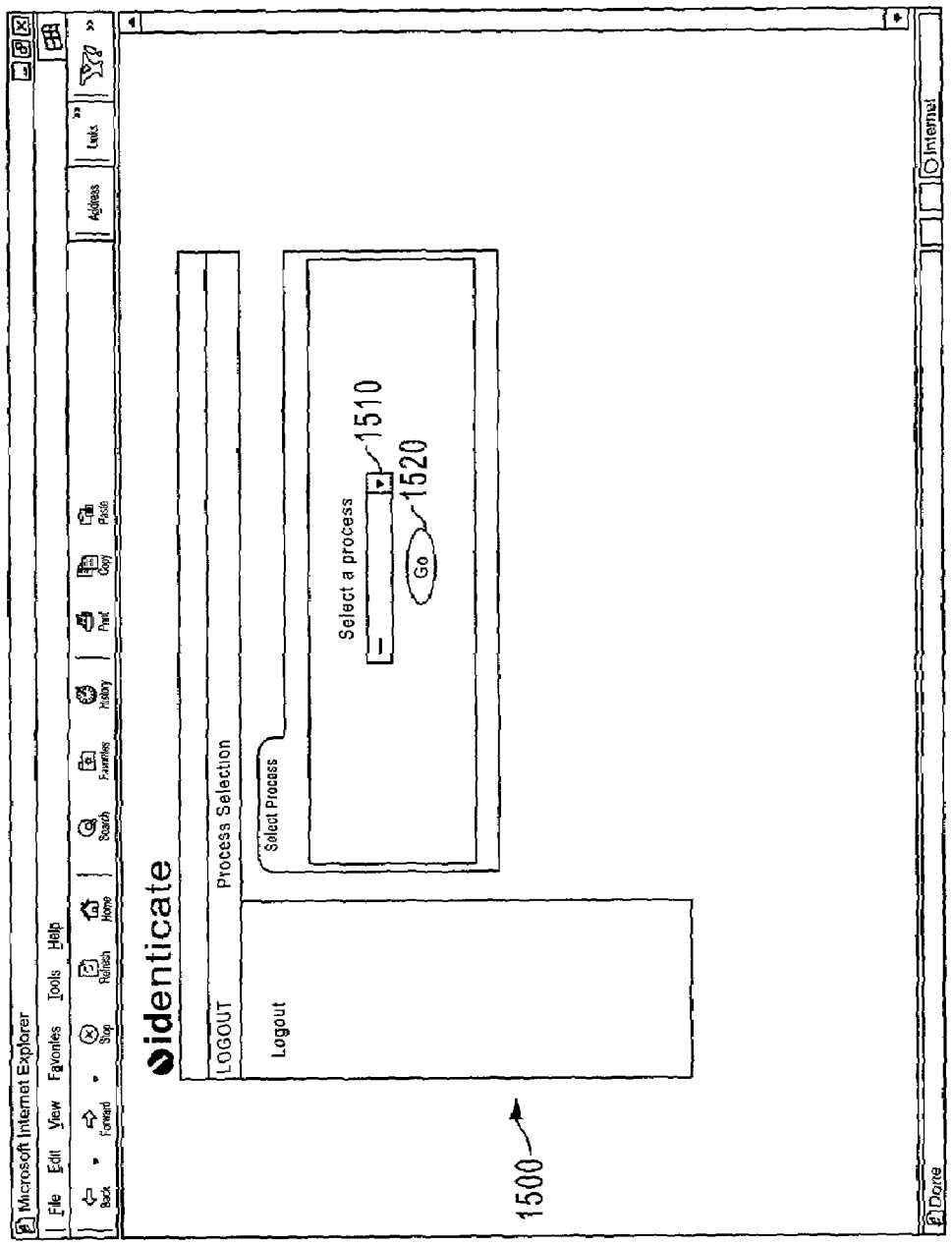
FIG. 15 is a display screen of the rules designer to select a user authentication process according to the present invention.

FIG. 15 is a display screen of the rules designer 235 to select a user authentication process 100. The user authentication process selection screen 1500 contains a drop down box that lists by name active (in production) and inactive user authentication processes 100. An appropriate user authentication process name can be selected in the drop down box. The 'Go' button 1520 can be clicked to begin configuring/editing the selected process 100. The 'Go' button 1520 provides a list of version names/numbers and status information for the selected process 100 as shown in FIG. 16.

Figure 16:
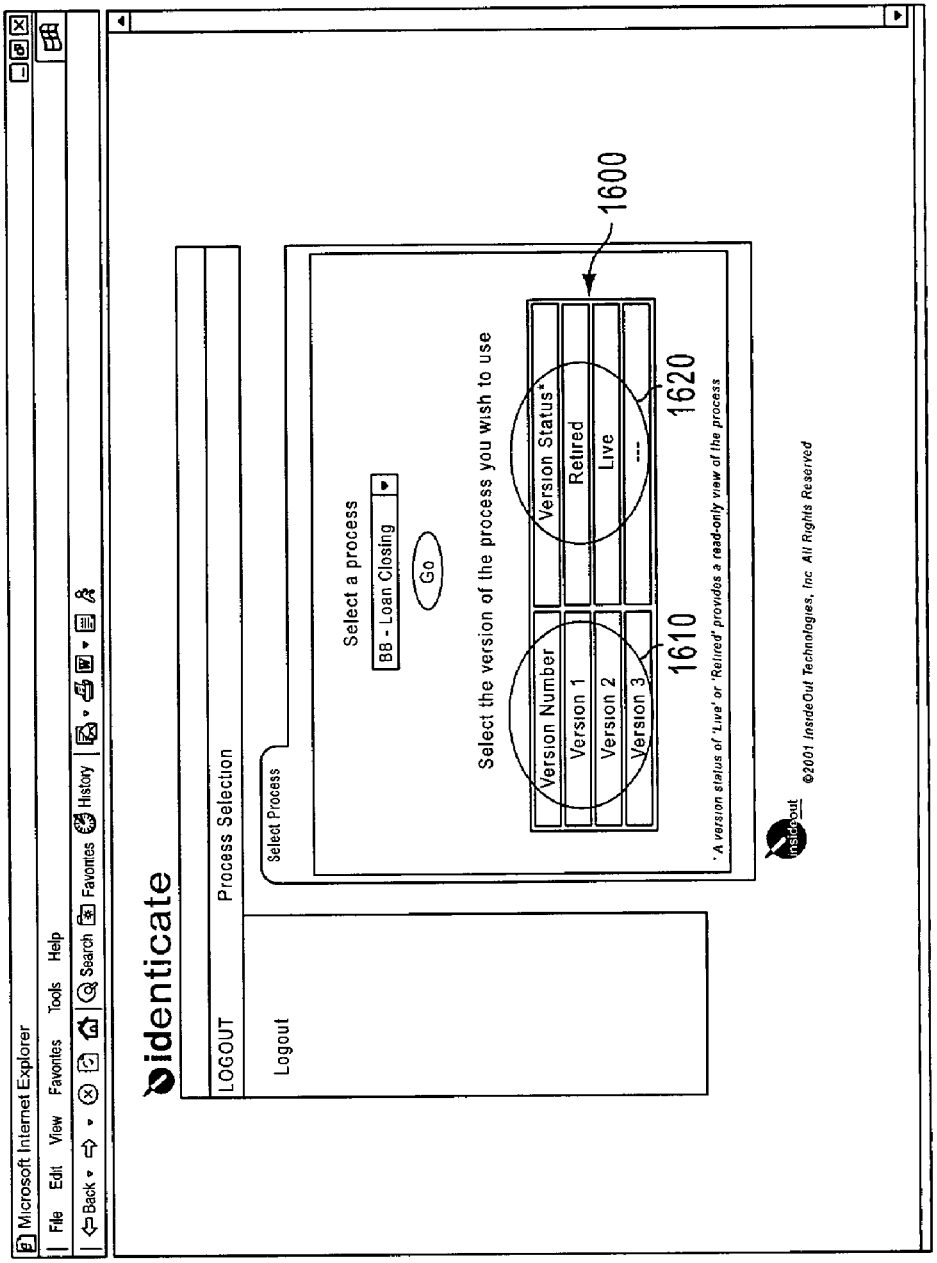
FIG. 16 is a display screen of the rules designer to select user authentication process versions according to the present invention.

FIG. 16 is a display screen of a list 1600 containing version names/numbers 1610 and status information 1620 for the selected process 100. Therefore, rules designer 235 allows multiple versions of each user authentication process 100 as illustrated in the list of version numbers 1610. Corresponding to each version number 1610, status of each user authentication process version 1610 can be provided as shown in the status information list 1620. Clicking on the version number 1610 activates the 'Authorization Process Options' screen (FIG. 17). In particular, each time a specific version is promoted into production, a copy of the version will be created and numbered sequentially (e.g. Version 1, Version 2). A production (live) status level indicates that a authentication process 100 is running in production by being in use by the authentication engine 235 for current user authentication. The present invention provides automatic versioning of user authentication processes 100, for example, as new user authentication processes 100 are established, placed into production, modified, etc.

In FIG. 16, the version status list 1620 provides some example version status information as follows. A 'retired' status indicates that a particular user authentication process 100 version is an old process previously in production. 'Retired' versions can be viewable in a read-only mode so that no changes or modifications can be made to a 'Retired' process. The 'Live' status indicates that a particular user authentication process 100 version is the current process in production. 'Live' versions can be viewable in a read-only mode so that no changes or modifications can be made to a 'Live' process. The '---' status indicates that a particular user authentication process 100 is a working version that has not been in production. A working version can be edited at any time until it is promoted to production. The rule designer 235 can also provide status information as a user authentication process 100 parameter, where statuses may be added/configured. Further, versions of user authentication processes 100, such as a live or retired version, can be used/copied to create new user authentication process 100 versions.

FIG. 17 is a display screen of the rules designer 235 to set user authentication process 100 options according to the present invention. Through the 'User Authentication Process Options' screen 1700, configurable/customizable parameters can be set for the selected user authentication process 100. The parameters 1710 can control a strategy of user authentication processes 100 of a vendor. For example, the parameters can define specific sub-processes 105, 110, and/or 115 to be invoked for the selected user authentication process 100 (e.g., process BB-Loan Closing in FIG. 17). The parameters 1710 can be validation (fraud detection) 110, identify verification questions 115 or both fraud detection 110 and identity verification questions 115. Other parameters 1710 can be added, such as user information validation 105.

In FIG. 17, the fraud detection only option 1710 validates user information with data sources 230 and/or 250 to provide fraud service alerts. The questions only option 1710 queries user with authentication questions set up in Identicate to authenticate the user and fraud service alerts will not be used. The fraud detection and questions options 1710 include both fraud service alerts and authentication questions. When the options of fraud detection and questions are chosen, the 'Fraud Detection' and 'Question' options can be further configured/customized as discussed below in more detail with FIGS. 18 and 19.

In FIG. 17, the number of questions option 1720 sets the total number of authentication questions to be asked in each authentication session of the selected user authentication process 100. This number may be smaller than the combined total of questions in question groups if only a subset of questions is configured to be used in each authentication sub-process 105, 110 and/or 115, thus allowing variability of the questions.

In FIG. 17, the question presentation option 1730 can set a parameter of 'Random' or 'Fixed,' which determines how the authentication questions and answers for an authentication session will be displayed across all question groups. If a 'Random' behavior is selected, each separate invocation of the selected user authentication process 100 (i.e., each authentication session) produces a different order of questions. If a 'Fixed' behavior is selected, questions will appear in a predefined order for each invocation of user authentication process 100. If 'Fixed' is selected, the 'Question Priority' parameter can be set as discussed below in more detail with FIG. 20.

In FIG. 17, the 'Retry Attempts' option 1740 allows setting permissible total number of attempts each user will be permitted to invoke a user authentication process 100 in a specified time period. The 'Same Questions Asked' option 1750 allows choosing if the same questions are asked for each retry or generation of a new authentication exam for each attempt. The 'Retry Verification Elements' option 1760 allows setting of data model 520 data elements (i.e., field values) used by the authentication engine 240 to match subsequent authentication requests/attempts with previous authentication request/attempts. For example, the 'External ID' data element can be a vendor-specific unique identifier for each user, which can be an application number, vendor account number, randomly assigned applicant number, etc.

In FIG. 17, the save button 1770 is a save link to save/update the selected user authentication process 100 information (rules) in the rules databases 245. The copy button 1780 is a link to copy the selected user authentication process 100 into a new version. Notes/comments associated with the new copied version may be added before saving and the new version will be added to the rules databases 245. Thus, with the copy function, new user authentication process 100 can be created based upon previously created user authentication processes 100.

Figure 18:
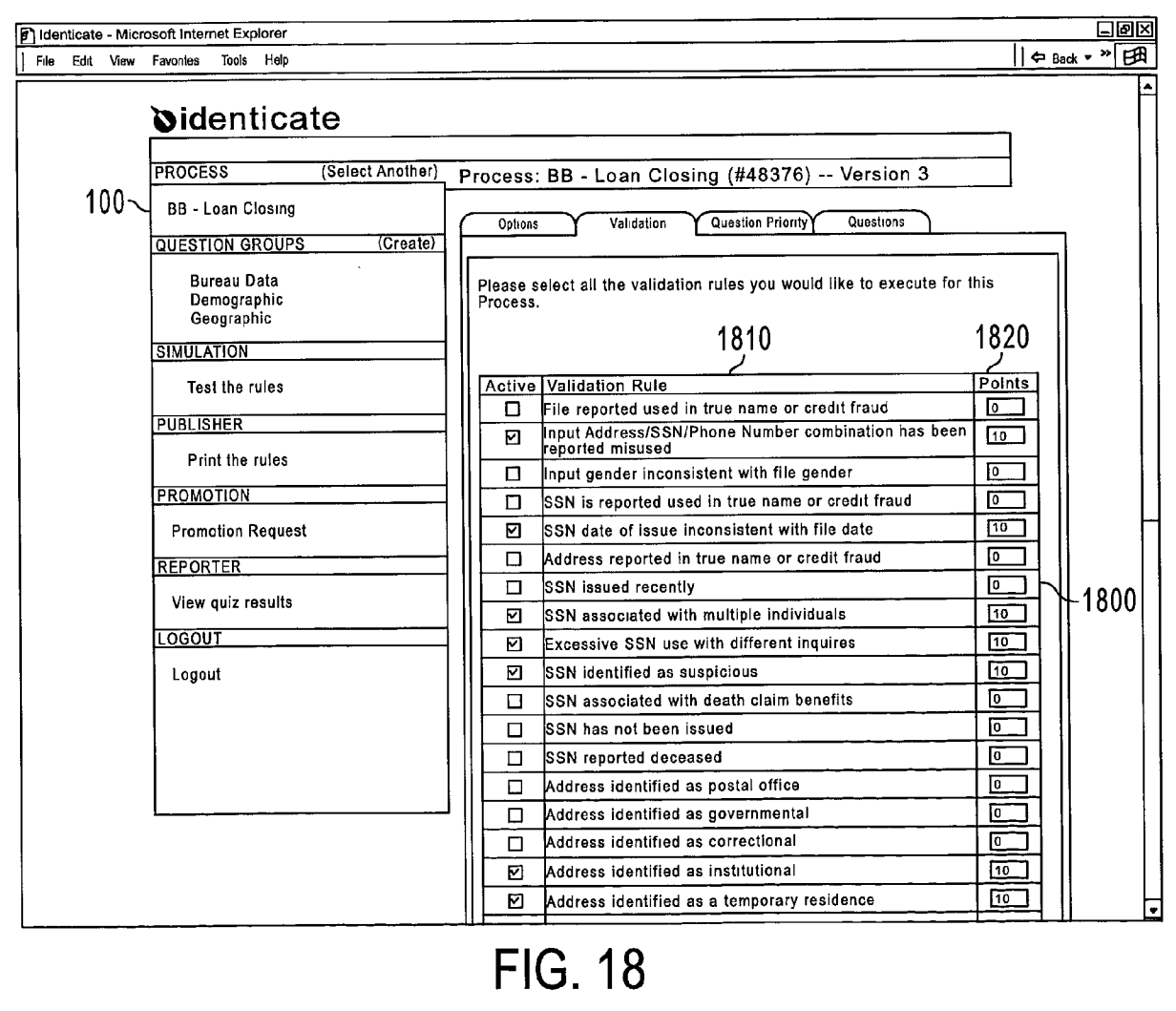

FIG. 18 is another display screen of the rules designer 235 to set user authentication process 100 options. In particular, through the fraud alert service list (validation) 1800 parameters can be set for a fraud detection sub-process 110 of the selected user authentication process 100. The fraud alert service list 1800 is a set of normalized fraud service alerts. One or more fraud alerts can be included within each fraud check. Once a fraud detection request is received, the fraud detection session 110 can occur transparently to the user by submitting selected user-provided data, such as initial application data, to vendor-specified data resources 230 and/or 250, such as a credit history fraud service, and receiving fraud alerts therefrom. The authentication engine 26 determines how to process the received fraud alerts according to the authentication rules 245a corresponding to the selected user authentication process 100.

In FIG. 18, fraud alert items 1810 can be activated as validation rules, which specify information to be checked/validated that possibly indicate fraud. In particular, the validation items 1810 can be data elements to use as key fields for accessing the data sources 230 and/or 250 for fraud detection services. When a validation rule is triggered by a fraud detection service, a corresponding fraud alert is produced by the fraud detection service. The confidence point values 1820 can be set to specify point values for each validation rule. The confidence point values can be used to control a confidence score strategy (discussed in more detail below) for user authentication processes 100 of a vendor.

Figure 19:
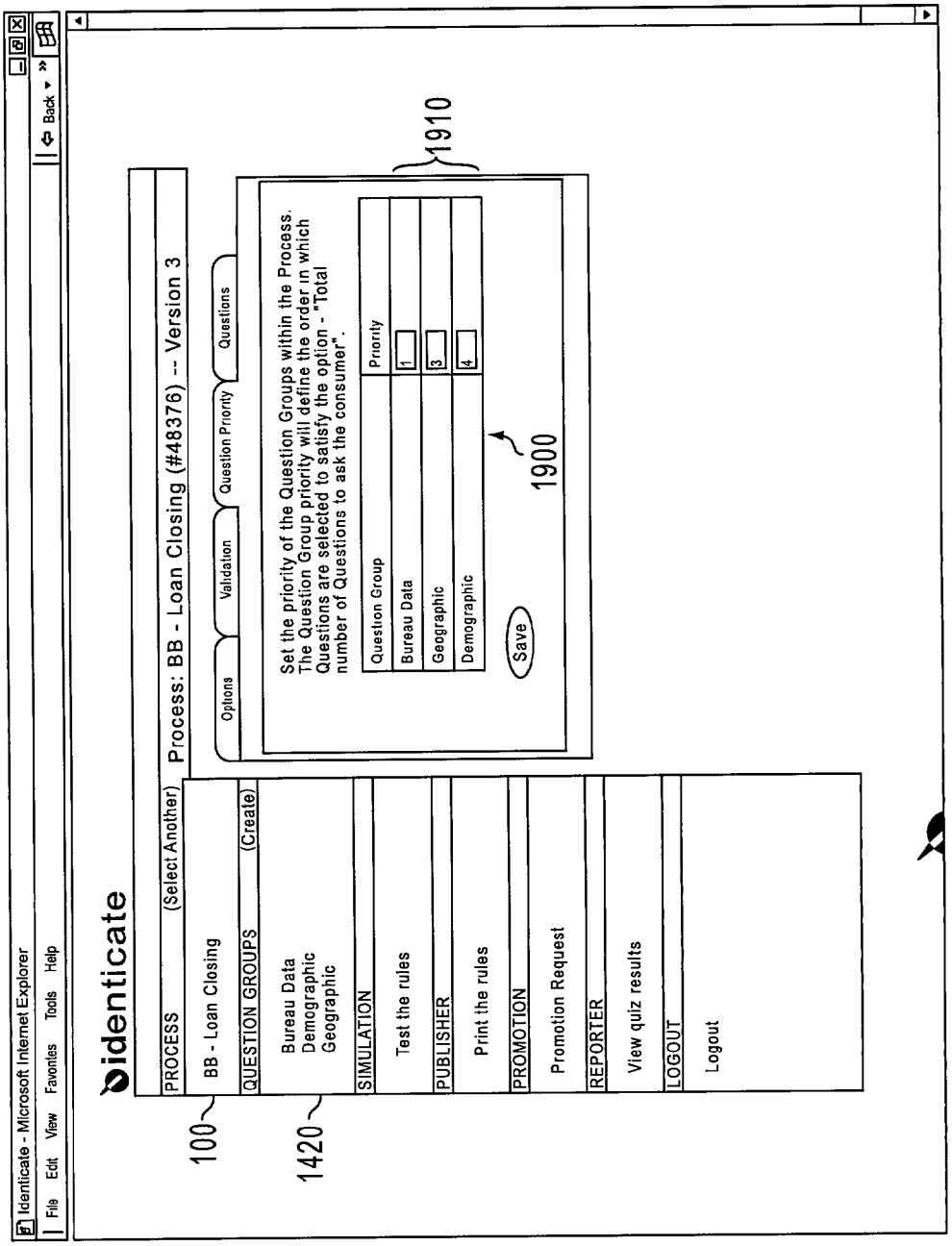
FIG. 19 is a display screen of the rules designer to set question group priority according to the present invention.

FIG. 19 is a display screen of the rule designer 235 to set question group priority according to the present invention. The question group priority table 1900 allows setting of priorities for questions groups 1420 of the selected user authentication process 100. The question group priority parameter 1910 defines the order in which question are selected from the question groups 1420 to satisfy the 'Total number of questions to ask' parameter 1720 (FIG. 17). In particular, numbers can be assigned to each question group 1420 in the question group priority parameter 1910 to create a sequential hierarchy (e.g., 0, 1, 2, . . . n) among the question groups 1420. If the question groups represent the predictability of the questions in the group, more predictive question groups can be configured with a higher priority in 1910.

Figure 20:
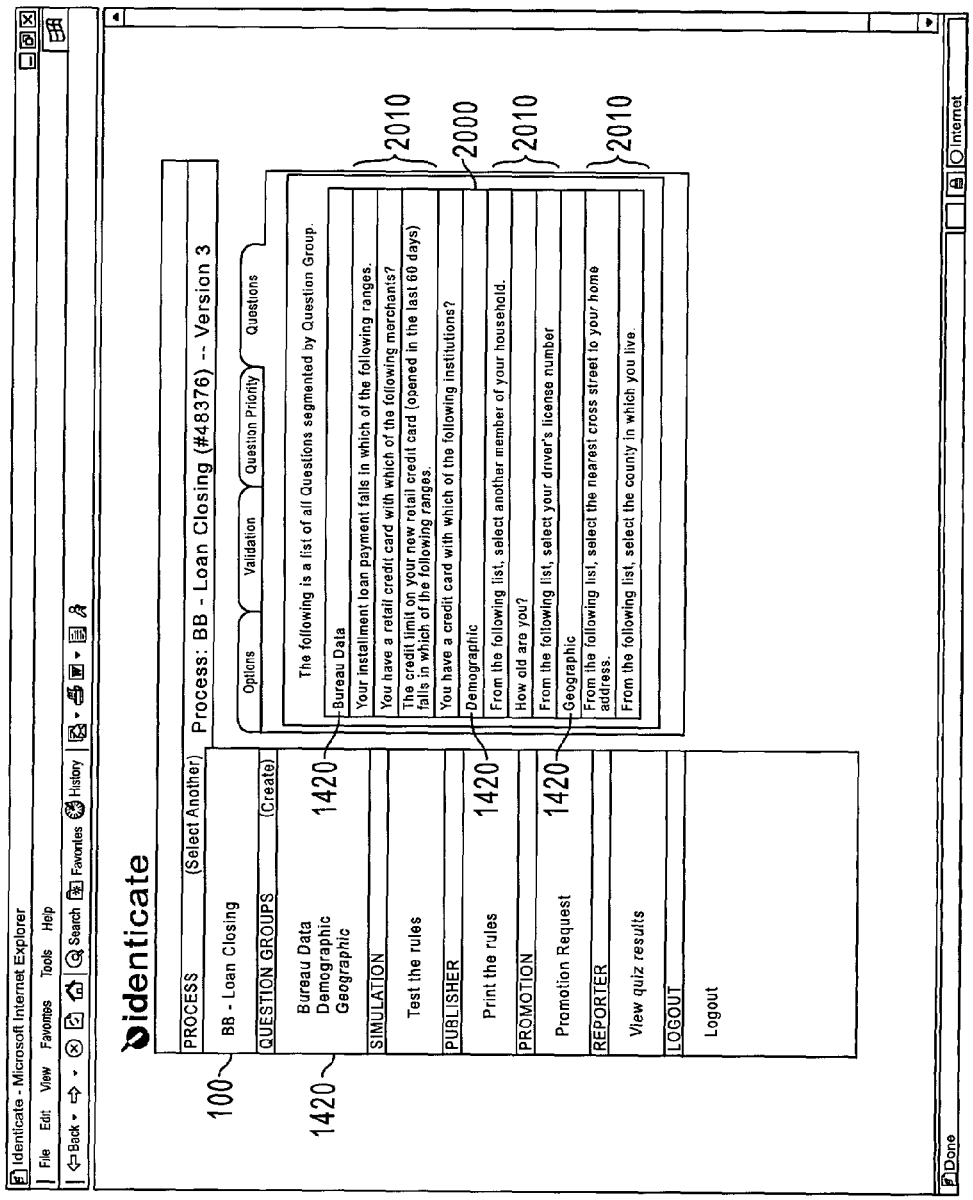
FIG. 20 is a display screen of the rules designer's question manager according to the present invention.

FIG. 20 is a display screen of the rules designer 235 question manager according to the present invention. The question manager table 2000 provides a comprehensive list of authentication questions 2010 available, for example, for an identity verification sub-process 115 of the selected user authentication process 100. The question manager table 2000 is segmented according to question groups 1420. The question manager table 2000 is used to view and manage existing groups of authentication questions. The authentication questions can be managed by selecting a question group 1420 to set various individual question configurations within each question group as shown in FIGS. 21 and 22.

Figure 21:
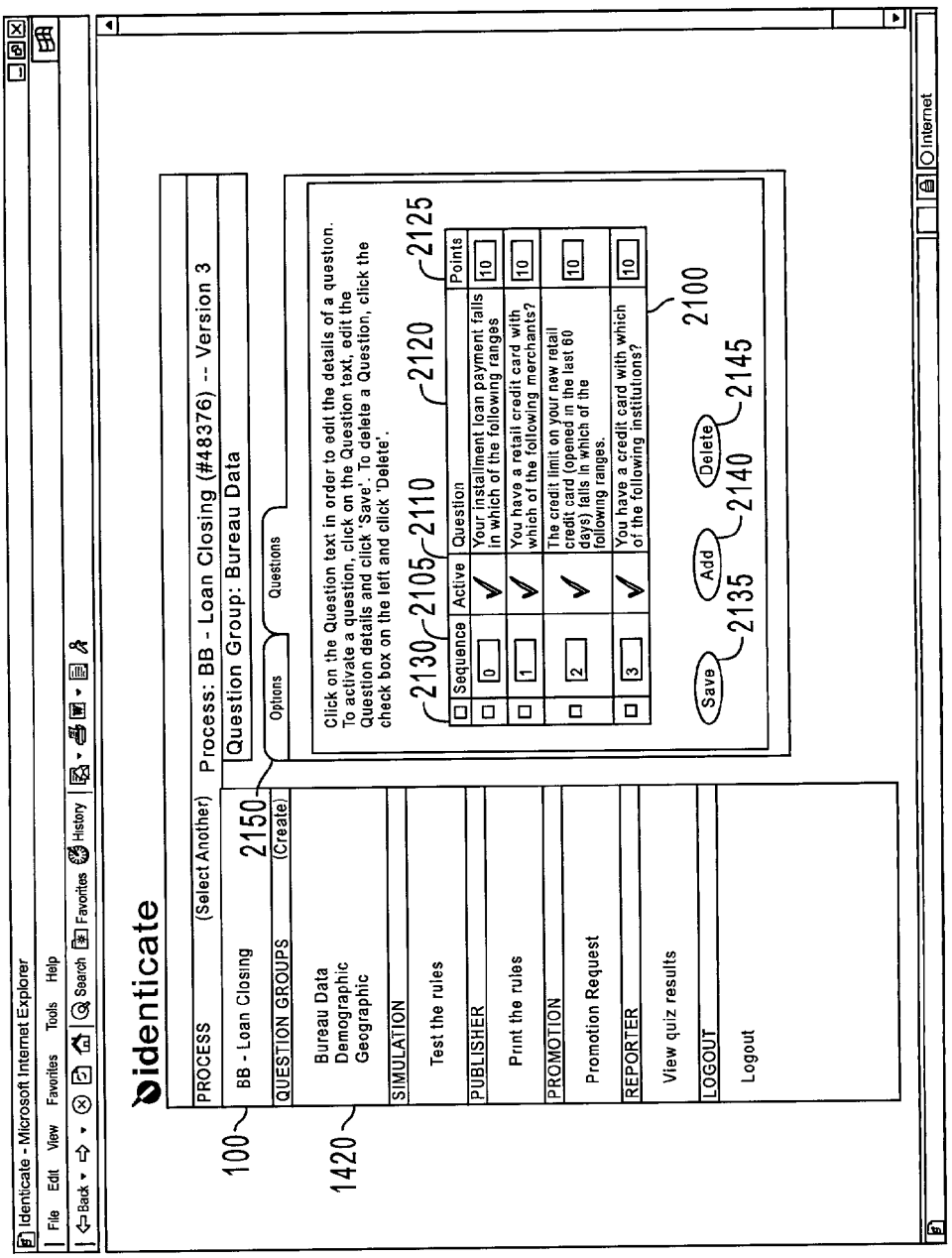
FIG. 21 is display screen of the rules designer to configure question groups according to the present invention.
Figure 22:
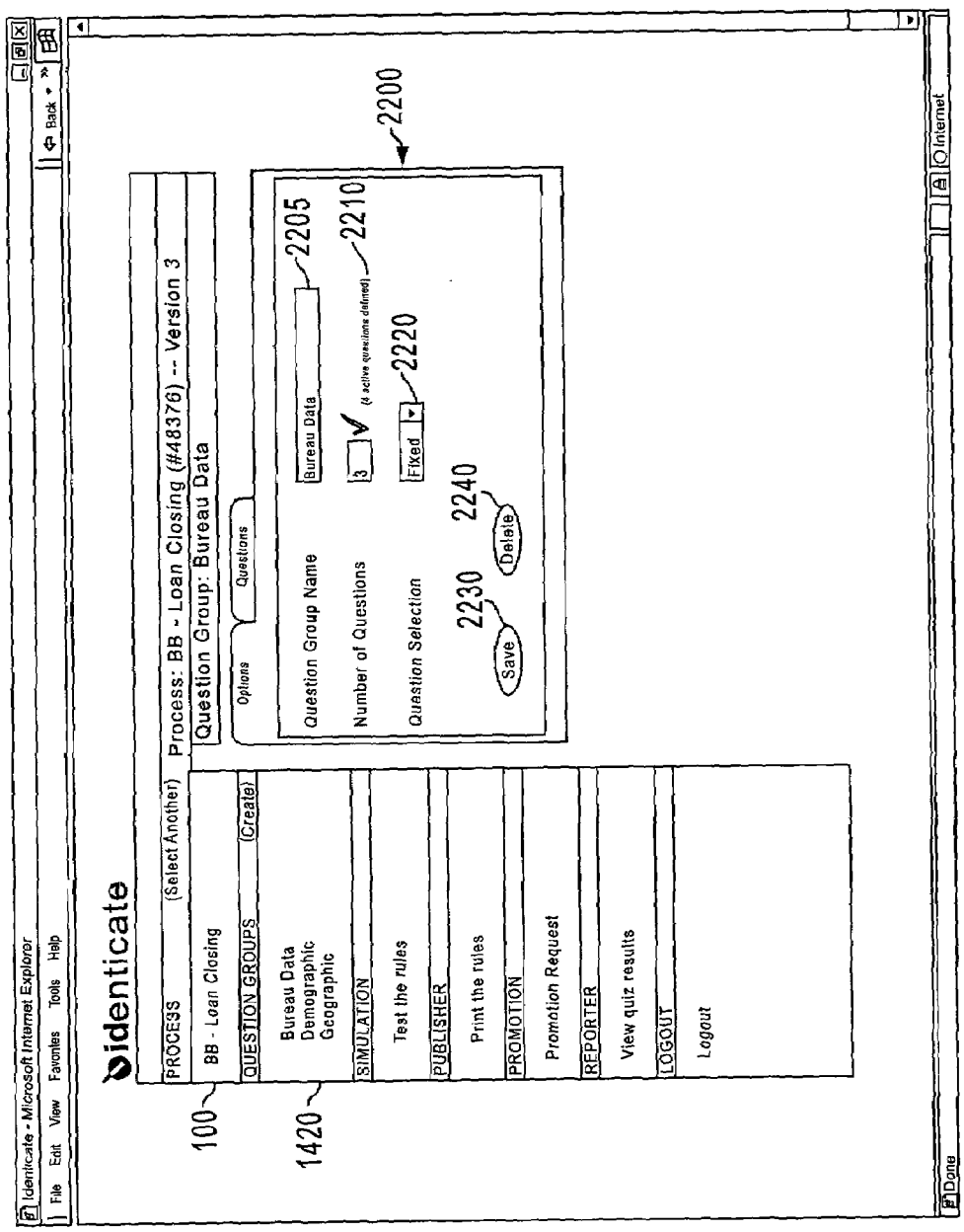
FIG. 22 is another display screen of the rules designer to configure question groups according to the present invention.

FIGS. 21 and 22 are display screens of the rules designer 235 to configure, for example, individual questions of question groups for an identity verification sub-process 115 of the selected user authentication process 100. In FIG. 21, the authentication question table 2100 includes authentication questions of the selected question group 1420. Authentication question configurations can include (without limitation) adjusting question priority within the question group 1420, setting and changing confidence point values for each question within the question group 1420, changing question group 1420 name, specifying number of questions to be asked from the group 1420, selecting random or fixed presentation of questions for the group 1420 and setting each question status.

In FIG. 21, the question priority option 2105 dictates the order in which the authentication engine 240 will select questions from the group. Numbers can be entered for the question priority option 2100 to create a sequential hierarchy among the questions (e.g. 0, 1, 2, . . . n), where "0" can indicate the first group in the progression.

In FIG. 21, the question status option 2110 indicates whether a question is active or inactive in the question group. The authentication engine 240 selects active questions to present to the user when executing a user authentication process 100. In particular, to change question status from inactive to active, a question 2120 can be selected to open the 'Edit A Question' screen (FIG. 25), to set question parameters, and to click save to update the rules databases 245.

In FIG. 21, the adjust confidence score option 2125 allows modifying confidence score point values by entering new point values for each question to control/establish a confidence score strategy (discussed in more detail below) for user authentication processes 100 of a vendor.

In FIG. 21, the save option 2135 updates information in the rules databases 245. The add option 2140 opens a screen (FIG. 23) to search, select and add from a list of existing authentication questions and/or alternatively to create new authentication questions. The delete option 2145 removes a question from the list, using the selection box 2130.

FIG. 22 is a display screen allowing defining and/or updating a question group 1420. In particular, by either selecting the options tab 2150 in FIG. 21 or selecting create link 1430 in the navigation area 1320 of the rules designer 235 (FIG. 14), new question group table/view 2200 allows creating/updating a new question group 1420. In FIG. 22, the question group name option 2205 allows defining and/or updating a question group 1420 name. Authentication questions of a user authentication process 100 can be segmented into groups 1420 to facilitate development of an authentication question hierarchy. The authentication questions can be grouped in any desired manner. For example, group 1420 names can reflect the underlying association among questions 2010 according to data sources 230 and/or 250 (e.g., Mortgage, Auto, Bureau Data, Out-of-Bureau, Geographic, Demographic, Employment, Address, etc.). Alternatively, if the questions 2010 in the group reflect certain predictability, the group name can reflect such predictability so that the question group priority can be set in FIG. 19 based upon the group names (e.g., highly predictive, average predictive, etc.).

In FIG. 22, the number of questions option 2210 can indicate the maximum number of questions that the authentication engine 240 will select from the question group 1420 being define/updated for an individual identity verification sub-process 115. The entered value in 2210 is equal to or less than the number of active questions defined in the question group 1420.

In FIG. 22, the question selection option 2220 determines the order in which the authentication engine 240 selects questions from the selected question group 2205 of the questions groups 1420. By selecting 'random' in 2220, the authentication engine 240 will randomly select questions for each new user and retry users. By selecting 'fixed' in 2220, the authentication engine 240 will select questions based upon the order defined in the group list (see 2105 in FIG. 21) so that question priority within the selected question group 2205 of the question groups 1420 is established by using a fixed order.

In FIG. 22, the save option 2230 updates information in the rules databases 245. The delete option 2240 deletes the selected question group 1420 from the rules databases 245.

Figure 23:
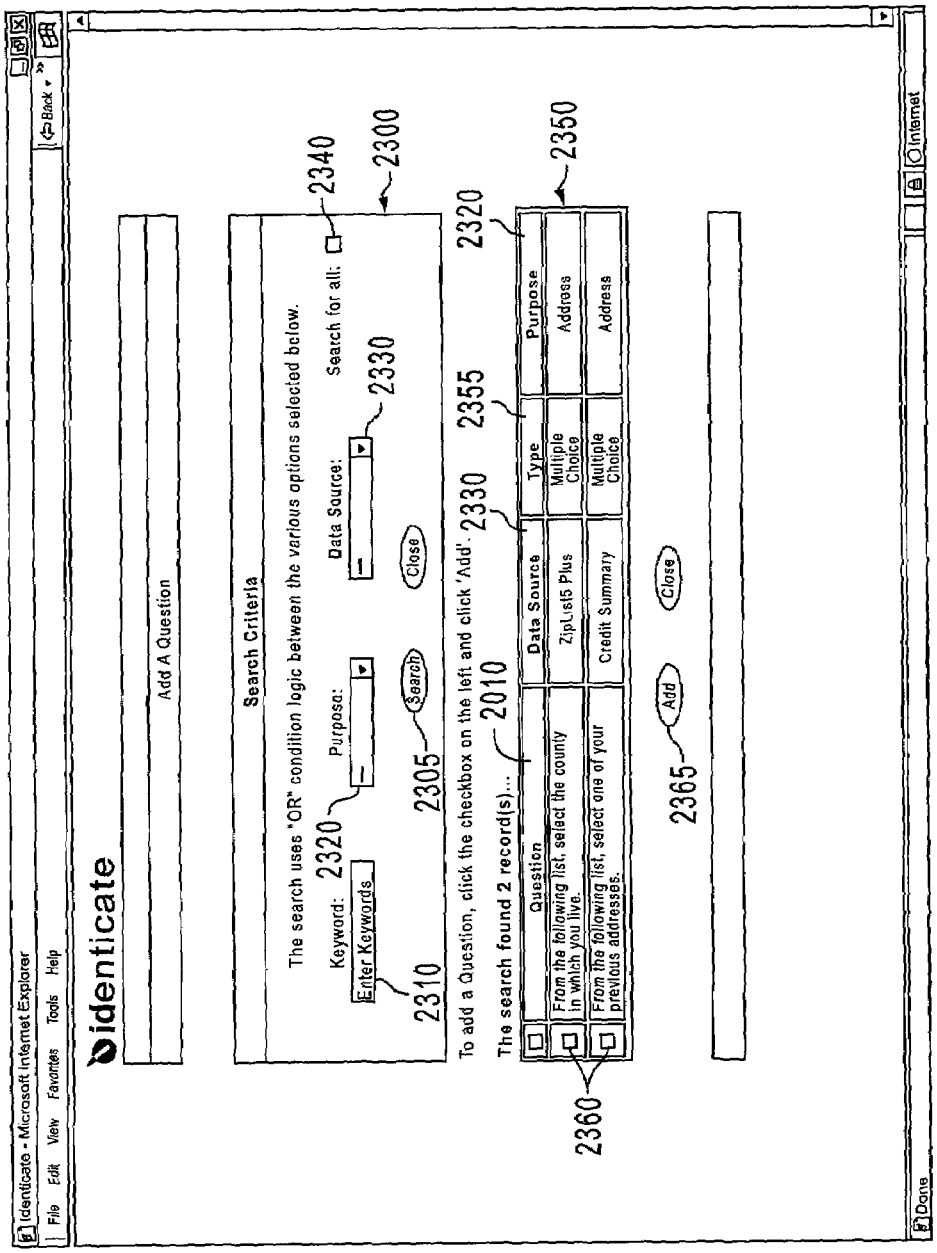
FIG. 23 is a display screen of the rules designer to add an authentication question according to the present invention.

FIG. 23 is a display screen of the rules designer 235 to add an authentication question. By selecting the add option 2140 in FIG. 21, add-a-question search table 2300 enables specifying criteria to search a list of currently defined questions by the vendor and/or available to the vendor, for the selected user authentication process 100. In particular, the list of questions contains predefined and/or vendor defined questions based upon the data sources 230 and/or 250 configured/accessible for the selected user authentication process 100. The number of questions in the list of questions for each user authentication process 100 of the vendor can vary depending on the vendor's configured access to data sources. If a vendor configures/customizes a user authentication process 100 with few data sources, number of defined/predefined questions may be limited accordingly. The number of data sources may also be restricted/managed for some/all of a given vendor's processes 100.

In FIG. 23, a search function 2305 can be used to narrow the list of questions based upon search criteria to locate questions for particular authentication needs. The search criteria can be based upon keywords, or depend on question attributes/characteristics, such as for example, data source and purpose (category) attributes. The keyword 2310 performs a keyword search of the question list using conventional searching techniques.

In FIG. 23, the purpose search term 2320 allows narrowing the search by choosing a subset of questions from the question list based upon categories. Categories can depend on type of information the question could verify, for example, 'Address,' 'Asset,' 'Demographic,' 'Employment,' 'Geographic,' or 'Liability.'

In FIG. 23, the data source option 2330 narrows the search to questions generated from the specified data source. In particular, for example, each data source can have corresponding predefined questions with fields to be completed by data retrieved from the data sources. Generation of authentication questions 2010 depend on data supplied from data sources 230 and/or 250 as follows. For example, vehicular questions can be generated by retrieving from data sources 230 and/or 250 user's vehicle make and model data elements (fields) and completing the fields in predefined questions. Alternatively, questions based upon the fields can automatically be generated, using, for example, conventional techniques. The search-for-all option 2340 retrieves all of the currently defined questions for the selected user authentication process 100.

In FIG. 23, a question-search-result table 2350 is generated via the search function 2305. The search-result table 2350 contains questions retrieved from a list of questions 2010 for the selected user authentication process 100 fitting the specified search criteria in the add-a-question search table 2300.

In FIG. 23, the result table 2350 provides question characteristics/attributes of the searched questions. In particular, the result table 2350 provides the data source attribute 2330 and the purpose attribute 2320. Additionally, the result table 2350 provides a type attribute 2355, which indicates the answer type for the question (i.e. multiple choice, text entry, true/false, etc.). The present invention is not limited to the described example question attributes and other question attributes may be provided and/or configure/customized by a vendor.

In FIG. 23, the select option 2360 allows selection of question(s) 2010. The add button 22365 adds the selected questions to the selected question group 1420 for the selected user authentication process 100 being generated/modified by the rules designer 235.

As illustrated in FIGS. 23 and 24, advantageously, Identicate can use specified data sources to generate authentication questions 2010. Alternatively, Identicate can determine data sources based upon specified question attributes/characteristics of authentication questions 2010. Further, because rules designer 235 is at a higher level of abstraction in relation to the authentication engine 240, Identicate accommodates dynamically changing authentication question attributes/characteristics and data sources for a customized user authentication process 100. Further, via the search function 2305, Identicate provides filter question selection. Filter Question Selection refers to not having to scroll through all questions 2010, but being able to select from a subset of questions 2010 based on criteria that filter all questions not to be included in the subset. In FIG. 23, the example search criteria, such as keyword 2310, purpose 2320 and data source 2330, result in a filtered set of questions, allowing filtering from the entire list of available questions 2010.

FIG. 24 is an example list 2400 of questions 2010 for a selected user authentication process 100. The question list 2400 illustrates example authentication questions 2010 according to question attributes, such as data source 2330, purpose 2320, and type 2355. Example questions texts are also provided. Because the authentication engine 240 is data agnostic, Identicate can provide multi-factor as well as multi-data source user authentication. Further, Identicate can provide dynamic multi-factor and/or multi-data source user authentication. Example authentication question categories 2330 used by Identicate are as follows. Geographic data 2330 can be used to verify identity of an individual (user authentication based upon geographic data). Therefore, Identicate can authenticate a user based upon authentication questions that use geographic data typically or likely known only by an individual inhabiting, working, and/or familiar with a specific geographic area. For example, such geographic data type questions can query from a user the name of the closest bank to the user's house or place of work, the name of the closest street intersection to the user's house, and streets/landmarks/other identifying information, such as county name, which are based upon the user's knowledge of a geographic area.

In FIG. 24, further, personal history/profile information 2330 can be used to verify identity of an individual (i.e., user authentication based upon profile information). Therefore, Identicate can authenticate a user based upon questions that use profile data typically or likely known only by an individual and/or specific to an individual. For example, such profile type questions can query from a user vehicle information (e.g., type of car driven by the user, vehicle equipment options, such as make, model, color, type of radio) number of persons in the user's household, time the user has been/was employed by an employer, time the user has been residing/resided in a residence, previous residence information, property tax information, etc. Such profile data can be private or public information records.

In FIG. 24, further, political information 2330 can be used to verify identity of an individual (i.e., user authentication based upon political information). Therefore, Identicate can authenticate a user based upon question relating to politics typically or likely known only by an individual living in a certain political district. For example, such political related questions can query from a user names of local mayor, senators, other politicians, prevalent political party, etc.

In FIG. 24, further, demographic information 2330 can be used to verify identity of an individual (i.e., user authentication based upon demographic information). Therefore, Identicate can authenticate a user based upon questions that use demographic data typically or likely known only by an individual living in a certain geographic location. For example, such demographic related questions can query from a user best known foods, average price of gasoline, average temperature, climate information, largest employer in an area, average size of homes, etc.

In FIG. 24, further, a user's digital certificate 2330 can be used to authenticate the user (i.e., authentication sub-processes 110 and/or 115 based upon the user's digital certificate). Further, a user's biometric data 2330 can be used to authenticate the user (i.e., authentication sub-processes 110 and/or 115 based upon the user's biometric data). Further, a user's real-time behavior and/or feeling data can be used to authenticate the user (i.e., authentication sub-processes 110 and/or 115 based upon the user's real-time behavior and/or feeling data).

In FIG. 24, further, government supplied information 2330 can be used to verify identity of an individual (i.e., user authentication based upon information supplied from government regarding the user). Such governmental databases can include, for example, national crime information center and sex offender databases. Therefore, Identicate can authenticate a user based upon questions that use government supplied data typically or likely known only by the user, such as the user's criminal history.

FIG. 25 is a list of example authentication question types 2355, such as multiple choice, multi-select, true/false, range choice, and fill in the blank.

Figure 26:
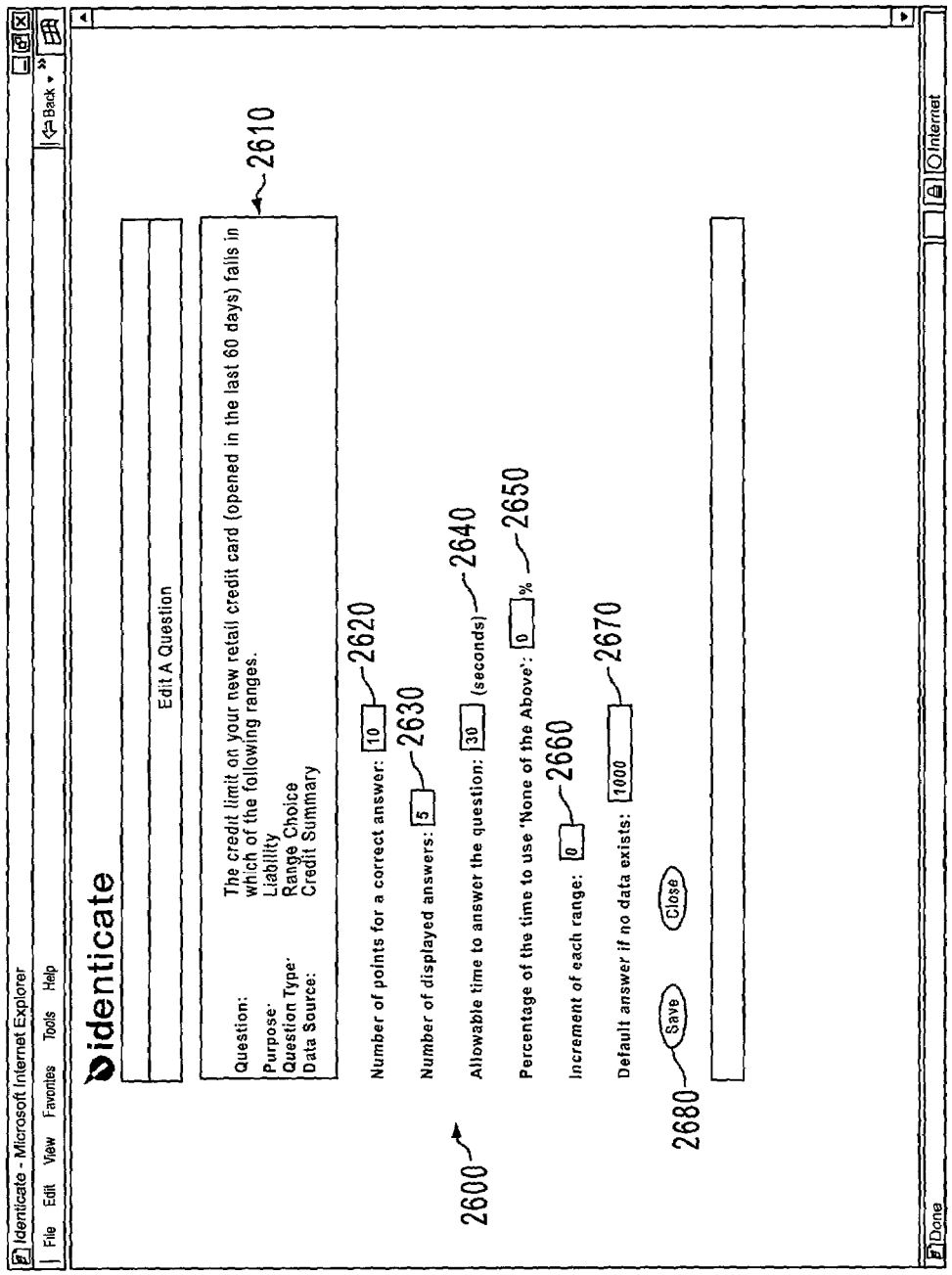
FIG. 26 is a display screen of the rules designer to edit an authentication question according to the present invention.

FIG. 26 is a display screen of the rules designer 235 to edit properties (parameters or options) of an authentication question according to the present invention. In particular, by selecting each authentication question 2010 (FIG. 21), an edit question table/view 2600 allows setting of configurable/customizable question parameters as follows. The question description 2610 provides some question attributes, such as question type, purpose, data source. The number of points option 2620 allows assignment of points awarded for a correct response to the selected authentication question 2010. The point assignments can be use to control a confidence score strategy for user authentication processes 100 of a vendor.

In FIG. 26, the number of displayed answers option 2630 allows specifying a desired number of answer choices the authentication engine 240 will generate for the question. For example, if "4" is selected, the authentication engine 240 will provide the correct answer plus three incorrect answer choices (assuming the correct answer is to be displayed, see 2650).

In FIG. 26, the allowable time to answer the question option 2640 sets a time limit, for example, in seconds, for the consumer to answer the question. When multiple questions are displayed on the same screen, the time limits for each question can be combined to create an aggregate time limit for the questions displayed on the screen. If the actual time for a user to answer a user authentication process question exceeds the set/configured allowable time, the question can be deemed as answered wrong for purposes of user authentication.

In FIG. 26, the percentage of time to use 'None of the Above' option 2550 allows specifying how often 'None of the Above' is the correct answer. For example, if the parameter is set to 20%, the authentication engine 240 will make 'None of the Above' the correct answer 20% of the time. One means of using 'none of the above' as the possible answer choice would be whether data is required to ask a question and if the data is not required, 'none of the above' can be the correct answer 100% of time. Another means would be to use 'none of the above' as a default answer choice if no data exists.

In FIG. 26, the increment of each range option 2660 specifies the range size for answer choices. This parameter is available for range choice type questions. For example, if the range size is set to 2000 for the question 2610, the multiple choice answers will display ranges in increments of $2000 dollars ($2000–$4000, $4000–$6000, etc.).

In FIG. 26, the 'default answer if no data exists' option 2670 provides that if a data source 230 and/or 250 is not required to ask the question, the specified default answer is used to generate multiple choice answers. If no data exists, a default answer can also be generated by using ranges for multiple-choice questions with numeric ranges as answers. The save option 2680 save/updates the specified question parameters to the rules databases 245.

In FIG. 26, the present invention is not limited to the described example configurable/customizable questions parameters and other configurable questions parameters can include (without limitation) defining/editing question text, answer text, and specifying wrong answers.

Figure 27:
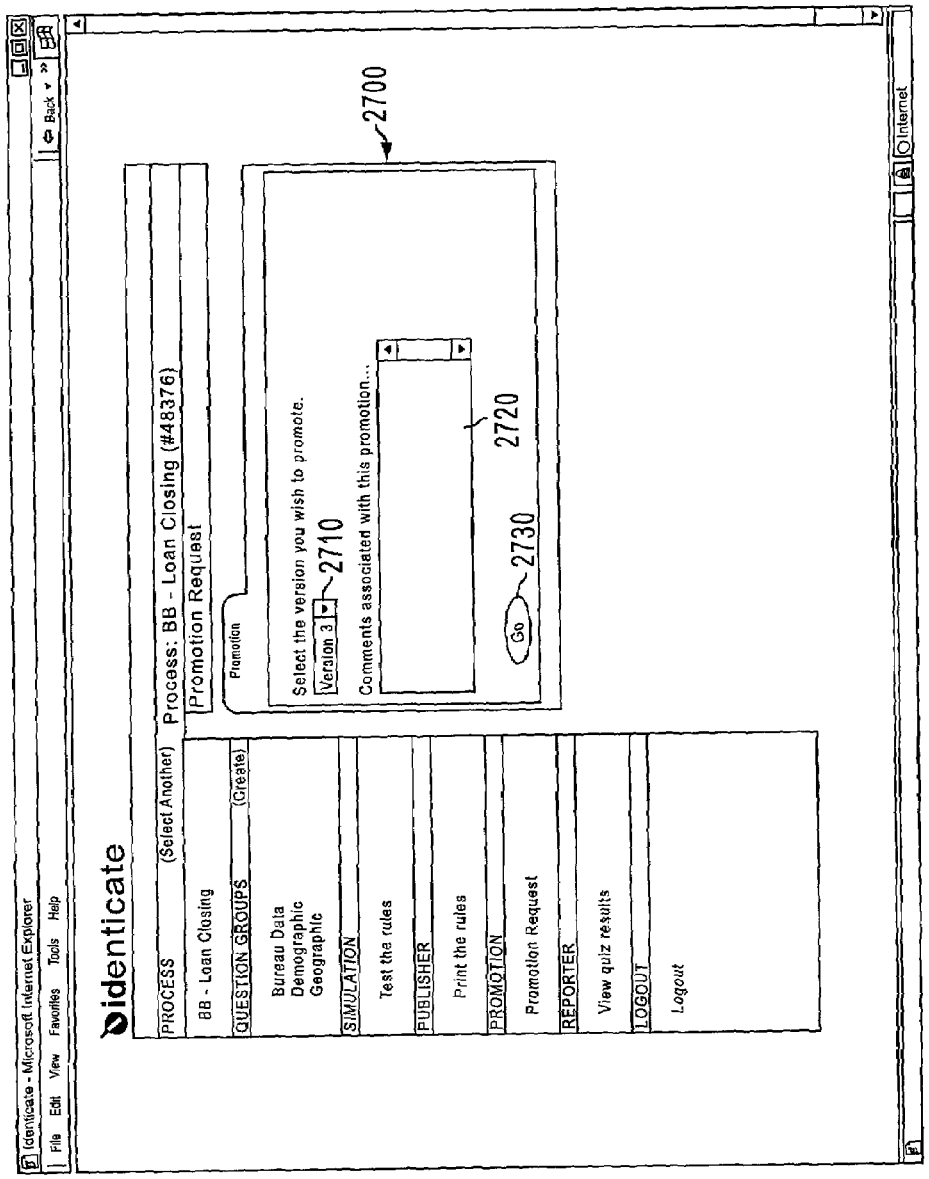
FIG. 27 is a display screen of the rules designer to request promotion of a user authentication process according to the present invention.

FIG. 27 is a display screen of the rules designer 235 to request promotion of a user authentication process 100 according to the present invention. In particular, by selecting the promotion request 1460 (FIG. 14), the promotion request table/view 2700 allows promotion of a user authentication process 100. A promotion request 1460 transitions authentication processes 100 of a vendor into either a simulation or a production environment. The simulation environment is used to test newly created and modified user authentication process 100 versions. The production environment loads the rules databases 245 with 'live' user authentication processes 100 to be used for consumer authentication. In particular, by providing rules designer 235 at a higher level of abstraction in relation to the authentication engine 240, Identicate can provide an automated promotion process as follows. The rules designer 235 provides the ability to promote rules/policy changes immediately by allowing changes to a user authentication process 100 via changing associated rules and informing via a promotion request 1460 the authentication engine 240 to use the changed rules (i.e., reload data model 520 with updated data from the rules databases 245) when authenticating users.

In FIG. 27, the 'promotion request' is initiated by selecting the 'select version' option 2710 to choose the version of the user authentication process 100 to be promoted. The 'comments' option 2720 provides any special instructions or communications in connection with the user authentication process 100 to be promoted. The 'Go' option 2730 transmits a promotion request notification. Such notification can be, for example, updating a status field of the user authentication process 100 being promoted in the rules databases 245.

FIGS. 28–32 are display screens of the rules designer's 235 testing and simulation manager according to the present invention. By providing the rules designer 235 at a higher level of abstraction in relation to the authentication engine 240, the rules designer 235 can define configurations of a user authentication process 100 as rules (parameters) stored in rules databases 245. The authentication engine 240 retrieves rules of a user authentication process 100 from the rules databases 245 to simulate and test the user authentication process 100 based upon the retrieved rules. A vendor can create and maintain various versions of user authentication processes 100 to test as part the vendor's business strategy. In particular, by selecting the simulation option 1440 (FIG. 14), the rules designer 235 provides a simulation and testing environment to simulate and test versions of user authentication processes 100 by vendors prior to submitting such processes into production to authenticate actual users. User authentication processes 100 can be promoted to simulation after modifications are completed using the rules designer's 235 user-authentication-process 100 management functions.

Figure 28:
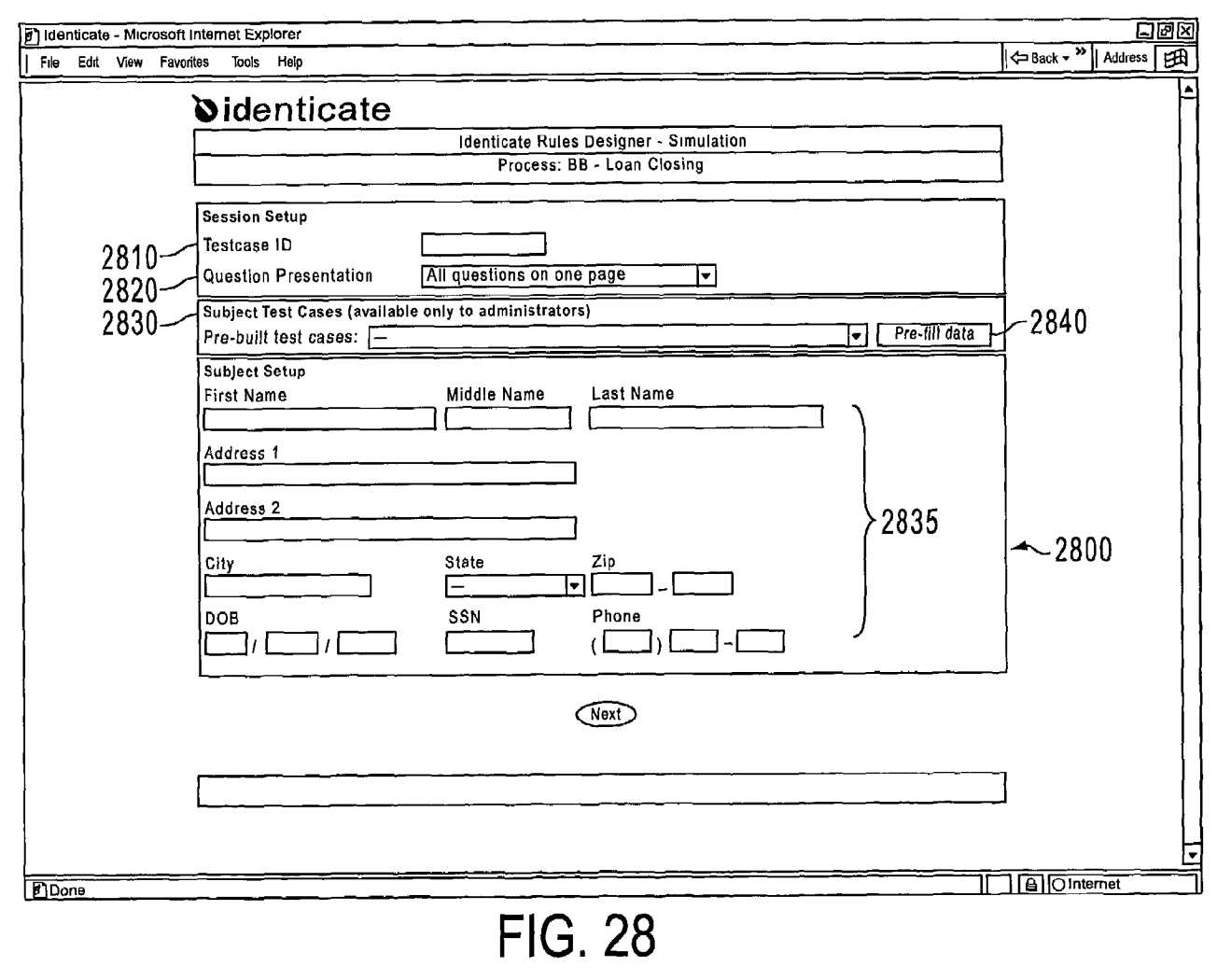

In FIG. 28, the simulation table/view 2800 allows testing of a defined/selected user authentication process 100 version. The 'test case ID' field 2810 identifies a test authentication process (case) 100. The 'question presentation' option 2820 specifies how test authentication questions 2010 are displayed, such as to display all questions on one screen. The 'subject test cases' option 2830 specifies, via pre-fill data option 2840, key selection information (i.e., corresponds to live environment's user-provided information to initiate an authentication request 300) to populate a selected test user/consumer application form 2835, which is based upon the test case already created for simulation.

In FIG. 28, the 'pre-fill data' option 2840 automatically fills input fields of the selected test user/consumer application form 2835 with the key selection information 2830 according to predetermined settings. Alternatively, the consumer application form 2835 can be manually completed.

Figure 29:
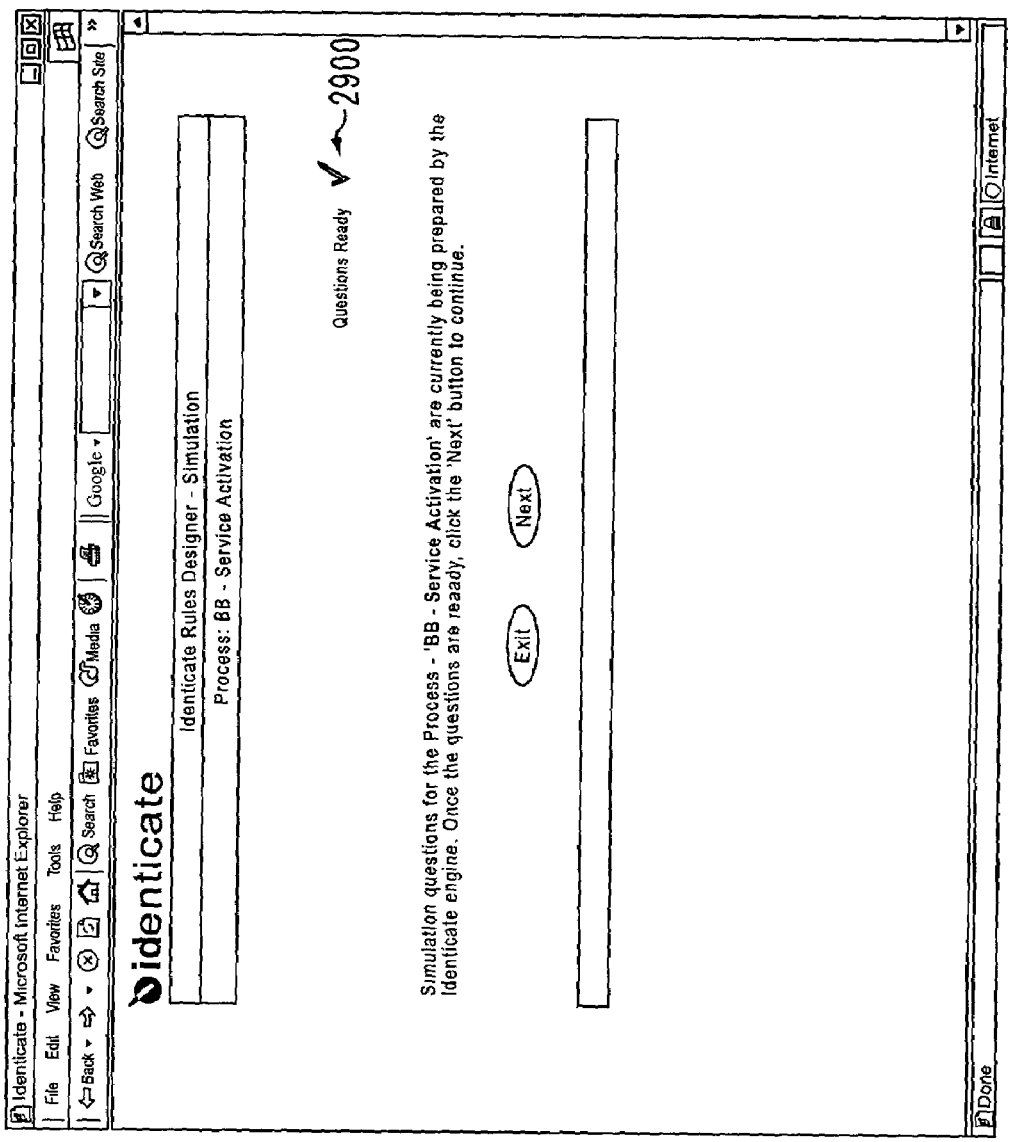
FIG. 29 is another display screen of the rules designer's testing and simulation manager according to the present invention.

FIG. 29 is a display screen 2900 indicating that authentication sub-processes 110 and/or 115 have been generated using the test case information 2835. In particular, the authentication engine 240 using the test case information 2835 generates test authentication questions 2010 according to authentication rules 245a and/or mapping rules 245b of the test authentication process 100 defined/selected in the rules designer 235. The authentication engine 240 can use live and/or simulated data sources 230 and/or 250 to generate an authentication examination based upon the rules 245 corresponding to a user authentication process 100 to be simulated. The rules 245a–n of the test authentication process 100 are stored in the rules databases 245 with status field of the rules indicating 'inactive' or 'test,' such that if there are multiple versions of the test authentication process 100, the authentication engine 240 would not attempt to load the rules in the data model 520 for a live user authentication.

Figure 30:
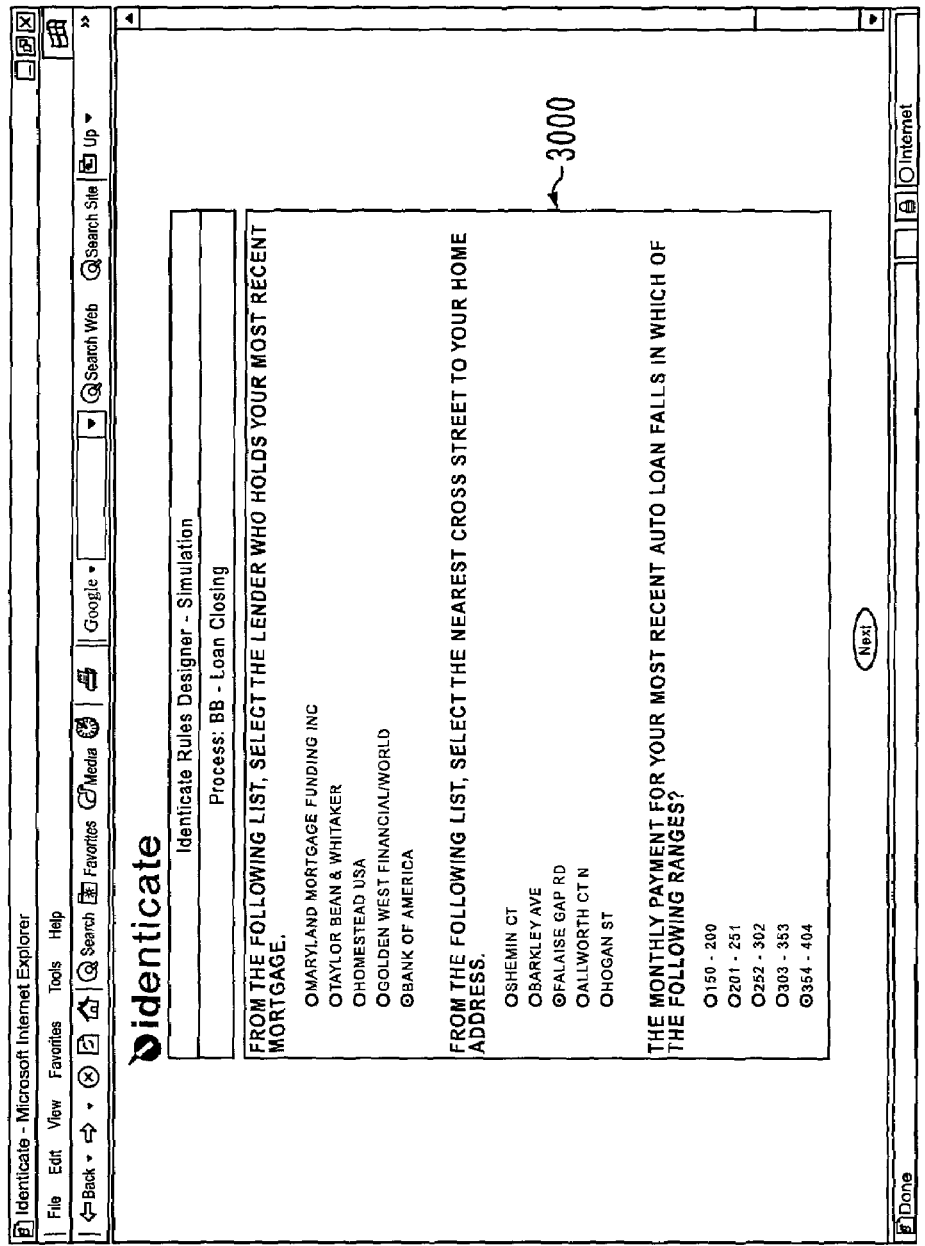
FIG. 30 is another display screen of the rules designer's testing and simulation manager according to the present invention.

In FIG. 30, once the authentication engine 240 generates the test authentication questions 2010, a simulation question & answer presentation layer 3000 is displayed for the tester to complete. Testing personnel can select correct answers and/or answer incorrectly. Score generation by the authentication engine 240 functions as though the test authentication process 100 is running live. The correct answers can be noted for each question so that a tester knows the appropriate response for the test authentication process 100.

Figure 31:
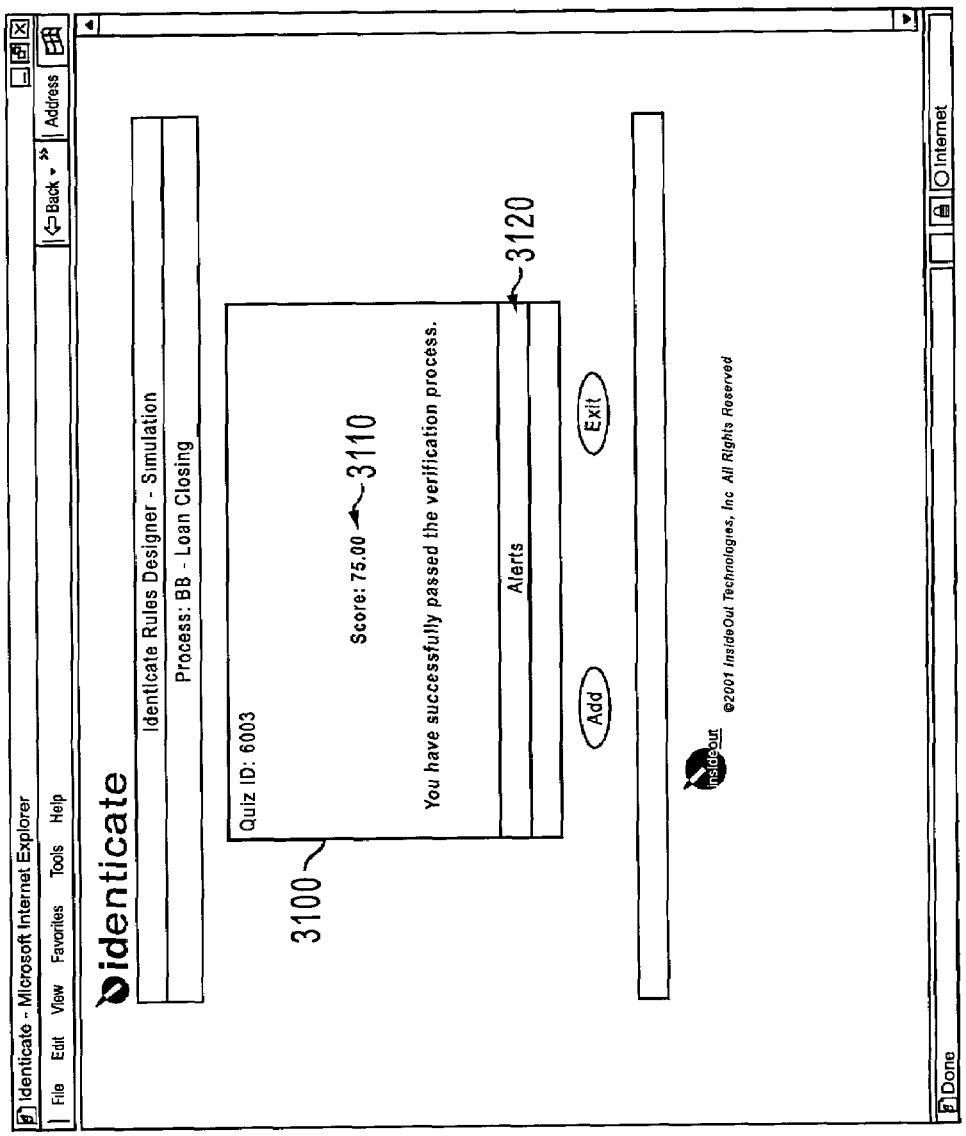
FIG. 31 is another display screen of the rules designer's testing and simulation manager according to the present invention.

In FIG. 31, the test authentication process 100 results are provided. In particular, the quiz identification 3100 can be used for logging and analysis of test authentication processes 100. Based on points assigned to each test authentication question 2010, the number of test authentication questions 2010 asked and the number of correct answers, the authentication engine 240 computes a confidence score 3110 for the test authentication process 100. Fraud alerts 3120 will be returned for any fraud alerts defined for the test authentication process 100 and factored into the score 3110, if configured for the test authentication process 100. Although, the example embodiment describes calculation of test confidence scores, the present invention is not limited to such configuration and a vendor can, depending on authorization processes, configure provision of other test results.

Figure 32:
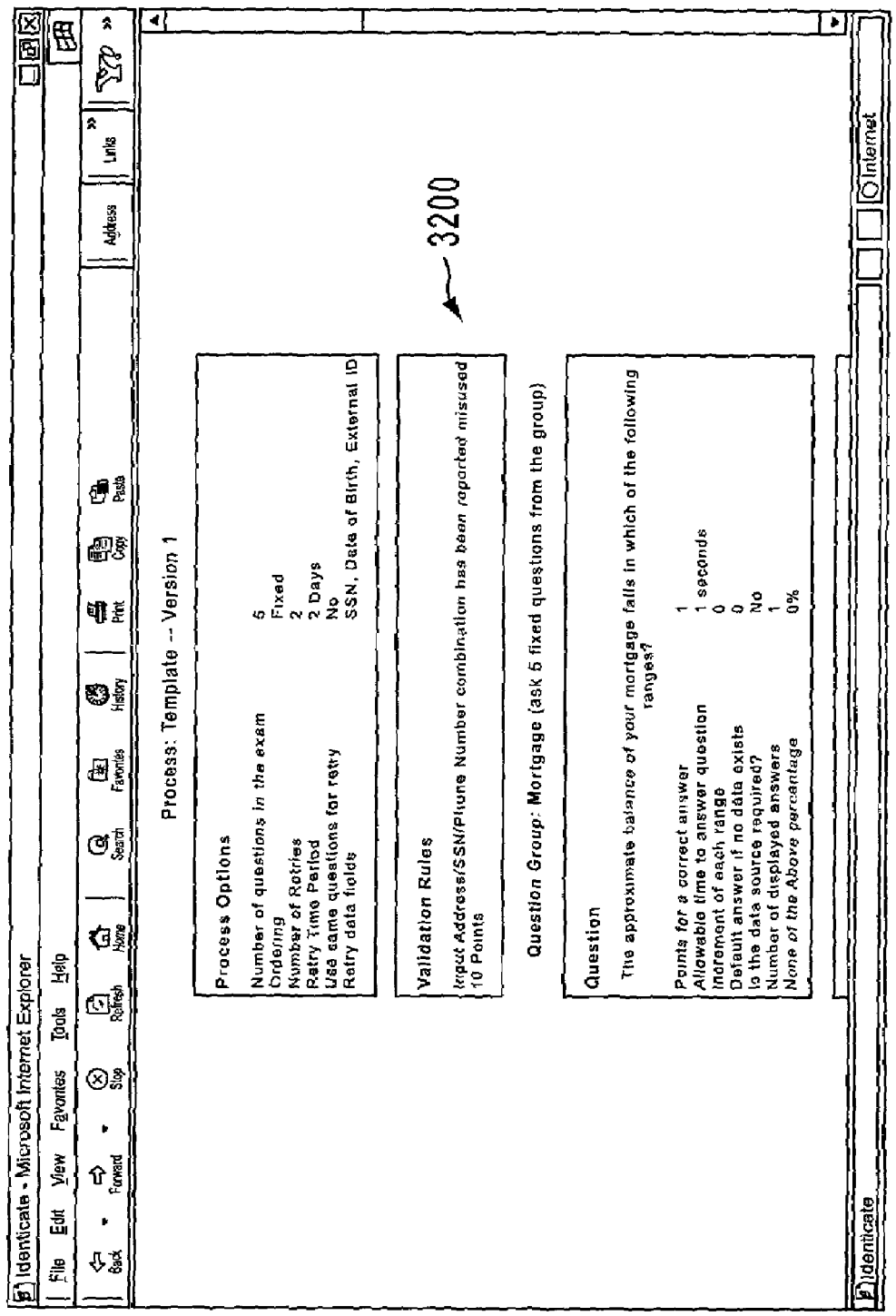
FIG. 32 is a display screen of the rules designer to publish a user authentication process according to the present invention.

FIG. 32 is a display screen of the rules designer 235 to publish a user authentication process 100 according to the present invention. The rules designer 235 provides functionality to view and print user authentication process 100 options, fraud alert rules, and question groups, including text and parameters, for each version of a user authentication process 100. In particular, by selecting the publish rules 1450 in the navigation area 1320 (FIG. 14), a browser window 3200 can display the selected user authentication process 100 information in a printer-friendly format. The browser's print function can be used to print the page 3200. The window 3200 is an example of published user authentication process 100 information and other user authentication process 100 information may be published.

Figure 33:
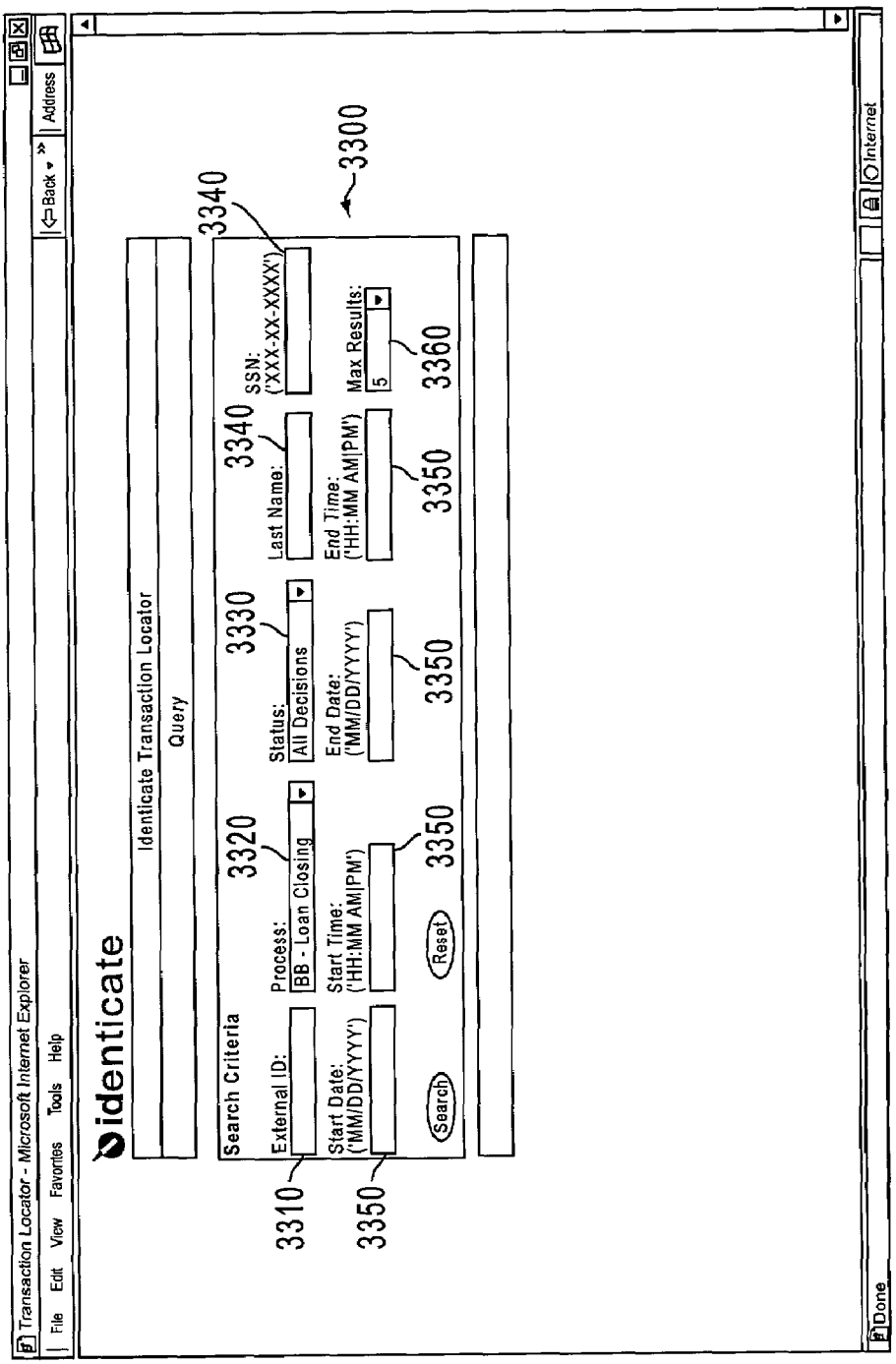
FIG. 33 is a display screen of the rules designer's auditing tool according to the present invention.
Figure 35:
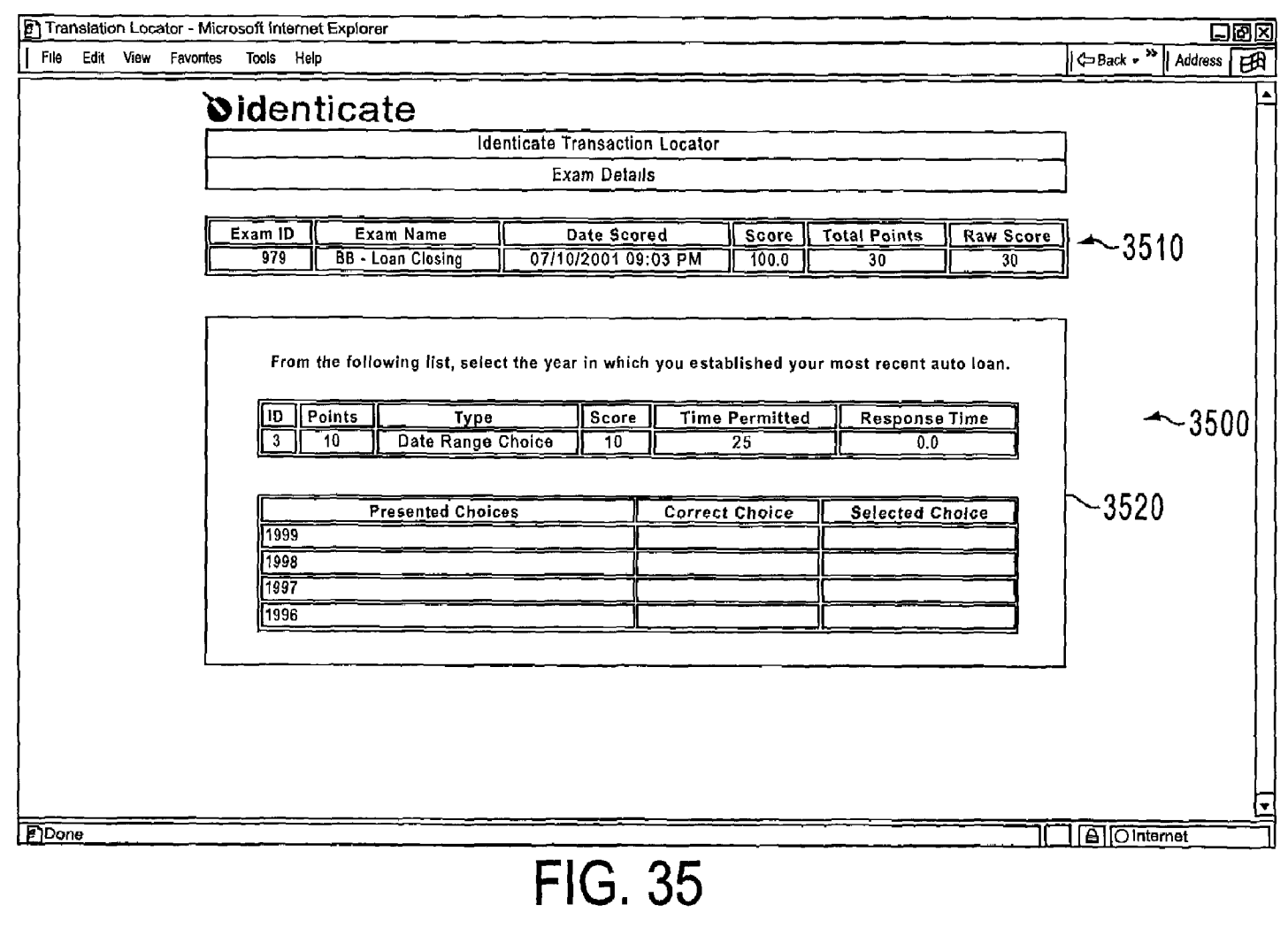

FIGS. 33–35 are display screens of the rules designer's 235 auditing tool 255 (transaction locator) according to the present invention. The rules designer 235 provides an auditing tool 255 to view authentication transactions, which are previously performed live and simulated user authentication processes 100. The master archive database 260 stores previously performed live user authentication processes 100. The auditing tool 32 can be accessed either through a link 1470 in the navigation area 1320 (FIG. 14) of the rules designer 235 or directly as a separate software tool.

In FIG. 33, the audit table/view 3300 allows querying functions on user authentication processes 100 using various search criteria. Some example search criteria are as follows. The 'external ID' search criteria 3310 searches using an identifier associated with each authentication transaction of user authentication processes 100. For example, the quiz Id 3110 supplied from simulation of an authentication process 100 can be used as the external ID search criteria 3310. The 'process' search criteria 3320 searches using name of a user authentication process 100. The 'status' search criteria 3330 searches using status information of user authentication processes 100. For example, a simulation process 100 can have four different statuses of complete, awaiting evaluation, awaiting answers, and awaiting test. The 'Last Name/SSN' search criteria 3340 searches using a user's names and/or SSN. The 'Start Date/Time & End Date/Time' search criteria 3350 searches a specific date range (with or without time stamps). For example, to see all user authentication processes 100 from July 4th until current date, the dates Jul. 4, 2001 and the current date would be entered in the record 3350. The 'Max Results' search criteria 3360 specifies the number search results returned by the auditor 255 for the query.

In FIG. 34, once a search of user authentication processes 100 has been initiated, a search results table/view 3400 provides a list of user authentication processes 100 meeting the search criteria. For example, the 'External ID' search criteria item in table 3400 can be selected to view more detailed information of the user authentication process 100 corresponding to the 'External ID.' Therefore, via the process search criteria 3320 of the audit tool 255, Identicate provides filtered authentication transaction location and/or reporting. In particular, Identicate allows for a "filtered" subset of the available transactions to be returned (i.e., search criteria are used to filter and provide a "filtered" set of results.

In FIG. 35, the user authentication-process 100 detail table/view 3500 provides a scoring record 3510 for an authentication transaction (e.g., identified with Exam ID) of a user authentication process 100 and a corresponding authentication-question record 3520, which can, for example, list all authentication questions and fraud alerts, the score associated with a correct answer, permitted/response times, the answer choices, and the correct/selected choices.

Other processes of auditing tool 255 (see FIG. 2) will be described next. The auditing tool 255 allows authentication process 100 analysis and strategizing by retrieving prior completed user authentication processes 100 (authentication transaction history) archived in the archive database 260, as follows. For example, the auditing tool 255 accommodates viewing in progress and/or completed user authentication processes 100. Therefore, if a user fails authentication, the auditing tool 255 can be used by a call center to view the details of the failed authentication.

The auditing tool 255 also supports applying strategy evolution or decision management techniques to a user authentication process 100. In particular, the present invention allows a vendor to store user authentication transaction history of user authentication processes 100, to input the transaction history into a system or process tracking and generating performance data of the user authentication processes 100, and to modify the vendor's authorization process, including the user authentication processes 100, based upon the performance data. User authentication performance data may be generated from other vendor systems and/or processes involved in the business transactions to which the user authentication processes 100 are being applied. Therefore, capturing and tracking of the user authentication performance data can be integrated with Identicate to optimize the user authentication processes 100, such as performing rapid strategy evolution to evolve performance of the user authentication processes 100. The concepts embodied in the STRATA decision support system, disclosed in U.S. Pat. Nos. 6,321,206 and 6,430,545 (the entire disclosures of which are incorporated herein by reference and collectively referred to as AMS rapid strategy evolution methods and systems) and owned by AMS (assignee of the present application), allow a vendor to monitor and evaluate the performance data of the user authentication processes 100, thus allowing the vendor to conduct strategy experimentation to optimize the user authentication processes 100 responsive to the performance data.

More particularly, Identicate allows dynamic and/or automatic strategic experimentation with user authentication processes 100, thus allowing dynamic strategic customization of the processes 100 (e.g., outpace user fraud trends, improve loss rates for a business, stay ahead of fraudster techniques for impersonating others). Further, automatic and/or manual performance data monitoring according to the vendor's authorization process and updating the rules database 245 responsive to the performance data can provide automatic strategy experimentation as well as automatic user authentication optimization. Therefore, the present invention can provide manually and/or automatically generating user authentication processes 100 based on aggregated performance data from previous and/or existing user authentication process experiments 100 in a manner conforming with AMS' rapid strategy evolution methods (i.e., application of AMS rapid strategy evolution methods to define/optimize new user authentication processes 100). Further, a rules designer 235 at a higher level of abstraction in relation to an authentication engine 240 provides means for dynamically evolving an authorization process. Advantageously, the present invention supports an underlying method of integrating authentication systems 200 with authorization processes of vendors, dynamically evolving the authorization processes to dynamically and/or automatically outpace fraud trends of users.

For performance data evaluation, the present invention can provide authentication transaction history of user authentication process experiments 100 relating to user interactions with the experiments as follows the present invention provides defining multiple user authentication processes 100 for each type of business transaction/event (e.g., driver license issuance, credit approval transactions) that requires a user authentication before authorizing the user to access the business transaction and randomly assigning the transactions to each type of user authentication processes 100, possibly using predefined percentages. Further, the present invention can incorporate a feedback mechanism to measure/determine most effective user authentication processes 100 for each type of business transaction. Further, a vendor can optionally have dynamic control over the allocation of the respective user authentication processes 100 to each type of business transaction. For example, three different user authentication processes 100 for a business transaction can each be assigned, two being applied to 10% of the given business transaction and one being applied to 80% of the given business transaction. Performance data can be aggregated for each of the three processes 100 and a new user authentication process 100 can be defined/selected based upon the performance data, often eliminating the (two) user authentication processes with the worst performance (i.e., champion/challenger strategy optimization).

More particularly, user authentication experimentation can be a process of assigning user authentication processes 100 to a business transaction (e.g., online furniture purchases), aggregating performance data of the user authentication process 100, and optimizing the user authentication process and/or experimentation based upon the performance data. Further, aggregating the performance data can be a process of aggregating the performance data over time according to values of a discrete and/or continuous dimension based upon a vendor authorization process, so that the values are changeable without technical intervention and applying online analytical processing (OLAP) technology to evaluate the aggregated results. Further, performance data aggregation can be for each assigned user authentication process 100 and/or at specific levels/components (e.g., question group component) within each assigned user authentication process 100 (i.e., the authentication transaction history provides history information of any vendor configured level/component of a user authentication process 100). Further, evaluating the aggregated results can be according to and/or incorporate a known AMS rapid strategy evolution method/system based upon best performing levels/components of each user authentication process 100 after analyzing the levels/components (i.e., combining best performing level/components from the assigned user authentication processes to create a new evolved/optimized user authentication process 100).

Further, the present invention allows defining user authentication experiments by dynamically varying/customizing authentication components and/or levels of user authentication processes 100, thereby providing dynamic multi-component/level user authentication experimentation. Variable user authentication experimentation provides means for dynamically and/or automatically outpacing fraud trends of users. More particularly, variable user authentication experimentation provides aggregating performance data of different user authentications and evaluating the performance data for creating optimized user authentication processes. Components/levels that can be varied for user authentication experiments can be as follows. For example, such authentication components/levels can include (without limitation) different sub-process 105, 110 and/or 115 settings, settings for each question of authentication sub-processes 105, 110 and/or 115, variations in the questions being asked from a data source, different question group priority, different data sources, and/or different variations in the number of components and/or levels used for authentication. Further, report groups can be assigned to each variable component/level such that the feedback process can track the predictive nature of each component/level of a user authentication process 100 and determine whether the user authentication process 100 should be more broadly leveraged or modified.

Further, as experiment variation, the present invention allows controlling/establishing a user authentication confidence score strategy as follows: because the rules designer 235 allows weighting of individual authentication questions, an aggregate score can be computed, for example, for each identity verification sub-process 115 including multiple authentication questions. Therefore, a calculated confidence score facilitates downstream processing based upon vendor requirements (authorization process) that determine whether a user's identity is sufficiently authenticated. More particularly, performance data can be captured corresponding to a confidence score strategy to assess the effectiveness of the confidence score.

Further, as experiment variation the present invention allows modification of the points (or weights) assigned to each authentication question. The user's confidence score can be used as basis of a predictive model for user fraud when capturing corresponding performance data. This predictive model can be continually refined and revised as authentication questions and/or their associated point are changed.

Further, as experiment variation, the present invention allows specifying data sources 230 and/or 250 to use in a user authentication process 100, such as credit bureau data (i.e. mortgage, auto, credit card trades), out-of-bureau data, geographic data (i.e. 'what is the closest cross street to your home address?'), demographic data (i.e. 'name another resident of your household over 18 years old'), political information, and/or government supplied information. For example, for a fraud alert sub-process 110, various data sources 230 and/or 250 can be specified to validate user information to detect fraud and for an identity verification sub-process 115, various data sources 230 and/or 250 can be specified, which can indirectly control generation of authentication questions by the authentication engine 240. Therefore, controlling data sources 230 and/or 250 allows real-time dynamic control of fraud alert services and authentication questions, establishing a confidence score strategy that allows configuring fraud alerts and authentication questions that query users for a combination of in-wallet and out-of-wallet data that, theoretically, only a single/specific individual could supply.

Example confidence score calculations and strategies will be described next. To develop a confidence score, for example, for an identity verification sub-process 115, a vendor determines the points for each authentication question to derive predictive confidence scores. A predictive confidence score is a threshold that indicates whether the vendor's organization feels the user has been authenticated sufficiently enough to proceed with a business transaction. Questions weighing involves the assigning of point values to all of the questions that comprise an authentication sub-process 115 of a user authentication process 100.

The authentication engine 240 generates a confidence score upon completion of the identity verification sub-process 115. The authentication engine 240 determines which questions are answered correctly and totals the associated points for each correct response. The total number of potential points for the identity verification sub-process 115 divides total correct points to compute the confidence score ("sum of correct answer points"/"total potential points"). The resulting confidence score can be multiplied by 100 to provide a value between a range of 0–100. The calculated confidence score can be provided, for example, to vendor system 215.

Two methods of equal and unequal question points can be used in creating a vendor's confidence score strategy. First, equal point values can be assigned to questions in cases where the vendor does not feel it is necessary to indicate the relative importance of a question within the identity verification sub-process 115. In these cases, each question is deemed of equal importance to the resulting identity verification. The vendor determines how many questions must be answered from the total number specified for an individual session (e.g. 'x of y').

Second, unequal point values are assigned to questions in cases where the vendor deems specific questions more predictive of potential fraud. This method provides for more complex identity verification sub-process 115 in which a user may be required to answer a set number of high point value questions in order to reach a threshold for positive verification. Added sophistication could be applied to a confidence score strategy using weighted averages, interdependencies, or linear regression, or other such algorithms.

In particular, a confidence score strategy using unequal point values can be established as follows. First, determine question groups to be asked (i.e. mortgage, credit card, geographic, demographic). Second, determine the relative importance and predictive power of each question group (i.e. mortgage>geographic>credit card>demographic). Third, determine the number of questions from each question group to be asked (i.e. Four questions: 1—mortgage, 1—credit card, 1—geographic, 1—demographic). Fourth, assign weights to each question within each question group (i.e. mortgage=100 points, geographic=50 points, credit card=25 points, demographic=25 points). Fifth, given the total achievable score, determine the confidence thresholds for positive authentication, negative authentication, and if required, the threshold to send users to manually review. (i.e. positive>/=75%, manual review=62.5%, negative</=50%)

The above example requires that a user correctly answer the mortgage question for a positive authentication in addition to correctly answering either the geographic question or both the credit card and demographic questions. The user can be directed to a manual review if they correctly answer the geographic, credit card, and demographic questions, or if they answer the mortgage question and either the credit card or demographic questions correctly. Any other combination of correct answers would result in a negative authentication.

The described scoring algorithms and strategies are examples. The present invention is not limited to such examples and other scoring algorithms and strategies could be provided.

Although, the above scoring algorithm examples do not include user information validation for fraud detection, fraud alerts may operate in a similar fashion as authentication questions. Each time a fraud alert is/is not triggered, the consumer is awarded the associated points for the positive validation. Points are contributed to the total, and the final score is computed in the same manner.

Although, the example embodiments illustrate using data sources for fraud detection 42, the present invention is not limited to using data sources and other fraud detection methods can be dynamically configured using rules designer 235. For example, another fraud detection sub-process 110 method can use biometric data. In particular, a user's facial patterns, mannerism and/or body movements (i.e., real-time behavior and/or feeling information), during the authentication sub-processes 110 and/or 115, can predict deceit. Real-time behavior and/or feeling information can be used to leverage biometric functionality as what a user knows during a user authentication process 100, which can increase authentication confidence even if information input by a user is correct but the user is impersonating another user. Therefore, a user may be authenticated during information validation and/or fraud detection sessions only based upon information input by a user to initiate authentication, obviating authentication question generation and costs associated therewith. For example, if the user is looking away from the camera and/or is hesitating when typing, can be indicative of possible fraud. Such real-time behavior information may be collected according to conventional methods.

Figure 36:
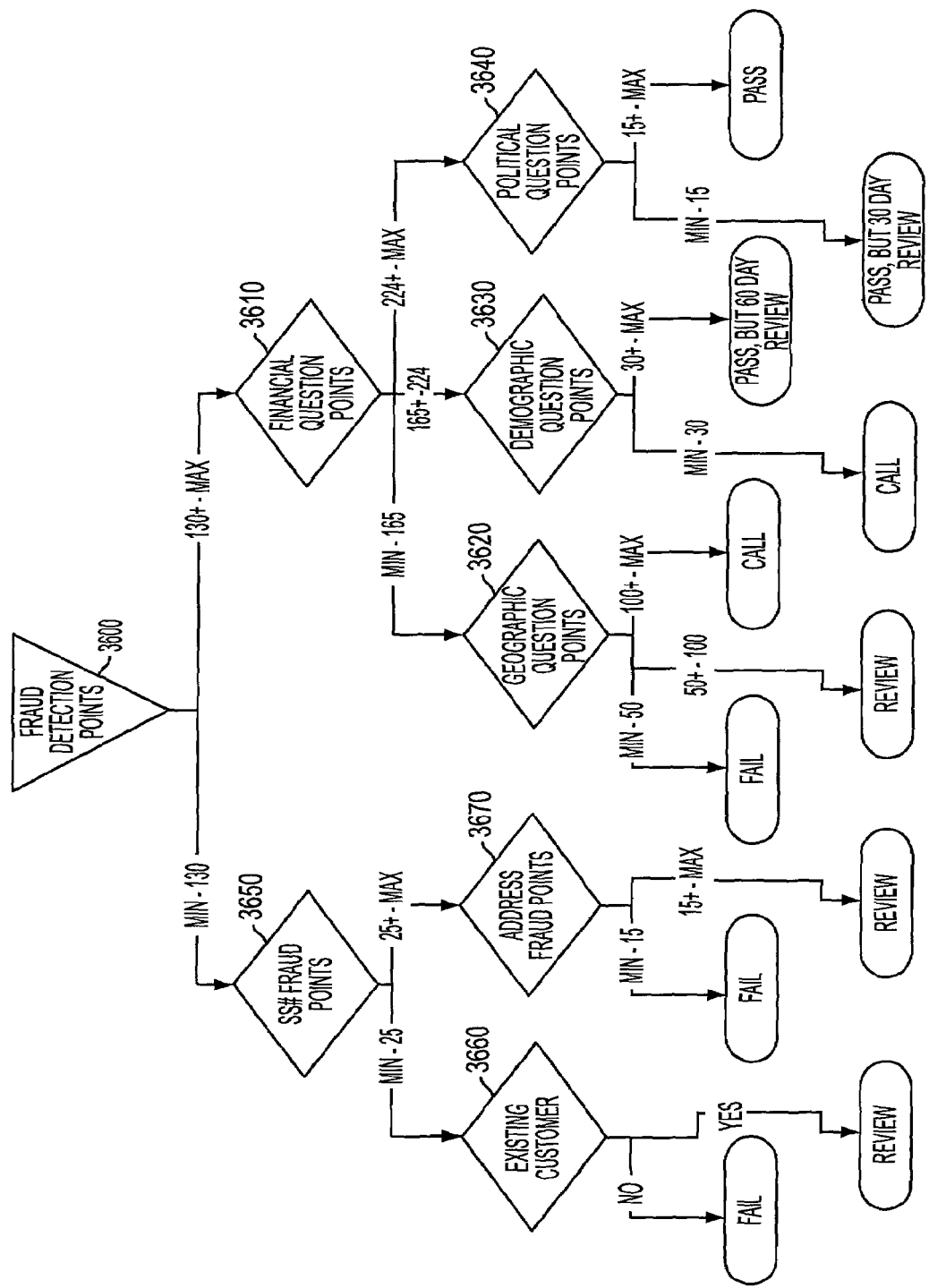
FIG. 36 is an example score assessment decision tree according to the present invention.

FIG. 36 is an example score assessment decision tree used by authentication engine 240 according to the present invention. At 3600, the authentication engine 240 checks fraud detection points. If at 3600, the fraud detection points are more than 130 points, then at 3610 financial questions points are checked. If at 3610, the financial question points are more than 224 points, at 3640 political question points are checked. If at 3640, the political question points are more than 15 points, then user passes (e.g., authenticated). If at 3640, the political question points are less than 15 points, then the user passes but with a 30 day review condition.

If at 3610, the financial question points are between 165 points and 224 points, then at 3630 demographic question points are checked. If at 3630, the demographic question points are more than thirty, the user passes but with a 60 day review condition. If at 3630, the demographic question points are less than thirty, the user must contact the vendor or the vendor calls the user.

If at 3610, the financial question points are less than 165, then at 3620 the geographic question points are checked. If at 3620, the geographic question points are more than 100 points, the user must contact the vendor or the vendor contacts the user. If at 3620, the geographic question points are between 50 and 100, a review of the user information is required. If at 3620, the geographic questions points are less than 50, the user fails authentication.

If at 3600, the fraud detection points are less than 130, then at 3650 the SSN fraud points are checked. If at 3650, the SSN fraud points are more than 25 points, then at 3670 address fraud points are checked. If at 3670, the address fraud points are more than 15, a review of the user information is required. If at 3650, the SSN fraud points are less than 25 points, then at 3660 it is determined if the user is an existing/prior user of the vendor. If at 3660, the user is an existing user of the vendor, a review of the user information is required. If at 3660, the user is not an existing user, the user fails authentication. Therefore, FIG. 36 demonstrates sophisticated interpretation of a score, and the elements comprising the score, to determine action. More particularly, In FIG. 36, the example score assessment and interpretation thereof, illustrates applying user authentication strategy at a question group components of a user authentication process 100.

Figure 37:
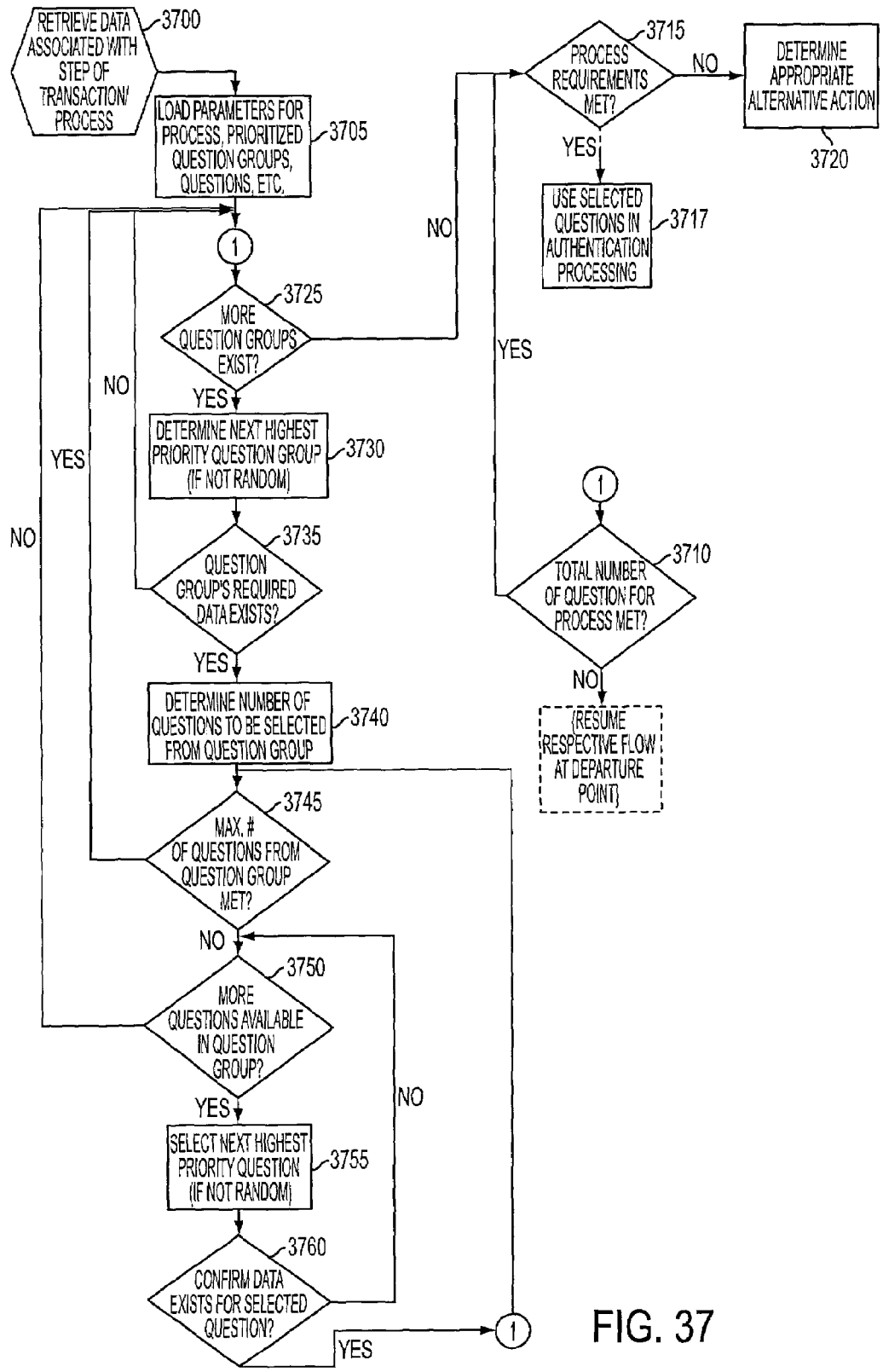
FIG. 37 is a flow chart to select questions.

FIG. 37 is a flow chart for the authentication engine 240 to select authentication questions according to a vendor's rules 245*a*–*n*. In particular, FIG. 37 is an example process flow of authentication engine 240 to select authentication questions 2010 for a defined identity verification sub-process 115 of a user authentication process 100. At 3700, the authentication engine 240 retrieves data (i.e., a vendor authentication profile 305) associated with a received authentication request 300. At 3705, the authentication engine 240 loads that data model 520 based upon the vendor authentication profile 305. For example, the data model 520 can be loaded with the identity verification sub-process 115 parameters, such as prioritized authentication question groups, authentication questions, etc.

In FIG. 37, at 3710, the authentication engine 240 determines if total number of authentication questions for the identity verification session 115 has been met. When at 3710 total number of authentication questions are met, the authentication engine 240 at 3715 determines if user authentication process 100 requirements are met. If at 3715, the user authentication process 100 are not met, the authentication engine 240 at 3720 determines appropriate alternative action. If at 3715 the user authentication process 100 requirements are met, the authentication engine 240 proceeds to 3717 to use the selected questions. If at 3710 total number of authentication question are not met, the process flow resumes at point of departure to 3710 (e.g., 3725, 3760).

In FIG. 37, at 3725, the authentication engine 240 determines if more questions groups exist. If at 3725 no more questions groups exist, the authentication engine 240 at 3715 determines if user authentication process 100 requirements are met. If at 3715, the user authentication process 100 are not met, the authentication engine 240 at 3720 determines appropriate alternative action. If at 3715 the user authentication process 100 requirements are met, the authentication engine 240 at 3717 executes the identity verification sub-process 115 (i.e., sends a user authentication transaction 310 to the user system 220) with the selected authentication questions.

In FIG. 37, if at 3725 more question groups exist and the no random option has been set, the authentication engine 240 at 3730 determines the next highest priority question group. At 3735, the authentication engine 240 determines if the questions group's required data exists. If at 3735 the required data does not exist, the process flow returns to 3710. If at 3735 the required data exists, the authentication engine 240 at 3740 determines number of questions to be selected from question group. At 3745, the authentication engine 240 determines if maximum number of questions form the question group is met. If at 3745, the maximum number of questions has been met, the process flow returns to 3710. If at 3745 the maximum number of questions has not been met, the authentication engine 240 at 3750 determines if more questions are available in the question group. If at 3750 more questions are not available, the process flow returns to 3710. If at 3750 more questions are available, the authentication engine 240 at 3755 selects the next highest priority question.

In FIG. 37, at 3760, the processing engine 240 confirms if data exists for the selected question. If at 3760 data does not exists for the selected question, the process flow returns to 3750 to check for other questions in the selected question group. If at 3760 data exists for the selected question, the processing flow returns to 3710.

Figure 38:
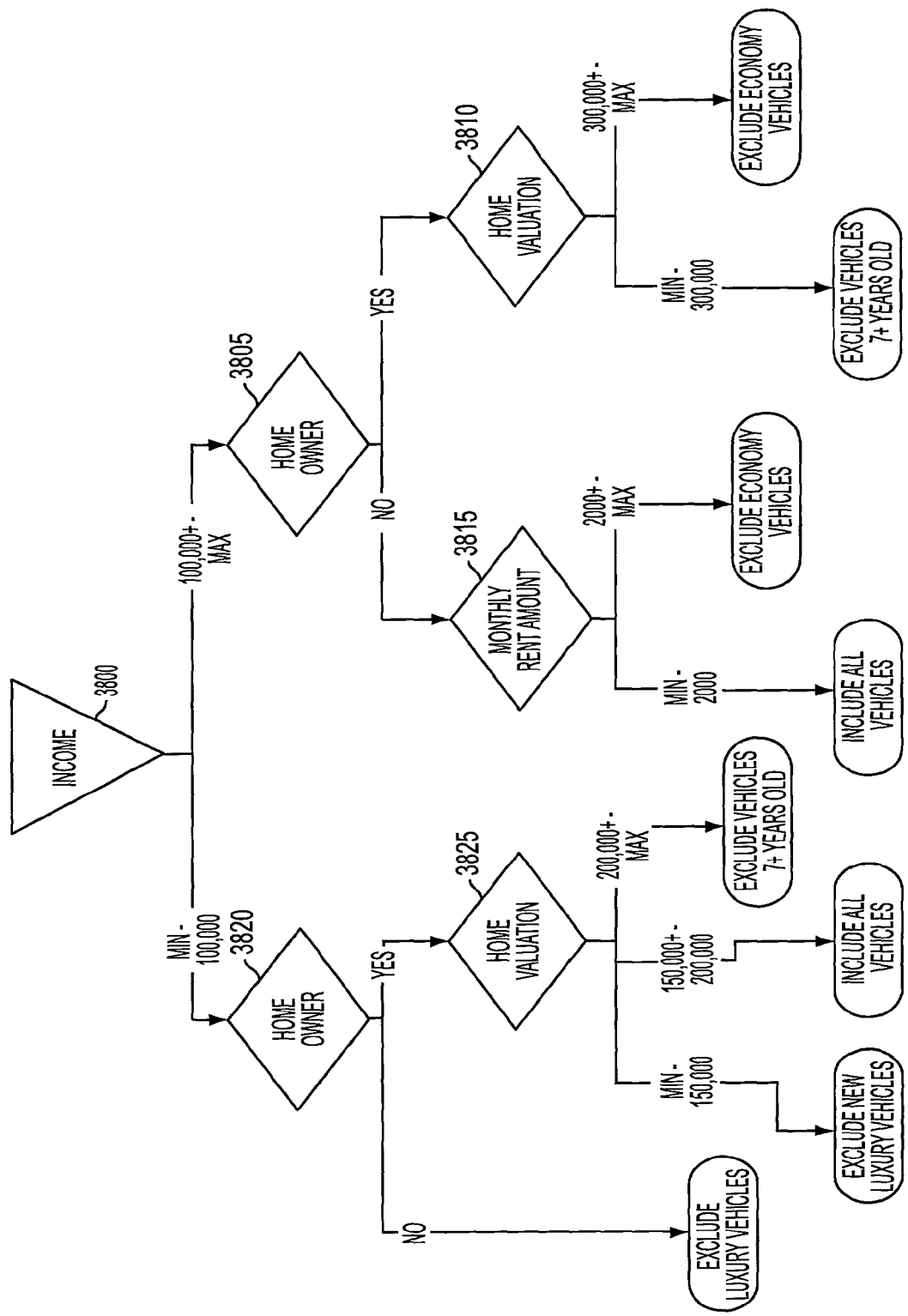
FIG. 38 is a flow chart for example vehicular question wrong answer exclusion according to the present invention.

FIG. 38 is an example flow chart of wrong answer exclusion for a vehicular question wrong answer, according to the present invention. In particular, the present invention can provide, for example, identity verification sub-process 115 questions with context sensitive "wrong" multiple-choice answers. In particular, the "wrong" multiple choice answers are context sensitive by being within the context of the data source accessed to determine the "right" answer, advantageously providing consistent multiple-choice answers, which improves true user authentication results (i.e., reducing false positive user authentication results). Context sensitive wrong answer choices reduce false positives user authentication results because a user is less likely to guess a correct answer choice if wrong answer choices relate to and/or are based upon data about the user.

In FIG. 38, at 3800, the user's income is checked and if more than $100,000 at 3805 it is checked if the user owns a home. If at 3810 it is determined that the home value is more than $300,000, economy vehicle names are excluded from wrong answer choices of a vehicular related authentication question. If at 3810, the home value is less than $300,000, vehicles that are 7 or more years old are excluded.

In FIG. 38, if at 3805 the user does not own a home, at 3815 the user's monthly rental amount is checked. If at 3815 it is determined that the monthly rent amount is more than $2000, then economy vehicle names are excluded from wrong answer choices. If at 3815, the monthly rent amount is less than $2000, then all vehicles can be included in answer choices.

In FIG. 38, at 3820 it is checked if the user owns a home when the user's income is less than $100,000. If at 3825 the home value is less than $150,000, new luxury vehicles are excluded. If at 3825 the home value is between $150,000 and $200,000, all vehicles can be included. If at 3825 the home value is more than $200,000, vehicles that are 7 or more years old are excluded. If at 3820, the user does not own a home, luxury vehicles are excluded from answer choices.

Figure 39:
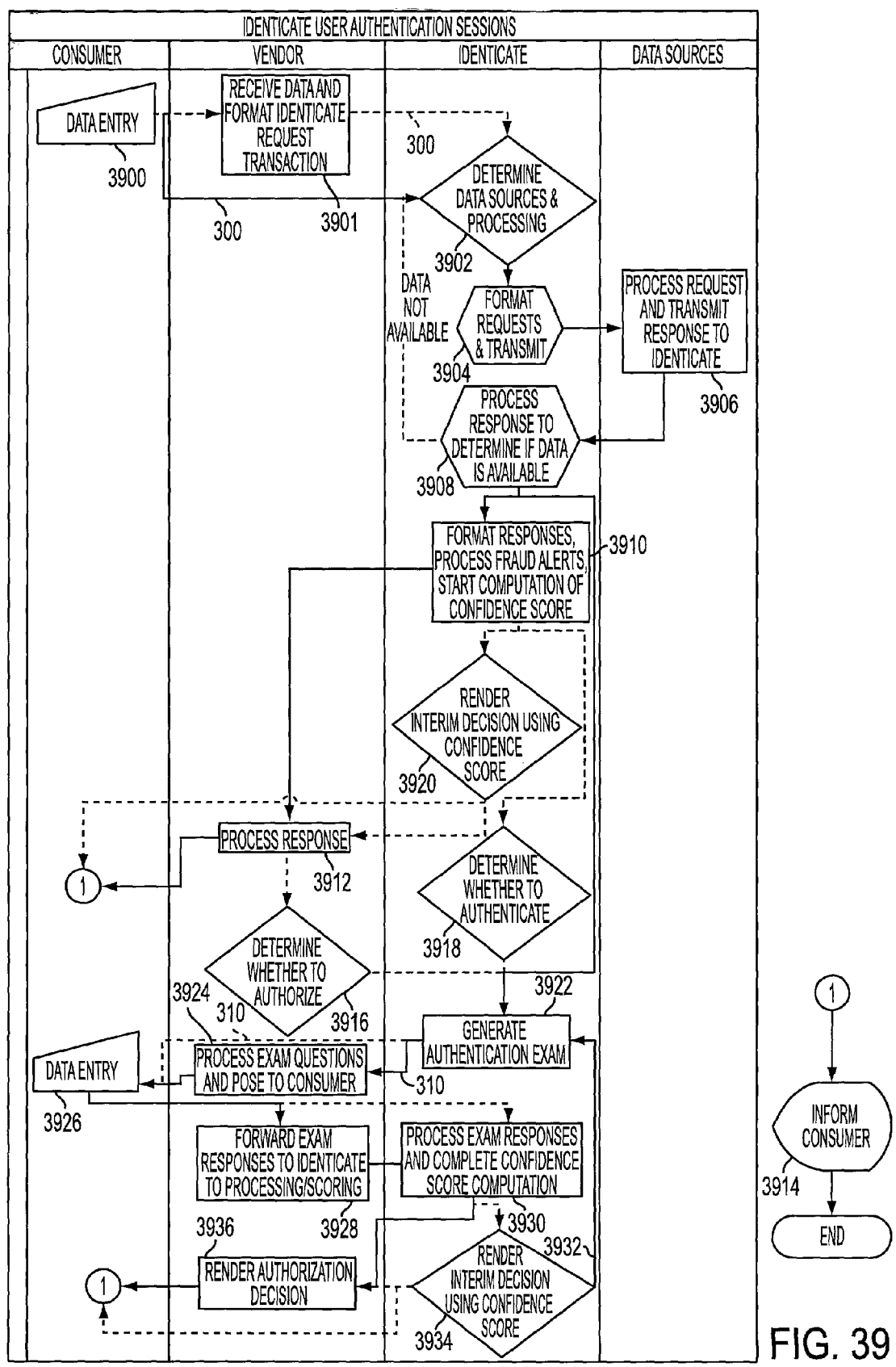
FIG. 39 is a flow chart of an example process to authenticate a user according to the present invention.

FIG. 39 is an overall flow chart of example operations to authenticate a user with Identicate to support a vendor's business transaction according to the present invention. With reference to the flowchart along the solid lines, Identicate at 3900 captures (e.g., web site redirect communication model) consumer data used to initiate authentication (e.g., name, address, SSN, etc.), transforms the consumer data into an authentication request transaction 300, and at 3902 determines data sources 230 and/or 150 to access and processing to be performed on input consumer data. Alternatively, at 3901 Identicate can directly (indirect consumer interface) receive the captured consumer data from a vendor via an authentication request transaction 300 (i.e., business-to-business transaction communication model between vendor and Identicate). The differentiator is whether Identicate or the vendor captures the consumer data. Advantageously, the business-to-business communication model can accommodate (interface with) vendor's existing display screens and existing data capture processing, requiring, for example, minimum or no changes.

In FIG. 39, at 3904 requests are generated according to applicable rules 245a–n and transmitted to third party data/service providers 230 (e.g., FRAUD DETECT, HAWK, HAWKEYE, TRANS ALERT, FACS+, credit history, user profile, fraud, geographic, demographic, government supplied, political, biometric, and/or digital certificate information, etc.) to process the generated requests. The rules 245a–n are defined using rules designer 235.

In FIG. 39, the generated requests at 3904 can be validation of the input consumer data, which remains within Identicate (in which case 3906 and 3908 may not be necessary) and/or fraud detection processing 110, which may be processed by Identicate and/or an external provider. At 3906 third party data sources/service providers process the generated requests and provide results to Identicate. At 3908 Identicate receives the results from the third party data sources/service providers. Identicate processes the results according to the rules 245a–n, such as formatting, processing any fraud alerts, or computing preliminary confidence scores at 3910, or rendering an interim authentication decision at 3920.

In FIG. 39, the processed results, such as the preliminary confidence score or the interim authentication decision, depending on the rules 245a–n can be provided to the vendor at 3912. The vendor can further process these results, for example, by rendering an authentication decision and informing the consumer of the authentication decision at 3914. Alternatively, the interim authentication decision from Identicate at 3920 can be directly provided to the consumer at 3914.

In FIG. 39, either the vendor at 3916 or Identicate at 3920, depending on rules 245a–n (e.g., depending on the interim authentication decision at 3920, as specified by the vendor in the authentication rules 245a–n) can continue to authenticate the consumer. If user authentication is continued, with reference to the flowchart along the solid lines, Identicate at 3922, based upon rules 245a–n, generates an authentication exam as a user authentication transaction 310 for an identity verification sub-process 115 to pose authentication questions 2010 to the consumer. The authentication questions 2010 can be based upon the data sources 230 accessed during the fraud detection processing 110. Alternatively, at 3922 depending on the rules 245, as part of a multi-step authentication other data sources 230 can be accessed. The vendor receives the authentication questions 2010 from Identicate at 3924 (e.g., business-to-business transaction communication model). The vendor at 3924 processes the exam and queries the consumer at 3926 using the exam questions 2010. Alternatively, Identicate can directly at 3926 query the consumer using the exam questions 2010 (e.g., web site redirect communication model).

In FIG. 39, at 3930, Identicate processes input consumer information in response to the exam questions 2010 by comparing the responses against known data sources (correct answer(s) from the reply) previously returned by the respective third party data/service providers during fraud detection processing 110. Identicate receives the input consumer information either directly from the consumer or indirectly via the vendor at 3928. Identicate can process the input consumer information at 3930, for example, to compute, according to the authentication rules 245a–n, a complete confidence score or to render an interim authentication decision using the computed confidence score at 3934.

In FIG. 39, at 3936, the vendor receives the processed input consumer information from Identicate, such as the completed confidence score result or the interim authentication decision result, and uses these results to process the results, for example, to render an authorization decision according to an authorization process and informing the consumer of the authorization decision at 3914. Alternatively, the interim authentication decision from Identicate at 3930 can be directly provided to the consumer at 3914 or could trigger according to the rules 245 (i.e., vendor's authorization process) an additional user authentication process 100 or part of a multi-step authentication process 100, thereby providing vendor-configured multi-step authentication. For example, at 3934 operation would return to 3922 via 3932 to generate another authentication exam.

Figure 40:
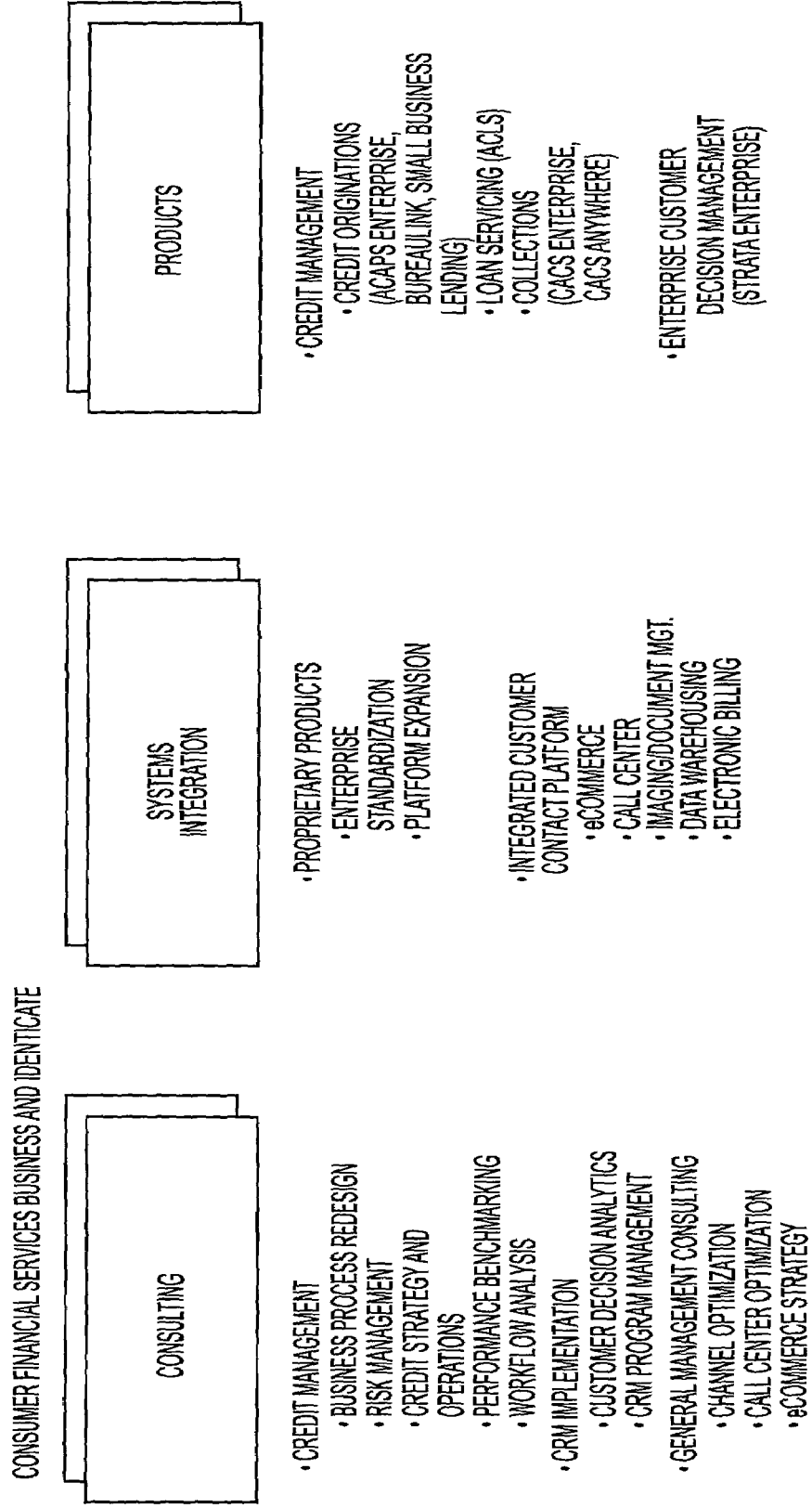
FIG. 40 is a diagram illustrating services supplied by a system/service provider using the present invention.

FIG. 40 is a diagram illustrating example services a system/solution provider can supply using Identicate. In particular, Identicate allows the system/solution provider to supply services that span consulting, system integration and authentication product/service offerings, including, but not limited to, authorization process strategy consulting, by providing rules designer 235 and authentication engine 240 at different levels of abstraction, exposing authentication functions to a vendor using Identicate for authenticating users. The present invention provides the ability to adapt to new user authorization processes of vendors, to adapt to new data sources to support user authentication processes and interoperable with other business systems to create an overall user authentication business solution, which includes strategy consulting to support the vendor's overall authorization process strategy. Alternatively, Identicate being a dual-use software solution, may be provided to vendors as a software product, allowing vendors to manage operation of the software, the user authentications and authorization processes.

Figure 41:
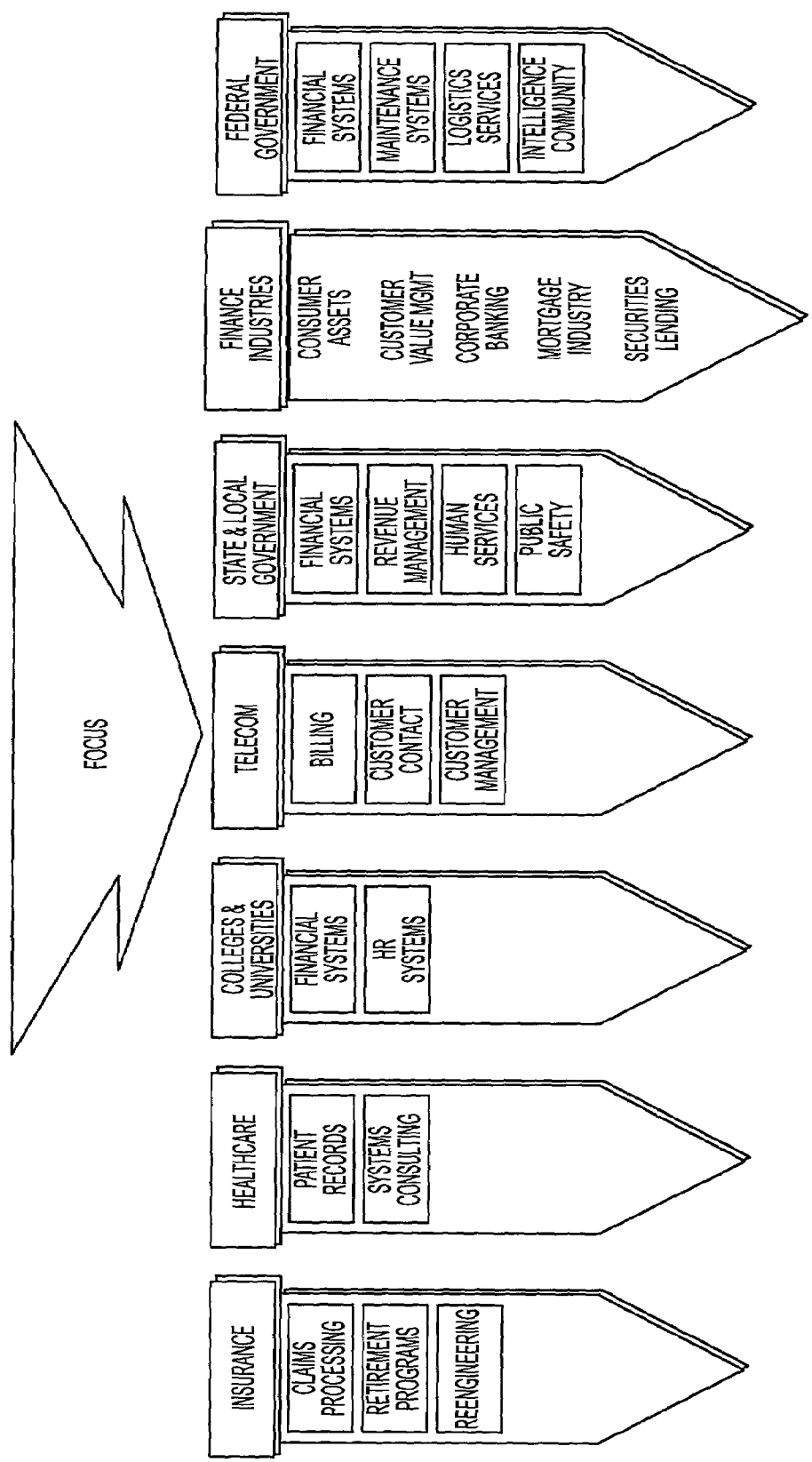
FIG. 41 is a diagram illustrating example business sectors using the present invention.

Although, the example embodiments illustrate using the present invention in consumer financial services sector, the present invention is not limited as such. With reference to FIG. 41, the present invention can be used in other business sectors such as insurance, healthcare, telecommunications, academia, and government.

A rules designer 235 defining rules 245*a–n* and at a higher level of abstraction in relation to an authentication engine 240 in communication with a data model 520 and accessing the rules via the data model 520, provides means for dynamically and/or automatically customizing user authentication processes and/or experiments, means for data agnostically generating user authentication examinations, means for authenticating users based upon two or more factors of what a user knows, what a user has and/or what a user is, and means for allowing dynamic and/or customized performance data aggregation, evaluation and strategy evolution.

The associated invention, while explained herein for authentication, could also support the generation of any type of examination using data and rules. In essence, the invention is, at its fundamental core, an examination engine. More specifically, to execute an examination, one typically has (1) data, (2) questions based on such data, and (3) a scoring process where the correct answers are compared against results provided by each respective user. While the use of the invention described herein is generally for the purpose of generating an examination to confirm an individual's identity, at least partially based on what they know about themselves, the invention could easily be applied to assess what an individual knows about any given topic. Data sources would be integrated for the respective topic, questions would be defined for the data sources, and rules governing which questions are to be asked, how often, etc. would be defined. This invention used as an examination engine has the benefit of allowing examiners administering examinations to define rules such that random examinations of equal merit in assessing an individual's knowledge on a topic can be produced for a given set of individuals without the tedious process of an examiner manually creating each examination and possibly not doing so in a manner that ensures fairness.

For example, if the invention were to be used to generate an examination on Civil War history, the data sources could include online encyclopedias, the Library of Congress, etc. The rules and the associated rules designer application would require simple modification to the screens such that they are context sensitive to History being the base of knowledge (vs. authentication). The examiner might decide to have 20 questions on each exam presented in random order. The examiner might define 5 question groups, each containing a level of difficulty for the contained questions and 4 questions would be selected from each question group in random order. As such, once the questions are defined for the respective data sources, the examiner could quickly produce exams for their class while introducing variability into the examination process without materially compromising fairness. This would make cheating within the respective class difficult, particularly if there are different types of questions defined (multiple choice, T/F, etc.).

This generic examination capability could be used in education, government (written driver's license exams), employment screening, etc.

The many features and advantages of the present invention are apparent from the detailed specification and thus, it is intended by the appended claims to cover all such features and advantages of the system which fall within the true spirit and scope of the invention. Further, numerous modifications and changes will readily occur to those skilled in the art from the disclosure of this invention. It is not desired to limit the invention to the exact construction and operation illustrated and described; accordingly, suitable modification and equivalents may be resorted to, as falling within the scope and spirit of the invention and the claims.

What is claimed is:

1. A system authenticating users, comprising:
  a programmed processor
    generating authentication rules for defining configuration parameters for a user authentication process, based upon specifying a configuration parameter for one or more authentication sub-processes of information validation, fraud detection or identity verification, for one or more data sources, or for one or more authentication factors, or any combinations thereof, according to input user authentication process creation information,
    authenticating users according to the authentication rules responsive to user authentication requests, and
    configuring the authentication rules in real-time, thereby allowing real-time authentication process customization in the system.

2. The system of claim 1,
  wherein the authentication rules define the user authentication process using any data sources providing information about the user, information known to the user, or both, to authenticate the users, thereby providing a data agnostic system;
  wherein the authentication rules define two or more authentication factors, thereby providing a multi-factor user authentication process; and
  wherein authentication strategies correspond to the authentication rules, thereby allowing the system to support authentication strategy experimentation.

3. The system of claim 1, wherein the authentication rules define the user authentication process using any data sources providing information about the user, information known to the user, or both, to authenticate the users, thereby providing a data agnostic system.

4. The system of claim 1, wherein the authentication rules define a multi-factor authentication process to authenticate the users.

5. The system of claim 1, wherein authentication strategies correspond to the authentication rules, thereby allowing the system to support authentication strategy experimentation.

6. The system of claim 1, wherein multi-step user authentication processes according to authorization requirements of vendors correspond to the authentication rules.

7. The system of claim 1, wherein the authentication rules further comprise one or more of data source mapping rules defining interfaces with the data sources and permission rules defining access privileges to the authentication rules.

8. The system of claim 1, wherein the programmed processor further simulates authentication of the users according to the authentication rules.

9. The system of claim 1, wherein the programmed processor further allows automatic and/or manual real-time versioning of the authentication rules and the users are authenticated according to a version of the authentication rules.

10. The system of claim 1, wherein the programmed processor further correlates status information with the authentication rules.

11. The system of claim 1, wherein the authentication rules comprise permission rules based upon organization information of vendors and the programmed processor further manages access to the authentication rules according to the permission rules.

12. The system of claim 1, wherein the programmed processor further generates user authentication examinations based upon the authentication rules in real-time.

13. The system of claim 1, wherein the authentication rules correspond to interactive-user-authentication question parameters.

14. The system of claim 1, wherein authentication strategies correspond to the authentication rules which are modified responsive to performance data of the authentication strategies in real-time, thereby optimizing the system in real-time responsive to the performance data.

15. The system of claim 1, wherein the specifying configuration for the one or more data sources comprises data source parameters specifying the data sources.

16. The system of claim 1, wherein the specifying configuration for the one or more data sources comprises data source parameters specifying the data source by type.

17. The system of claim 16, wherein the data source type comprises geographic data sources.

18. The system of claim 16, wherein the data source type comprises demographic data sources.

19. The system of claim 16, wherein the data source type comprises political data sources.

20. The system of claim 16, wherein the data source type comprises government-supplied data sources.

21. The system of claim 1, wherein the authentication rules define the user authentication process using real-time behavior information, feeling information, or both, of the users.

22. The system of claim 21, wherein the user real-time information is based upon user facial patterns, mannerisms, body movements, perspiration levels, anxiety levels, emotions, mental data, voice distress data, or polygraph data, or any combinations thereof.

23. The system of claim 1, wherein the authentication rules define the user authentication process based upon multiple-choice user authentication questions that have none-of-the-above as an answer choice when data about the user from a data source is not required to ask the question, data about the user is not available, or both.

24. The system of claim 1, wherein the programmed processor further provides a display graphical user interface comprising a selection navigation area to select user authentication processes used to authenticate the users and to select configurations of the processes.

25. The system of claim 1, wherein the programmed processor further provides a displayed graphical user interface comprising a side navigation area allowing selection of user authentication processes used to authenticate the users and tabbed folders providing configuration information corresponding to selected user authentication processes, thereby allowing configuration of the user authentication processes.

26. The system of claim 1, wherein the authentication rules correspond to user authentication question parameters specifying questions, question grouping, question group priority, question type, question query order, question priority, question answer options, question point assignments, question time to answer, question retry criteria, question language and/or whether data about the user is not required to ask a question.

27. The system of claim 1, wherein the authentication rules correspond to user authentication question multiple-choice answer options comprising numeric answer ranges, number of answer choices, context sensitive wrong answer choices and/or none-of-the-above as an answer choice.

28. The system of claim 1, wherein the programmed processor further automatically generates authentication examinations according to the authentication rules and allows monitoring of transaction records corresponding to the examinations in real-time.

29. The system of claim 1, wherein the authentication rules define the user authentication process using user authentication questions and define grouping the user authentication questions according to predictability of the questions in question groups.

30. The system of claim 1,
wherein the authentication rules define the user authentication process using user authentication questions, define grouping the user authentication questions, define assigning correct answer points to each group, a question in a group, or both, and
wherein the authenticating the users comprises calculating authentication confidence scores based upon the points scored by the users.

31. The system of 29, wherein the user authentication questions are grouped according to a common association of the questions in each group.

32. The system of claim 1,
wherein the authentication rules define the user authentication process using user authentication questions, define grouping the user authentication questions, define assigning equal, variable, or both correct answer points to each group, a question in a group or both, and
wherein the authenticating the users comprises calculating authentication confidence scores based upon the points scored by the users.

33. The system of claim 1, wherein the programmed processor further communicates directly with vendor computers that interface with the users or communicates with the vendor computers via redirection of the users by the vendor computers to the programmed processor, thereby allowing open connectivity between the vendor computers and the system.

34. The system of claim 2, wherein the multi-factor user authentication processes comprise verifying what a user has using one or more of digital certificates and personal identification documents of the users.

35. The system of claim 2, wherein the multi-factor user authentication processes comprise verifying what a user is by using one or more biometric verifications of fingerprint scan, keystroke patterns, retinal scan, face recognition and DNA analysis.

36. The system of claim 2, wherein the multi-factor user authentication processes comprise verifying what a user knows using one or more of responses to user authentication questions, real-time behavior information, real-time feeling information, or any combinations thereof, of the users.

37. The system of claim 2, wherein the authentication rules correspond to vendor-configured multi-step authentication processes comprising sequentially, simultaneously, or both, accessing data sources providing information about, information known, or both, to the user to authenticate the users within an authentication session.

38. The system of claim 1, wherein the programmed processor further communicates with vendor computers using business-to-business transactions or using user-interface redirection.

39. The system of claim 1, wherein the programmed processor further correlates identifiers as live, retired, working, or any combinations thereof, as an operation status of user authentication processes used to authenticate the users.

40. The system of claim 1, wherein the programmed processor further manages authentication of the users in compliance with applicable consumer privacy laws.

41. The system of claim 1,
wherein the authentication rules define the user authentication process using user authentication questions, and define randomly selecting or selecting according to a fixed order the user authentication questions to authenticate the users.

42. The system of claim 1, wherein the authentication rules correspond to authentication retry parameters specifying retry criteria of user authentication processes.

43. The system of claim 2, wherein the strategy experimentation comprises assigning the authentication strategies to a business transaction, aggregating and evaluating performance data of the strategies for the business transaction, thereby allowing optimization of the system responsive to the performance data.

44. The system of claim 2, wherein the strategy experimentation comprises assigning the authentication strategies to a business transaction, aggregating performance data of the strategies for the business transaction, and evaluating the performance data according to a champion challenger method.

45. The system of claim 2, wherein the strategy experimentation comprises assigning an authentication strategy to a group of users for a business transaction, aggregating performance data of the strategy for each group, aggregating and evaluating the performance data of the strategy at various levels of the strategy, thereby allowing optimization of the system responsive to the performance data.

46. The system of claim 2, wherein the strategy experimentation comprises assigning an authentication strategy to a group of users for a business transaction, aggregating performance data of the strategy for each group, aggregating the performance data of the strategy for authentication question groups and authentication questions within each group of the strategy and optimizing the strategy responsive to the performance data.

47. The system of claim 1, wherein the authentication rules define the user authentication process using user authentication questions, and define grouping and selecting the user authentication questions according to a priority based upon one or more of predictability and the data sources corresponding to the questions.

48. The system of claim 1, wherein the specifying configuration for the one or more data sources comprises data source parameters specifying data sources providing information about, information known, or both, to the user to authenticate the users for a vendor or for each user authentication process of the vendor.

49. The system of claim 1, wherein the programmed processor further maintains the authentication rules via a web browser-based interface.

50. The system of claim 1, wherein the authentication rules define the user authentication process using user authentication questions having context sensitive wrong answers to authenticate the users.

51. The system of claim 1, wherein the authentication rules define limiting authentication of the users according to one or more frequency and time criteria based upon attempted, answered, or both, authentication questions and attempted, completed, or both, authentication sessions.

52. The system of claim 1, wherein authentication confidence scoring strategies correspond to the authentication rules, thereby allowing the system to support different scoring algorithms.

53. The system of claim 1, wherein the authentication rules correspond to authorization parameters specifying authorization decisions according to authentication confidence scoring algorithms of a vendor.

54. The system of claim 1, wherein the authentication rules define the user authentication process using filtered user authentication questions.

55. The system of claim 1, wherein the programmed processor further provides filtered user authentication transaction reporting in real-time.

56. The system of claim 1, wherein the programmed processor further allows a system/solution provider and/or a vendor to manage the authentication rules in real-time.

57. The system of claim 1, wherein the programmed processor further automatically loads test authentication processes with key fields and the programmed processor simulates authentication of the users according to the test authentication processes.

58. The system of claim 1, wherein the programmed processor stores user authentication transactions in real-time, thereby allowing the system to report, in real-time, the transactions via any interface with the system.

59. The system of claim 1, wherein the authentication rules define the user authentication process using user authentication questions, and define grouping and retrieving a number of user authentication questions from the group to authenticate the users.

60. The system of claim 1, wherein the authentication rules define the authentication process using user authentication question and define determining a number of user authentication questions to be generated to authenticate the users.

61. The system of claim 1, wherein the authentication rules define the authentication process using user authentication questions and define generating the user authentication questions having multiple-choice answers with only one answer correct, true/false answers, multi-select answers, fill in the blank answers, or any combinations thereof.

62. The system of claim 1, wherein the programmed processor further provides test authentication processes, simulates authentication of the users according to the test authentication processes, and provides correct answers in the simulation.

63. The system of claim 1, wherein the programmed processor further allows operation of the system as a user authentication service or deployment as a software product.

64. The system of claim 2, wherein the strategy experimentation comprises aggregating performance data of the authentication strategies and the programmed processor further optimizes the authentication rules responsive to the performance data.

65. A system authenticating users, comprising a programmed processor generating authentication rules for defining configuration parameters for a user authentication process, based upon specifying a configuration parameter for one or more authentication sub-processes of information validation, fraud detection or identity verification, for one or more data sources, or for one or more authentication factors, or any combinations thereof, according to input user authentication process creation information; and generating user authentication examinations using any data sources, which provide information about, information known, or both to a user, according to the authentication rules, thereby providing a data agnostic system.

66. The system of claim 65, wherein the user authentication examinations are multi-factor.

67. The system of claim 65, wherein the authentication rules correspond to authentication strategies, thereby allowing the system to support authentication strategy experimentation.

68. An apparatus, comprising:
a programmed processor
generating authentication rules for defining configuration parameters for a user authentication process, based upon specifying a configuration parameter for one or more authentication sub-processes of information validation, fraud detection or identity verification, for one or more data sources, or for one or more authentication factors, or any combinations thereof, according to input user authentication process creation information; and
generating multi-factor authentication examinations to authenticate users, based upon the generated authentication rules.

69. The system of claim 68, wherein authentication strategies correspond to the authentication rules, thereby allowing the system to support authentication strategy experimentation.

70. A system authenticating users, comprising:
a programmed processor
generating authentication rules that correspond to authentication strategies for defining configuration parameters for a user authentication process, based upon specifying a configuration parameter for one or more authentication sub-processes of information validation, fraud detection or identity verification, for one or more data sources, or for one or more authentication factors, or any combinations thereof, according to input user authentication process creation information;
aggregating performance data of the authentication rules; and
modifying the strategies responsive to the performance data, thereby optimizing the system responsive to the performance data.

71. The system of claim 2, wherein multi-factor authentication strategies correspond to the authentication rules and the programmed processor further aggregates performance data of the strategies to measure effectiveness of the strategies and modifies the authentication rules in real-time responsive to the performance data, thereby optimizing the system responsive to the performance data in real-time.

72. A system authenticating users, comprising:
an authentication rule designer generating authentication rules for defining configuration parameters for a user authentication process, based upon specifying a configuration parameter for one or more authentication sub-processes of information validation, fraud detection or identity verification, for one or more data sources, or for one or more authentication factors, or any combinations thereof, according to real-time input authentication process configuration parameter information, thereby customizing the system in real-time; and
an authentication engine generating an authentication examination according to the authentication rules for authenticating the user.

73. The system according to claim 1,
wherein the authenticating users comprises authenticating users of vendors providing services, products, or both, to the users, and the programmed processor further configures a display screen to provide a graphical user interface comprising a side navigation area containing at least a first selection location providing selectable user authentication processes for a vendor and tabbed folders providing selectable configuration parameters corresponding to selected user authentication processes of the vendor, thereby allowing authentication process selection, customization, simulation, and submission to a production environment to authenticate users by the vendor.

74. The system of claim 73, wherein the side navigation area allows selection of at least one or more of simulation of the user authentication processes, printing of the configuration parameters of the user authentication processes, auditing of user authentication transactions of the user authentication processes, and obtaining status information of the user authentication processes.

75. The system according to claim 1, wherein the authentication rules define the user authentication process based upon a single set of interactive user authentication questions generated from at least two or more data sources providing information about, information known, or both, to the user.

76. The system of claim 75, wherein the data sources comprise credit history, user profile, fraud, geographic, demographic, government-supplied, political, biometric, or digital certificate, or any combinations thereof data sources.

77. The system of claim 75, wherein the questions are generated from a geographic data source comprising geographic area information pertaining to a geographic area known by a user.

78. The system of claim 77, wherein the geographic area information comprises one or more of street name information, street intersection information, landmark information, governmental information, or any combinations thereof.

79. The system of claim 75, wherein the questions are generated from a political data source comprising political information relating to a geographic area known by a user.

80. The system of claim 79, wherein the political information comprise politician information and/or political party information.

81. The system of claim 75, wherein the questions are generated from a user-profile data source comprising vehicle information, household information, employer history information, residence history information, tax information, shopping tendency information, or any combinations thereof.

82. A system authenticating users, comprising:
authentication rules means for generating configurable authentication rules defining configuration parameters for a user authentication process, based upon specifying a configuration parameter for one or more authentication sub-processes of information validation, fraud detection or identity verification, for one or more data sources, or for one or more authentication factors, or any combinations thereof, according to input user authentication process creation information; and data agnostic authentication means for generating authentication examinations for authentication of users based upon the configuration parameter for the data sources.

83. A system authenticating a user, comprising:

authentication rules means for generating configurable authentication rules defining configuration parameters for a user authentication process, based upon specifying a configuration parameter for one or more authentication sub-processes of information validation, fraud detection or identity verification, for one or more data sources, or for one or more authentication factors, or any combinations thereof, according to input user authentication process creation information; and multi-factor authentication means for generating multi-factor authentication examinations authenticating the user based upon two or more authentication factors, according to the authentication rules.

* * * * *

UNITED STATES PATENT AND TRADEMARK OFFICE
CERTIFICATE OF CORRECTION

PATENT NO. : 7,231,657 B2
APPLICATION NO. : 10/224564
DATED : June 12, 2007
INVENTOR(S) : Laurence Honarvar et al.

Page 1 of 1

It is certified that error appears in the above-identified patent and that said Letters Patent is hereby corrected as shown below:

First page, col. 1, (73) Assignee
After "(US)" insert --22033--

Col. 8, line 42, after "invention" insert --.--.

Col. 9, line 44, delete "products" and insert --product,--, therefor.

Col. 27, line 30, delete "a" and insert --an--, therefor.

Col. 37, line 61, delete "follows the" and insert --follows. The--, therefor.

Col. 40, line 35, after "negative</=50%)" insert --.--.

Signed and Sealed this

Thirteenth Day of November, 2007

JON W. DUDAS
*Director of the United States Patent and Trademark Office*